United States Patent [19]
Gotomyo et al.

[11] Patent Number: 5,466,001
[45] Date of Patent: Nov. 14, 1995

[54] AIR BAG SYSTEM FOR AN AUTOMOTIVE VEHICLE

[75] Inventors: Yasuo Gotomyo; Haruhisa Kore; Hisao Muramoto; Yoshinbu Nomura; Shigefumi Kohno; Isao Hirashima, all of Hiroshima, Japan

[73] Assignee: Mazda Motor Corporation, Hiroshima, Japan

[21] Appl. No.: 226,720

[22] Filed: Jun. 28, 1994

Related U.S. Application Data

[62] Division of Ser. No. 792,162, Nov. 14, 1991, Pat. No. 5,324,071.

[30] Foreign Application Priority Data

| Mar. 22, 1991 | [JP] | Japan | 3-59103 |
| Mar. 29, 1991 | [JP] | Japan | 3-65811 |
| Jun. 6, 1991 | [JP] | Japan | 3-134663 |
| Jun. 6, 1991 | [JP] | Japan | 3-134664 |
| Jun. 7, 1991 | [JP] | Japan | 3-136771 |

[51] Int. Cl.⁶ .................................................. B60R 21/22
[52] U.S. Cl. ................ 280/730.1; 280/735; 297/216.12
[58] Field of Search ................ 280/728 R, 730 R, 280/735, 748, 751, 731, 732; 297/216.1, 216.12, 216.13, 216.14

[56] References Cited

U.S. PATENT DOCUMENTS

| 3,738,681 | 6/1973 | Wada et al. | 280/728 R |
| 3,779,577 | 12/1973 | Wilfert | 280/730 R |
| 3,930,665 | 1/1976 | Ikawa | 280/751 |
| 5,071,160 | 12/1991 | White et al. | 280/731 |
| 5,074,583 | 12/1991 | Fujita et al. | 280/732 |
| 5,232,243 | 8/1993 | Blackburn et al. | 280/732 |

FOREIGN PATENT DOCUMENTS

| 2516185 | 10/1975 | Germany | 280/730 R |

*Primary Examiner*—Mitchell J. Hill
*Assistant Examiner*—Paul N. Dickson
*Attorney, Agent, or Firm*—Fish & Richardson

[57] ABSTRACT

The head rest is detachably mounted to the seat back of the front seat and the air bag unit with an air bag mounted therein is mounted to the head rest. The air bag is expanded toward the passenger seated on the rear seat in response to an explosion signal from the control unit into which signals are entered from impact sensors. The air bag is so disposed as to expand only when the passenger is seated on the rear seat. The posture and position of the air bag unit is adjusted in association with the movement or displacement of the front seat to which the air bag is mounted, thereby improving the ability of the expanded air bag to confine the passenger seated on the rear seat and protecting the passenger in a more safe fashion. Further, the air bag unit is mounted to the head rest of the front seat, so that the air bag can be exchanged with ease and at cheap costs without exchanging the front seat itself.

12 Claims, 38 Drawing Sheets

AIR BAG SYSTEM FOR AN AUTOMOTIVE VEHICLE

This application is a division of U.S. application Ser. No. 07/792,162 filed Nov. 14, 1991, now U.S. Pat. No. 5,324,071.

BACKGROUND OF THE INVENTION

1. Field of the Invention

The present invention relates to an air bag system for an automotive vehicle and, more particularly, to an air bag system for an automotive vehicle so adapted as to protect in particular the passenger seated on the rear seat against impact of the automotive vehicle or a car crash.

2. Description of Related Art

Generally, there is known an air bag system in which an air bag unit is provided with an inflator and an air bag mounted in predetermined positions and it is so arranged as to protect the passenger seated in the vehicle compartment of the automotive vehicle against impact or shock acting upon a vehicle body of the automotive vehicle due to a car crash, etc. by rapidly expanding the air bag accommodated with the air bag unit in a folded or wound state by explosion of the inflator of the air bag unit.

U.S. Pat. No. 3,779,577 discloses an air bag system in particular for protecting the passenger seated on the rear seat, in which an air bag unit is mounted to a rear face portion of a seat back of each of left-hand and right-hand front seats.

The disposition of the air bag unit at the seat back of the front seat, however, poses the following problems.

1. The seat back of the front seat is located in many occasions in such a state that the rear face portion of the seat back is reclined obliquely downwards. Hence, the air bag mounted at the rear face portion of the seat back of the front seat is likely to be developed to expand in an obliquely downward direction, too, when a car crash has occurred, and the expanded air bag may not confine or protect particularly the head of the passenger seated on the rear seat in a sufficiently safe fashion.

2. It is difficult to set the air bag so as to expand always in an obliquely upward direction directed toward the head and chest portions of the passenger seated on the rear seat due to the correlation with a reclining angle of the seat back of the front seat.

3. When the air bag units should be exchanged, the whole portion of the seat back of the front seat is required to be exchanged so that expenses necessary for exchanges of the seat backs become extremely high.

Further, the disposition of the air bag unit at the front seat suffers from the disadvantage that a distance between the air bag unit and the passenger seated on the rear seat may become too long or too short to confine the passenger in an appropriate manner by expansion of the air bag mounted in the air bag unit, when a seat status or position of the front seat is changed, for example, when the front seat is slid and displaced forward.

Furthermore, a so-called submarine phenomenon should be taken into consideration when measures are taken to protect the passenger seated on the rear seat from the impact or shock due to a car crash. The so-called submarine phenomenon is intended herein to mean a phenomenon in which the leg portion of the passenger is caused to jump off a floor of the vehicle compartment, too, in accompaniment to the forward movement of the hip portion thereof upon a car crash.

If the submarine phenomenon would occur due to a car crash, the relationship of the position of the air bag unit with the posture or position of the passenger seated on the rear seat becomes so irregular that the passenger may not be confined by the expanded air bag in a sufficient way, thereby causing the passenger to jump off the rear seat.

It is further to be noted that the front seat is generally arranged to slide forward or backward, thereby permitting adjustment of the longitudinal direction of the front seat. The sliding mechanism is arranged that its front end portion becomes higher in its vertical position than its rear end portion, so that the front seat is inclined with its front end portion positioned higher than its rear end portion, as the front seat slides forward closer to a front end of the automotive vehicle. Thus, this arrangement for the longitudinally sliding mechanism for the front seat presents the problems that the passenger seated on the rear seat cannot be confined by expansion of the air bag due to a variation in the vertical position of the front seat, resulting in a variation in the direction in which the air bag is directed and expanded.

SUMMARY OF THE INVENTION

Therefore, a first object of the present invention is to provide an air bag system for an automotive vehicle so adapted as to enhance protection performance in particular for the head of the passenger seated on the rear seat upon a car crash and to allow exchanges for air bag units at cheap expenses and with ease.

The present invention has a second object to provide an air bag system for the automotive vehicle so adapted as to curtail the effect of the seat status or position of the front seat upon confinement of the passenger seated on the rear seat by expansion of the air bag mounted in the front seat.

The present invention has a third object to provide an air bag system for the automotive vehicle so adapted as to ensure the confinement of the passenger seated on the rear seat by expansion of the air bag, while suppressing the submarine phenomenon from occurring against the passenger seated on the rear seat.

The present invention has a fourth object to provide an air bag system for the automotive vehicle so adapted as to curtail the effect of the seat status or position of the front seat upon confinement of the passenger seated on the rear seat by the air bag, when the longitudinally sliding mechanism for the front seat is disposed in such a manner as being reclined higher at its front portion than at its rear portion.

It is to be noted herein that the term "seat status" and related terms are intended to mean 'a reclined angle', 'a longitudinal position' and 'a vertical position'. Hence, for instance, the term referred to as 'a reclined angle of the front seat' is meant to refer to the angle of the front seat at which the front sheet is reclined with respect to the angle at which the front seat is located in a normal position.

In order to achieve the aforesaid objects, particularly the first object, the present invention consists of the air bag system for the automotive vehicle having an air bag unit so mounted to a front seat as to expand an air bag accommodated in the air bag unit toward a passenger seated on a rear seat upon impact of the automotive vehicle, comprising a head rest mounted detachably to a seat back of the front seat; and the air bag unit mounted to the head rest and accommodating the air bag.

In accordance with the present invention, the air bag unit is mounted to the head rest disposed at the upper end of the seat back so that the air bag accommodated in the air bag unit can be expanded toward the passenger seated on the rear seat, thereby ensuring the confinement of the passenger, particularly the head and chest portions of the passenger. Further, as the air bag unit is mounted to the head rest of the front seat, the air bag unit can be exchanged merely by exchanging the head rest for a head rest with a new air bag unit mounted thereto. This operation is performed with extreme ease and at cheap expenses.

When the air bag unit is mounted to the head rest of the front seat, the seat status of the front seat, e.g. the reclined angle of the front seat, may exert the adverse influence upon the direction in which the air bag is expanded toward the passenger seated on the rear seat, thereby curtailing the protection performance of the expanded air bag for the passenger. Hence, the air bag system according to the present invention is arranged to control a distribution of gas pressures upon expansion of the air bag in accordance with the seat status of the front seat.

Further, the air bag system accordance with the present invention can avoid the risk that the automotive vehicle is driven without attachment of the air bag, even if the head rest of the front seat would have been detached from the seat back of the front seat before driving the automotive vehicle, because the air bag unit is mounted to the head rest of the front seat and an internal combustion engine cannot be started up if no head rest would be attached to the seat back of the front seat. This arrangement of the air bag system according to the present invention can ensure the protection for the passenger seated on the rear seat. At this end, locking means is disposed to inhibit the detachment of the head rest during driving the automotive vehicle or inhibition means is disposed to inhibit the running of the automotive vehicle when no head rest is mounted to the front seat.

When the air bag unit is mounted to the head rest of the front seat, it is preferred to take measures for suppressing the so-called submarine phenomenon from occurring and protecting the passenger seated on the rear seat from jumping off the rear seat.

In order to achieve the preferred modes of the air bag system according to the present invention, it is preferred to mount a knee protector for the passenger seated on the rear seat or to attach an expandable string member to a vertically middle portion of the air bag so as to expand upper and lower portions of the air bag earlier than the middle portion of the air bag. In another aspect, at the moment when a car crash is predicted, the seat back of the rear seat may be arranged so as to erect or the rear seat is slid and displaced rearward so as to suppress the forward displacement of the passenger seated on the rear seat by the seat back of the front seat. Furthermore, the rear seat may be disposed so as to force the hip portion of the passenger seated on the rear seat to be lowered upon prediction of a car crash when the impact of the automotive vehicle is predicted.

In order to achieve the aforesaid objects, particularly the second object, a first aspect of the present invention consists of the air bag system of the automotive vehicle having the air bag unit so mounted to the front seat as to expand the air bag accommodated in the air bag unit toward the passenger seated on the rear seat, comprising:

gas pressure adjusting means for adjusting distribution of gas pressure within the air bag upon expansion of the air bag;

front seat state detecting means for detecting a seat status of the front seat; and gas pressure controlling means for controlling the gas pressure by producing the distribution of the gas pressure by controlling the gas pressure adjusting means in accordance with the seat status of the front seat, in response to a signal from the front seat status detecting means.

In accordance with the second aspect of the present invention to achieve particularly the second object of the present invention, the distribution of gas pressures within the air bag is adjusted to change the shape of the expanded air bag in agreement with the seat status of the front seat.

In order to achieve the aforesaid objects of the present invention, particularly the second object thereof, a second aspect of the present invention consists of an air bag system for the automotive vehicle having the air bag unit disposed at the front seat so as to expand an air bag accommodated in the air bag unit toward the passenger seated on the rear seat upon impact of the automotive vehicle, comprising rear seat status adjusting means for adjusting the seat status of the rear seat; front seat status detecting means for detecting the seat status of the front seat; and rear seat status controlling means for controlling the seat status of the rear seat in association with the seat status of the front seat by controlling the rear st-st adjusting means, in response to a signal from the front st-st detecting means.

This second aspect of the present invention can optimize the ability of the air bag to confine the passenger seated on the rear seat by changing the seat status of the rear seat in accordance with the seat status of the front seat, thereby forcibly changing the position and/or posture of the passenger seated on the rear seat and suppressing the passenger from jumping off the rear seat.

In order to achieve the aforesaid objects of the present invention, particularly the second object thereof, a third aspect of the present invention consists of an air bag system for the automotive vehicle having the air bag unit disposed at the front seat so as to expand the air bag accommodated in the air bag unit toward the passenger seated on the rear seat upon impact of the automotive vehicle, comprising front seat status adjusting means for adjusting the seat status of the front seat; passenger determining means for determining if the passenger is seated on the rear seat; and inhibition means for inhibiting alteration of the seat status of the front seat beyond a predetermined range by controlling the front seat status adjusting means in response to a signal from the passenger determining means, when it is determined by the passenger determining means that the passenger is seated on the rear seat.

This third aspect of the present invention can ensure the ability of the air bag to confine the passenger seated on the rear seat in a good condition by suppressing the seat status of the front seat from changing.

Further, in order to achieve the aforesaid objects of the present invention, particularly the second object thereof, a fourth aspect of the present invention consists of an air bag system for the automotive vehicle having the air bag unit disposed at the front seat so as to expand the air bag accommodated in the air bag unit toward the passenger seated on the rear seat upon impact of the automotive vehicle, comprising the air bag unit disposed at an opening formed in the front seat and directed rearward; and an arm fixed to the floor of a vehicle body and extending upwards; wherein the air bag unit is fixed to an upper end of the arm.

The fourth aspect of the present invention to achieve particularly the second object does not undergo the influence from the seat status of the front seat because the air bag unit is disposed separately from the front seat and it is positioned in a state independent therefrom.

Furthermore, in order to achieve the aforesaid objects of the present invention, particularly the second object thereof, a fifth aspect of the present invention consists of an air bag system for the automotive vehicle having the air bag unit disposed at the front seat so as to expand the air bag accommodated in the air bag unit toward the passenger seated on the rear seat upon impact of the automotive vehicle, comprising: the air bag unit disposed at an opening formed in the front seat and directed rearward; air bag unit driving means for displacing the air bag unit within the opening; front seat-status detecting means for detecting the seat status of the front seat; and position controlling means for adjusting a position of the air bag unit in association with the seat status of the front seat by controlling the air bag unit driving means in response to a signal from the front seat status detecting means.

This fifth aspect of the present invention can adjust the position of the air bag unit in association with the seat status of the front seat.

In order to achieve the aforesaid objects of the present invention, particularly the third object thereof, the present invention may consist of the air bag system for the automotive vehicle, wherein a knee protector for the passenger seated on the rear seat is disposed at the seat back of the front seat.

Further, the present invention may consist of the air bag system for the automotive vehicle, wherein the air bag is provided at its vertically middle portion with an expandable string member so as to delay expansion of the air bag in the vicinity of the vertically middle portion of the string member from the expansion of the upper and lower portions of the air bag.

Furthermore, the present invention may consist of the air bag system for the automotive vehicle, wherein a second air bag unit is disposed at the seat back of the front seat so as to expand toward a knee portion of the passenger.

Additionally, the present invention may consist of the air bag system for the automotive vehicle, wherein the seat back of the rear seat is so disposed as to erect when the impact of the automotive vehicle is predicted.

Further, the present invention may consist of the air bag system for the automotive vehicle, wherein a front end portion of the seat cushion of the rear seat is raised or a rear end portion thereof is lowered, thereby lowering the hip portion of the passenger seated on the rear seat and suppressing the passenger from moving forward rapidly and jumping off the rear seat upon the impact of the automotive vehicle, when the impact of the automotive vehicle is predicted.

In addition, the present invention may consist of the air bag system for the automotive vehicle, wherein the front seat is slid rearward when the impact is predicted, thereby allowing the seat back of the front seat to suppress the passenger seated on the rear seat from jumping off the rear seat.

In order to achieve the aforesaid objects of the present invention, particularly the fourth object thereof, the present invention consists of the air bag system for the automotive vehicle, wherein the position of the air bag unit is changed in association with the longitudinal position of the front seat or wherein the vertical position of the rear seat is adjusted in agreement with the longitudinal position of the front seat.

Other objects, features and advantages of the present invention will become apparent in the course of the description of the preferred embodiments, which follows, with reference to the accompanying drawings.

BRIEF DESCRIPTION OF THE DRAWINGS

FIGS. 1 to 8 are directed to the first embodiment of the present invention, in which:

FIG. 1 is a plan view showing an automotive vehicle with its roof section excluded;

FIG. 2 is a perspective view showing the front seat in the vehicle compartment when viewed obliquely from the rear of the automotive vehicle;

FIG. 3 is a front view showing the air bag unit;

FIG. 4 is a view in section taken along line IV—IV of FIG. 3;

FIG. 5 is a perspective view showing an upper portion of the front seat, particularly the head rest thereof, when viewed obliquely from the rear of the automotive vehicle;

FIG. 6 is a system diagram showing the control system of the air bag for the passenger seated on the rear seat;

FIG. 7 is a flow chart showing an example of the control over the air bag for the passenger seated on the rear seat; and FIG. 8 is schematic representation showing the action of the air bag for the passenger seated on the rear seat.

FIGS. 9 to 11 are directed to the second embodiment of the air bag system according to the present invention, in which:

FIG. 9 is a plan view showing an automotive vehicle with a roof section excluded;

FIG. 10 is a system diagram showing the control system for the air bag for the passenger seated on the rear seat; and FIG. 11 is a flow chart showing an example of control over the control system for the passenger seated on the rear seat.

FIGS. 12 to 17 are directed to the third embodiment of the air bag system for the automotive vehicle according to the present invention, in which:

FIG. 12 is a rear view showing the configuration of the upper portion of the front seat, particularly the structure of the mounting of the head rest;

FIG. 13 is a view showing a sensor for sensing the mounting of the head rest;

FIG. 14 is a system diagram showing the control of the locking means for inhibiting detachment of the head rest;

FIG. 15 is a flow chart showing an example of the control of the locking means as shown in FIG. 14;

FIG. 16 is a circuit diagram showing a circuit for inhibiting the start-up of the internal combustion engine when no head rest is mounted to the seat back of the front seat; and FIG. 17 is a flow chart showing an example of the control for inhibiting the start-up of the internal combustion engine when no head rest is mounted thereto.

FIGS. 18 to 27 are directed to the fourth embodiment of the air bag system for the automotive vehicle according to the present invention, in which:

FIG. 18 is a longitudinally sectional view showing the air bag unit for the passenger seated on the rear seat;

FIG. 19 is a system diagram showing the control system for the air bag for the passenger seated on the rear seat;

FIG. 20 is schematic representation showing a sensor for sensing a reclined angle of the seat back of the front seat;

FIG. 21 is schematic representation showing a sensor for sensing a reclined angle of the head rest of the front seat;

FIG. 22 is schematic representation showing a sensor for sensing the longitudinal position of the front seat;

FIG. 23 is schematic representation showing a sensor for sensing the vertical position of the front seat;

FIG. 24 is schematic representation showing a sensor for sensing the vertical position of the head rest of the front seat;

FIG. 25 is a view showing the problems sought to be solved by this embodiment of the present invention; and FIGS. 26 and 27 are flow charts showing an example of the control of the air bag for the passenger seated on the rear seat.

FIGS. 31 to 34 are directed to the sixth embodiment of the air bag system for the automotive vehicle according to the present invention, in which:

FIG. 31 is a side view showing the vehicle compartment for the automotive vehicle;

FIG. 32 is a perspective view showing a seat frame for the front seat when viewed obliquely from the rear;

FIG. 33 is a partially sectional side view showing an upper portion of the seat frame of the front seat; and FIG. 34 is a view in section taken along line X34—X34 of FIG. 32.

FIGS. 35 and 36 are directed to the seventh embodiment of the air bag system for the automotive vehicle according to the present invention, in which:

FIG. 35 is a side view showing The vehicle compartment of the automotive vehicle; and FIG. 36 is a perspective view showing the seat frame of the front seat when viewed obliquely from the rear.

FIGS. 37 and 38 are directed To the eighth embodiment of the air bag system for the automotive vehicle according to the present invention, in which:

FIG. 37 is a side view showing the vehicle compartment of the automotive vehicle for description of the action of the air bag system according to this eighth embodiment; and FIG. 38 is a view with the essential portion enlarged, showing the reclined angle adjusting means for the front seat.

FIGS. 39 to 42 are directed to the ninth embodiment of the air bag system for the automotive vehicle according to the present invention, in which:

FIG. 39 is a side view showing the vehicle compartment of the automotive vehicle for description of the action of the air bag system according to this ninth embodiment;

FIG. 40 is a side view with a portion cut out, showing the rear seat;

FIG. 41 is a view showing a lift-up mechanism for lifting the front end portion of the seat cushion of the rear seat; and FIG. 42 is a view in section showing the lift-up mechanism of FIG. 41.

FIGS. 45 to 49 are directed to the eleventh embodiment of the air bag system for the automotive vehicle according to the present invention, in which:

FIG. 45 is a system diagram showing overall control in the eleventh embodiment;

FIG. 46 is a schematic side view showing the mechanism for adjusting the reclined angle of the head rest of the front seat;

FIG. 47 is a schematic side view showing the mechanism for adjusting the vertical position of the head rest of the front seat;

FIG. 48 is a diagram showing the detail of the overall control system in this eleventh embodiment; and FIG. 49 is a flow chart showing an example of the control in this eleventh embodiment.

FIGS. 50 to 52 are directed to a variant of the eleventh embodiment of the air bag system for the automotive vehicle according to the present invention, in which:

FIG. 50 is a system diagram showing the overall control in this twelfth embodiment;

FIG. 51 is a diagram showing the detail of the overall control system in this embodiment; and FIG. 52 is a flow chart showing an example of the control in this embodiment.

FIGS. 53 to 55 are directed to the twelfth embodiment of the air bag system for the automotive vehicle according to the present invention, in which:

FIG. 53 is a partially sectional side view showing the head rest when viewed from the side of the front seat;

FIG. 54 is a side view showing the upper portion of the front seat; and

FIG. 55 is a rear view showing the front seat when viewed from the rear seat side.

FIGS. 56 to 62 are directed to the thirteenth embodiment of the air bag system for the automotive vehicle according to the present invention, in which:

FIG. 56 is a sectional view of the head rest of the front seat when viewed from the rear seat side;

FIG. 57 is a sectional side view showing the head rest of the front seat;

FIG. 58 is an exploded perspective view showing the movable mechanism for the air bag unit;

FIG. 59 is a system diagram showing the overall control system in this embodiment;

FIG. 60 is a view for describing the action in this embodiment;

FIG. 61 is a view for describing other actions in this embodiment; and

FIG. 62 is a flow chart showing an example of the control of this embodiment.

FIGS. 63 and 64 are directed to the fourteenth embodiment of the air bag system for the automotive vehicle according to the present invention, in which:

FIG. 63 is a system diagram showing the overall control system of this embodiment; and FIG. 64 is a view for describing the action of this embodiment of the present invention.

DESCRIPTION OF THE PREFERRED EMBODIMENTS

The present invention will be described more in detail by way of examples with reference to the accompanying drawings.

FIRST EMBODIMENT (FIGS. 1 to 8)

Figure 1:
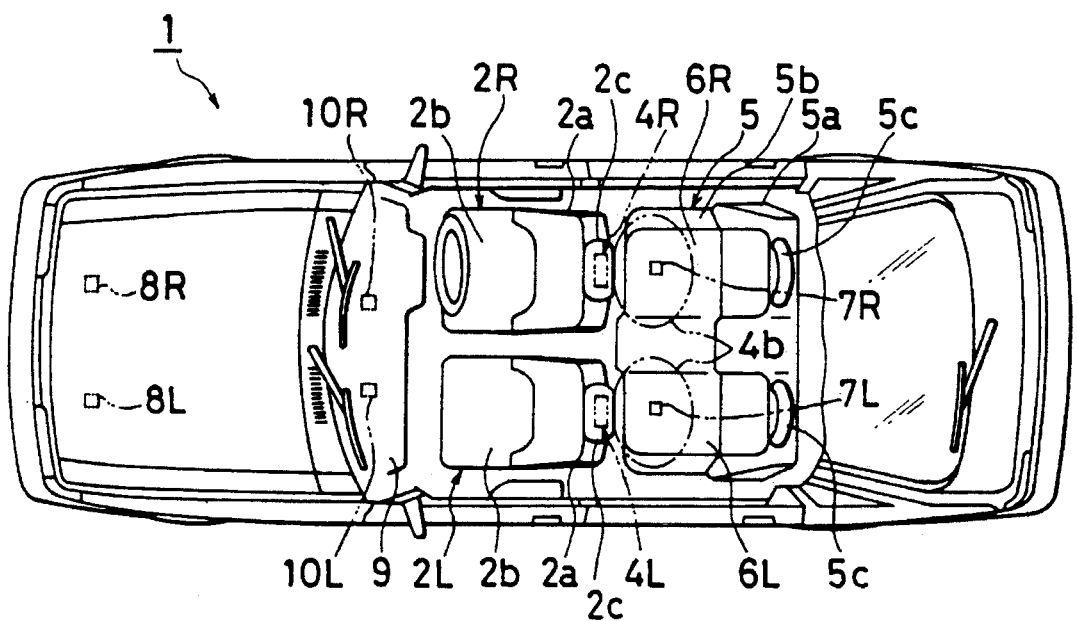
Figure 2:
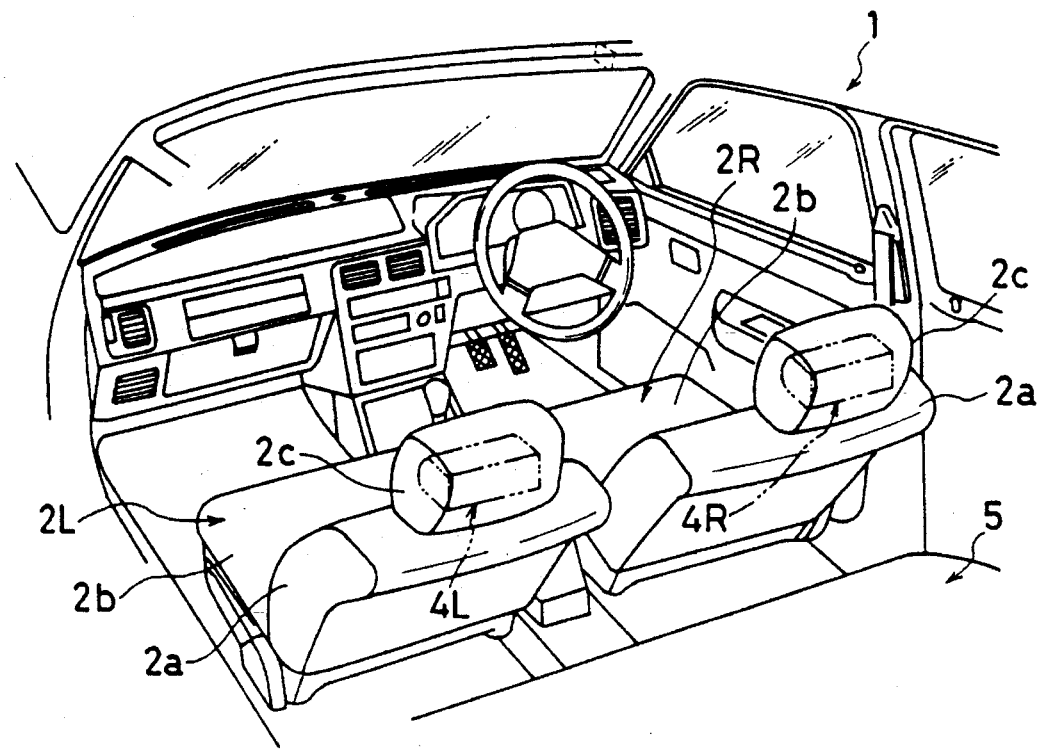

FIG. 1 is a schematic top view of an automotive vehicle with a roof excluded therefrom for ready reference and for brevity of explanation. As shown in FIG. 1, reference numeral 1 denotes a vehicle body of the automotive vehicle as well as reference numerals 2R and 2L denote a right-hand front seat and a left-hand front seat, respectively. The suffixes "R" and "L" provided after reference numerals are intended to refer to right-hand and left-hand, respectively, as well as the right-hand and left-hand elements may be referred to in generic terms as reference numerals only with no suffixes "R" and/or "L" added thereto.

The front seat 2 comprises a seat back 2a, a seat cushion 2b and a head rest 2c. The head rest 2c is mounted to the seat back 2a to be detachable therefrom, as will be described hereinafter, and an air back unit 4 for a passenger seated on a rear seat is mounted in the head rest 2c.

As shown further in FIG. 1, reference numeral 5 denotes a rear seat which in turn comprises a seat back 5a and a seat cushion 5b. Mounted to the rear seat cushion 5b are left-hand and right-hand head rests 5cL and 5cR. The rear seat cushion 5b is further provided with left-hand and right-hand seat sections 6L and 6R for passengers seated on the rear seat. The left-hand seat section 6L is separate from the right-hand seat section 6R and a left-hand seat sensor 7L is embedded in a nearly central position of the left-hand seat section 6L while a right-hand seat sensor 7R is embedded in a nearly central position of the right-hand seat section 6R. The seat sensors 7 are turned on when the passenger or passengers is or are seated on the respective seat sections 6.

At a front end portion of the vehicle body are mounted a pair of first left-hand and right-hand impact sensors 8L and 8R. An instrument panel 9 has a pair of second left-hand and right-hand impact sensors 10L and 10R disposed in a relationship spaced apart in a transverse direction of the vehicle body. The impact sensors 8 and 10 are of a type sensitive to acceleration and the first impact sensors 8 are set to be relatively lesser sensitive to acceleration than the second impact sensors 10. Hence, the first impact sensors 8 are arranged to be turned on by application of a relatively large impact while the second impact sensors 10 are arranged to be turned on when a relatively small impact is applied.

Figure 3:
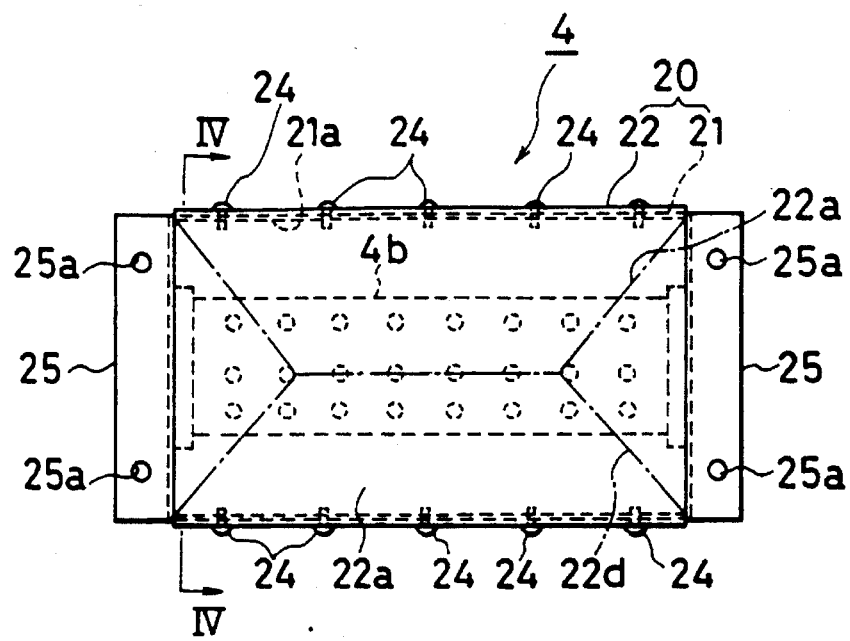
Figure 4:
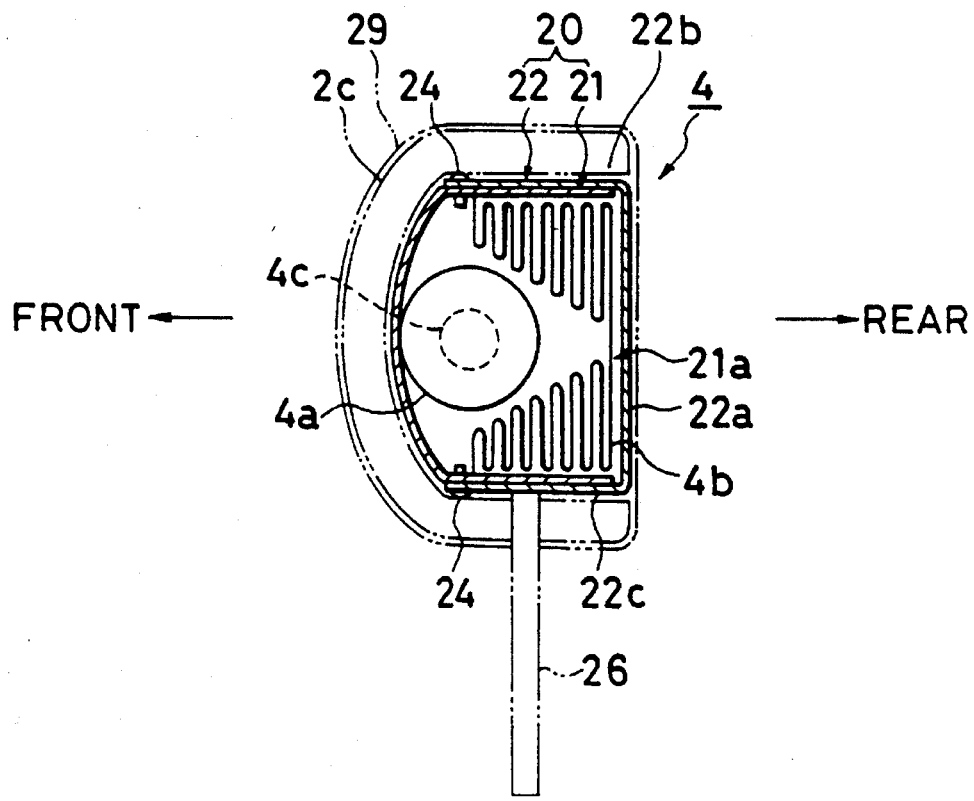

As shown in FIGS. 3 and 4, the air bag unit 4 has a casing 20 which in turn comprises an inner casing 21 having an opening directed toward the rear portion of the vehicle body and an outer casing 22 having an opening directed toward the front portion thereof. The inner casing 21 is composed of a metal while the outer casing 22 is composed of a flexible plastic membrane. The outer casing 22 comprises a vertical wall section 22a closing a rearward opening 21a of the inner casing 21, an upper wall section 22b disposed in abutment with an upper plate section of the inner casing 21, and a lower wall section 22c disposed in abutment with a lower plate section thereof.

The inner casing 21 is coupled to the outer casing 22 with screws 24 and 24 at the upper wall section 22b and at the lower wall section 22c. The casing 20 of the air bag unit 4 has an inflator 4a and an air bag 4b in a folded state accommodated therein and an end portion of the air bag 4b is fixed to the inner casing 21 through the screws 24 and 24. The inflator 4a may be of a solid type or of a gaseous type or of a mixed type.

As indicated by the one-dot-and-dash line in FIG. 3, the vertical wall section 22a of the outer casing 22 is provided with perforations 22d. The inner casing 21 of the casing 20 is provided in the vicinity of the rearward opening 21a with brackets 25 on the casing sides, extending in both directions towards their both sides. Each of the brackets 25 has two holes 25a formed in a vertically apart relationship, through which the inner casing 21 is secured with bolts in a manner as will be described hereinafter.

Figure 5:
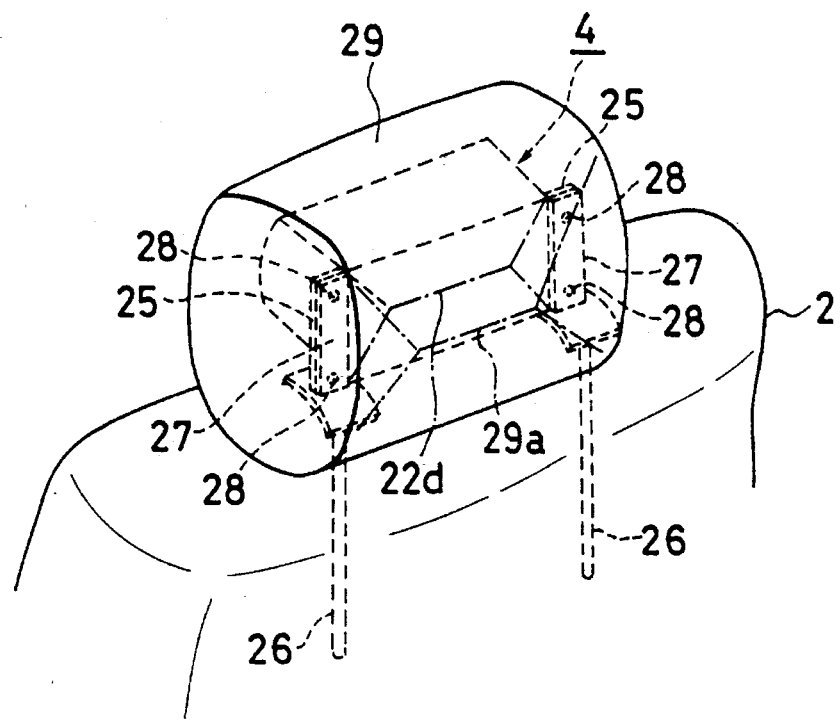

As shown in FIG. 5, the front seat head rest 2c is provided with a pair of left-hand and right-hand polls 26, each of which extends downwards. The head rest 2c is mounted to the front seat back 2a by inserting the pair of the polls 26 into holes provided in the corresponding positions of the seat back 2a. The structure and ways of mounting the head rest 2c to the seat back 2a are well known to the art so that further description of this point will be omitted from the following explanation for brevity of the text.

To an upper end of each of the polls 26 is fixed a bracket 27 on the head rest side, which are provided with two holes in the positions corresponding to the holes 25a provided on the brackets 25 on the casing side. With this arrangement, the air bag unit 4 is secured to the head rest 2c for the front seat by fastening the brackets 25 on the casing side to the brackets 27 on the head rest side with bolts 28 and nuts (not shown) disposed through the holes 25a and the corresponding holes. The air bag unit 4 is mounted in such a state that a head rest covering 29 is detached from the head rest 2c. The head rest covering 29 is provided with second perforations 29a, as indicated by the one-dot-and-dash line in FIG. 5 in the position corresponding to the first perforations on the air bag unit 4 (the vertical wall section 22a of the outer casing 22).

Left-hand and right-hand ends of the inflator 4a are secured to left-hand and right-hand side wall sections of the inner casing 21, respectively, and an ignition unit 4c (see FIG. 6) is mounted to the inside of the inflator 4a. As the ignition unit 4c is caused to exploded, a large quantity of gases is generated from the inflator 4a immediately after explosion, thereby causing the resulting gas pressure to expand the air bag 4b. As the air bag 4b is developed to expand, the first perforations 22b and the second perforations 9a are caused to be broken off, thereby resulting in the breakage of the vertical wall section 22a of the inner casing 22 and the head rest covering 29 and expanding toward the rear seat side. The air bag 4b is provided with a large number of vent holes (not shown) through which gases are allowed to be withdrawn to contract the expanded air bag 4b in a predetermined period of time after the air bag 4b was developed to expand.

Figure 6:
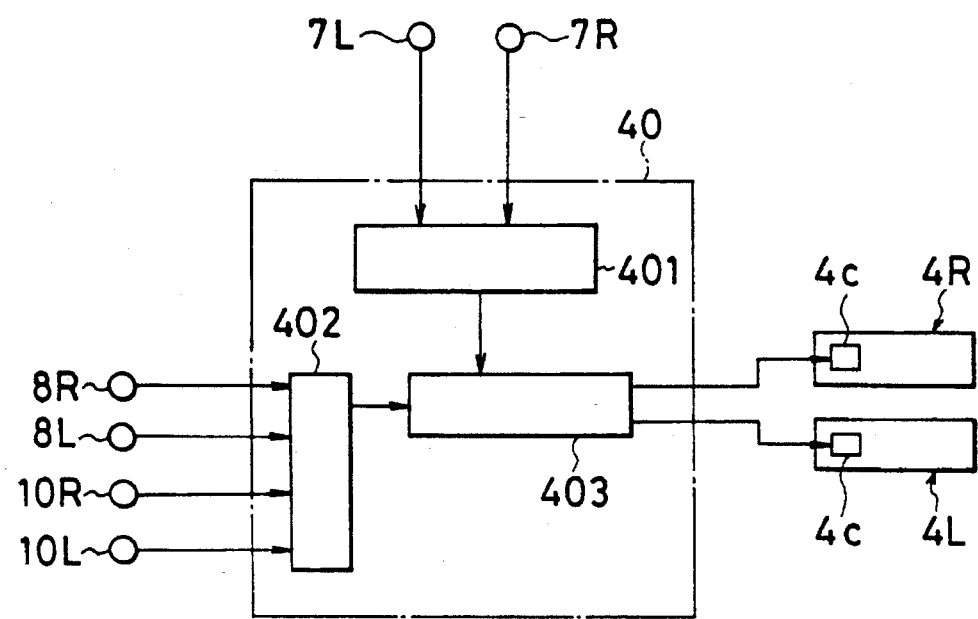

Explosion to expand the left-hand and right-hand air bag units 4L and 4R is performed on the basis of an explosion signal from the control unit 40 as shown FIG. 6. The control unit 40 may be composed of a in microcomputer consisting of CPU, ROM, RAM, and so on, as in well known to the art.

Entered into the control unit 40 are signals from sensors 7 (7R and 7L), 8 (8R and 8L) and 10 (10R and 10L). The control unit 40 is provided with first passenger determining means 401 for sensing to determine if the passenger or passengers has or have been seated, impact determining means 402 for sensing to determine if impact of the automotive vehicle would have been caused, and first explosion controlling means 403 for controlling explosion to expand the air bag.

The first passenger determining means 401 is to determine in response to a signal or signals from the seat sensor or seat sensors 7R or/are 7L if the passenger or passengers have been seated on the right-hand seat section 6R or/and the left-hand seat section 6L. The impact determining means 402 is to determine in response to signals from the first impact sensors 8 and the second impact sensors 10 if impact of the automotive vehicle would have been caused. The first explosion controlling means 403 is to generate an explosion signal to ignition units 4c of the air bag units 4R and 4L in response to signals from the first passenger determining means 401 and the impact determining means 402, when the automotive vehicle has caused impact.

Brief description will be made of the contents of the control performed by the control unit 40. It is to be noted that, on the one hand, when two passengers are seated on both seat sections 6R and 6L of the rear seat 5, both of the right-hand and left-hand air bag units 4R and 4L are ready to expand, for example, in case of a car crash and, on the other hand, when one of the rear seat sections 6 is vacant, i.e. when no passenger is seated on one of the rear seat sections 6, only the air bag unit 4 for the seat section 6 on which the passenger is seated is ready to expand, while the other air bag unit 4 is kept in an inoperative state. In other words, when the passenger is seated on the right-hand seat section 6R and no passenger is seated on the left-hand seat section 6L, only the right-hand air bag unit 4R is brought into a state to expand in case of a car crash, while the left-hand air bag unit 4L maintains its inoperative state even in case of a car crash. On the other hand, when the passenger is seated on the left-hand seat section 6L while no passenger is seated on the right-hand seat section 6R, the left-hand air bag unit 4L only is ready to expand although the right-hand air bag unit 4R is maintained in an inoperative state in which noir bag unit 4R is developed to expand even in case of a car crash.

Figure 7:
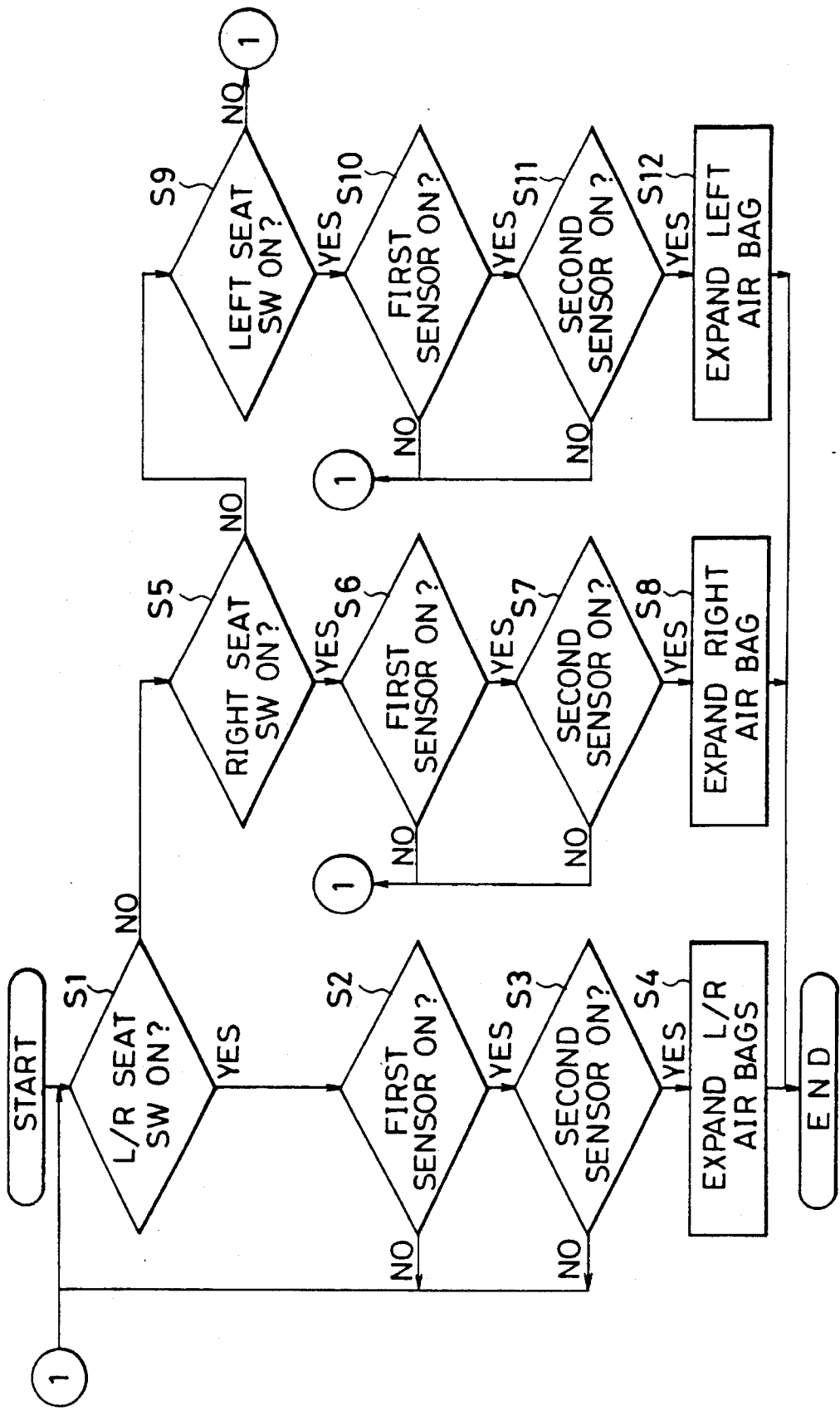

Given the foregoing, description will be made of an example of control by the control unit 40 with reference to the flow chart as shown in FIG. 7.

First, at step S1, a decision is made to determine if both of the right-hand seat sensor 7R and the left-hand seat sensor 7L are turned on. When it is decided at step S1 that both of the right-hand and left-hand seat sensors 7R and 7L are turned on, it is determined that two passengers are seated on the right-hand seat section 6R and the left-hand seat section 6L, respectively, then the program flow goes to step S2 at which a decision is made to determine if the first impact sensors 8 are turned on. When the result of decision at step S2 indicates that the first impact sensors 8 are turned on, then the program flow goes to step S3 at which it is further decided to determine if the second impact sensors 10 are turned on. When it is decided at both of steps S2 and S3 that both of the first and second impact sensors 8 and 10 are turned on, it is determined that a car crash has occurred, followed by proceeding to step S4 at which explosion signals are transmitted to both of the right-hand and left-hand air bag units 4R and 4L and the air bags 4b of the respective air bag units 4R and 4L are developed to expand, resulting in confining the passengers seated on the respective rear seats 5. On the other hand, when the results of decision at steps S2 and S3 indicate that both of the first and second impact sensors 8 and 10, respectively, are not turned on, then the program flow goes back to step S1.

When the result of decision at step S1 indicates that both of the right-hand and left-hand seat sensors 7R and 7L are not turned on, then the program flow goes to step S5 at which a decision is made to determine if the right-hand seat sensor 7R is turned on. If it is decided at step S5 that the right-hand seat sensor 7R is turned on, a further decision is made at step S6 to determine if the first impact sensors 8 are turned on, followed by proceeding to step S7 at which it is decided to determine if the second impact sensors 10 are turned on, i.e. when the result of decision at step S7 is in the affirmative. When it is decided at step S7 that the second impact sensors 10 are turned on, it is determined that a car crash has occurred, followed by proceeding to step S8 at which the control unit 40 transmits an explosion signal to the right-hand air bag unit 4R only and the right-hand air bag 4b for the right-hand air bag unit 4R is developed to expand toward the passenger seated on the right-hand rear seat 5R. When the results of decision at step S6 and step S7 indicates that neither the first impact sensors 8 nor the second impact sensors 10 are turned on, then the program flow goes back to step S1. On the other hand, the left-hand air bag unit 4L is kept in an inoperative state even if a car crash has occurred and the air bag 4b of the right-hand air bag unit 4R had been expanded.

On the other hand, when it is decided at step S5 that the right-hand seat sensor 7R is turned off, then the program flow goes to step S9 at which a decision is made to determine if the left-hand seat sensor 7L is turned on. When it is decided at step S9 that the left-hand seat sensor 7L is turned on, it is determined that the passenger is seated on the left-hand rear seat 5L, followed by proceeding to step S10 and then to step S11. If the results of decision at steps S10 and S11 indicate that both of the first impact sensors 8 and the second impact sensors 10 are turned on, respectively, it is then determined that a car crash has occurred, followed by proceeding to step S12 at which an explosion signal is transmitted to the left-hand air bag unit 4L only. Then, the air bag 4b of the left-hand air bag unit 4L is developed to expand toward the passenger seated on the left-hand rear seat 5L in response to the explosion signal. When the results of decision at step S10 and step S11 indicate that the first and second impact sensors 8 and 10, respectively, are turned off, then the program flow goes back to step S1. In this case, the right-hand air bag unit 4R is kept in an inoperative state even if a car crash has been caused and the air bag 4b of the left-hand air bag unit 4L had been expanded.

Figure 8:
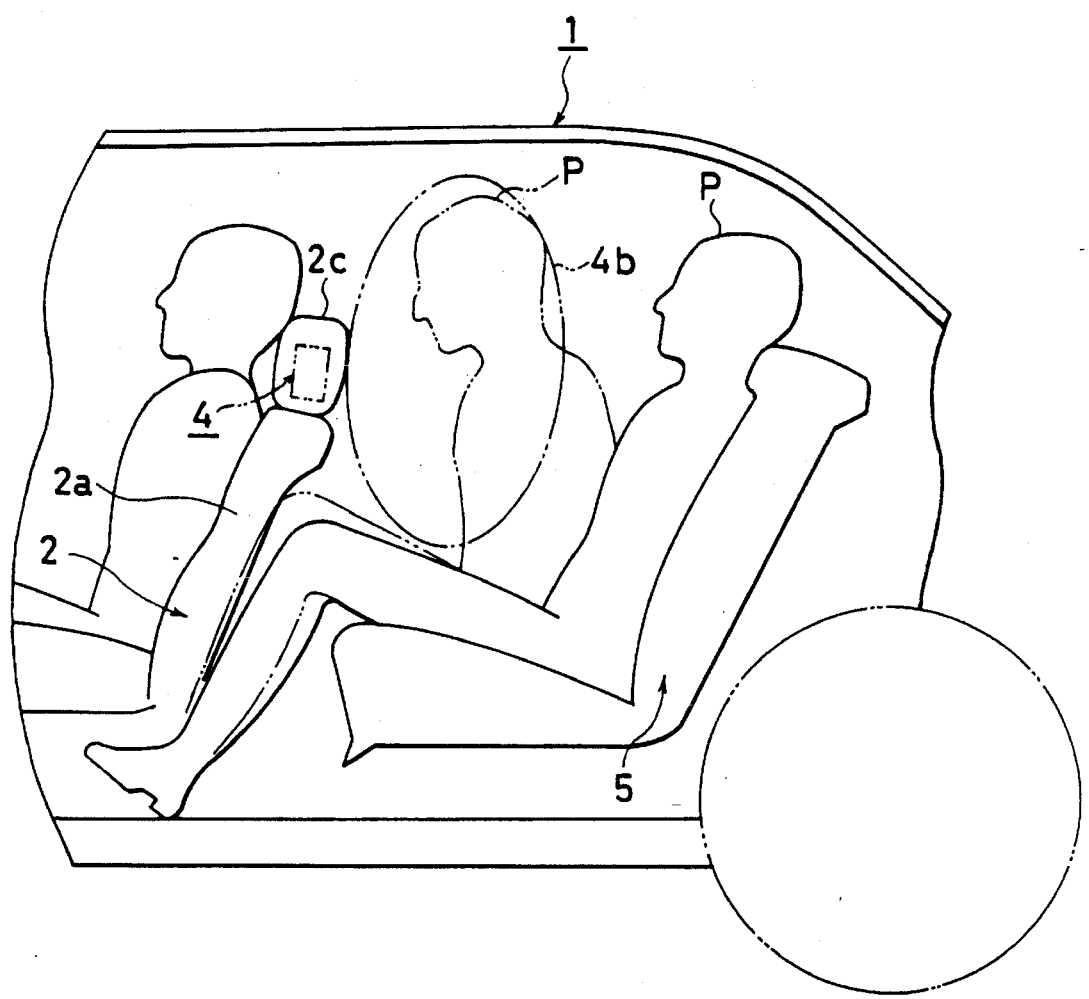

As shown in FIG. 8, the air bag unit 4 is mounted to the head rest 2c of the front seat 2 so that the expanded air bag 4b receives the head and the chest of the passenger seated on the rear seat 5, as indicated by the phantom line, thereby confining the passenger seated on the rear seat 5 in a restricted space apart between an outer surface of the expanded air bag 4b and the rear seat 5 to protect the passenger seated on the rear seat 5 against a shock caused by a car crash and suspending the rear seat passenger from jumping off forwards due to impact or shock upon a car crash.

The air bag units 4 may be exchanged by detaching the head rest 2c from the front seat 2 and mounting a new head rest 2c with a fresh air bag unit 4 mounted thereto to the front seat 2 or merely by exchanging only the old air bag unit 4 for a new one for the head rest 2c detached from the front seat 2.

In the embodiment as described hereinabove, the air bag unit 4 for the passenger seated on the rear seat 5 is mounted to the head rest 2c mounted detachably to the front seat 2, so that the air bag units 4 can be exchanged for each other with ease and at cheap costs. Further, the air bag 4b of the air bag unit 4 mounted to the head rest 2c is developed to expand toward the chest portion of the rear seat passenger, so that this arrangement is superior in performance in confining the passenger seated on the rear seat, i.e. protection performance for the rear seat passenger.

Figure 9:
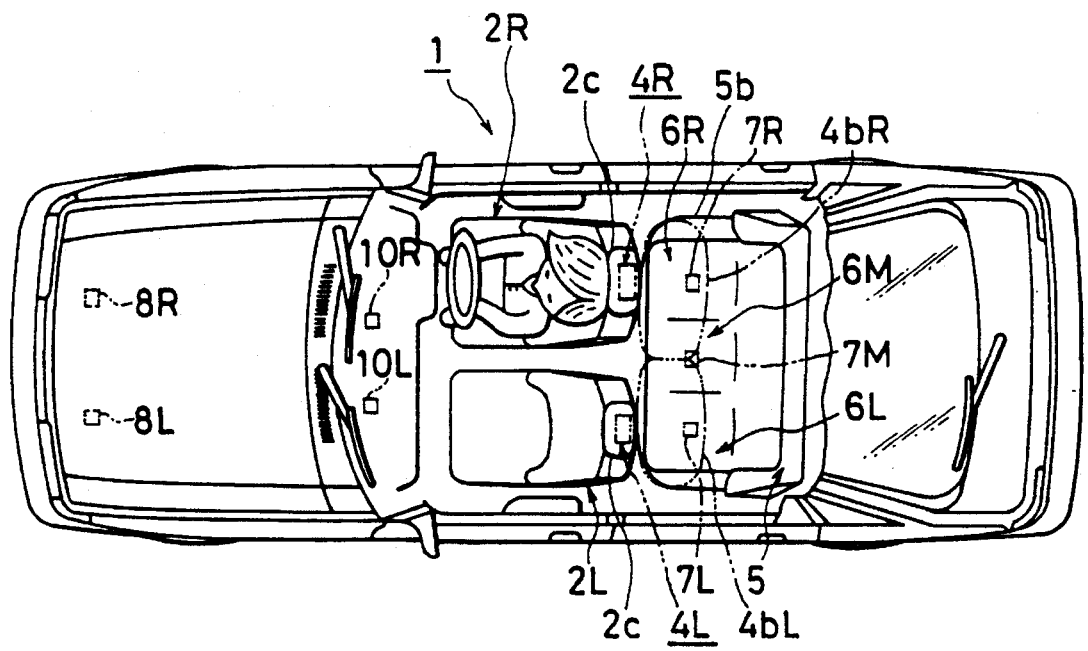

The drawings at FIGS. 9 et seq are directed to other embodiments in which the same elements are provided with the same reference numerals, and description of the same elements will be omitted from the following explanation in which description is restricted to characteristic portions for the other embodiments.

SECOND EMBODIMENT (FIGS. 9 to 11):

In this embodiment, the rear seat 5 is of such a bench type as allowing three passengers to be seated and it is provided with a middle seat section 6M interposed between the right-hand seat section 6R and the left-hand seat section 6L, as shown in FIG. 9. A middle seat sensor 7M is embedded in a nearly middle position of the middle seat section 6M, in addition to the right-hand seat sensor 7R embedded in the right-hand seat section 6R and the left-hand seat sensor 7L embedded in the left-hand seat section 6L.

As shown in FIG. 9, each of the right-hand air bag 4bR and the left-hand air bag 4bL is designed to be expanded toward the middle portion of the rear seat 5, too, thereby allowing a center left surface of the right-hand air bag 4bR to come into abutment with a center right surface of the left-hand air bag 4bL and as a consequence protecting even the passenger seated on the middle seat section 6M of the rear seat 5 when expanded due to impact or shock upon a car crash.

As is readily understood to those skilled in the art pertinent to the present invention, the right-hand and left-hand air bags 4bR and 4bL can be adjusted so as to confine all the passengers seated on the right-hand, left-hand and middle seat sections 6R, 6L and 6M at almost the same time, respectively, for example, by adjusting a distribution of pressures of the right-hand and left-hand air bags 4bR and 4bL upon expansion by a speed and a quantity of blowing gases from the inflator 4a or by adjusting shapes of the first perforations 22d and the second perforations 29a.

Figure 10:
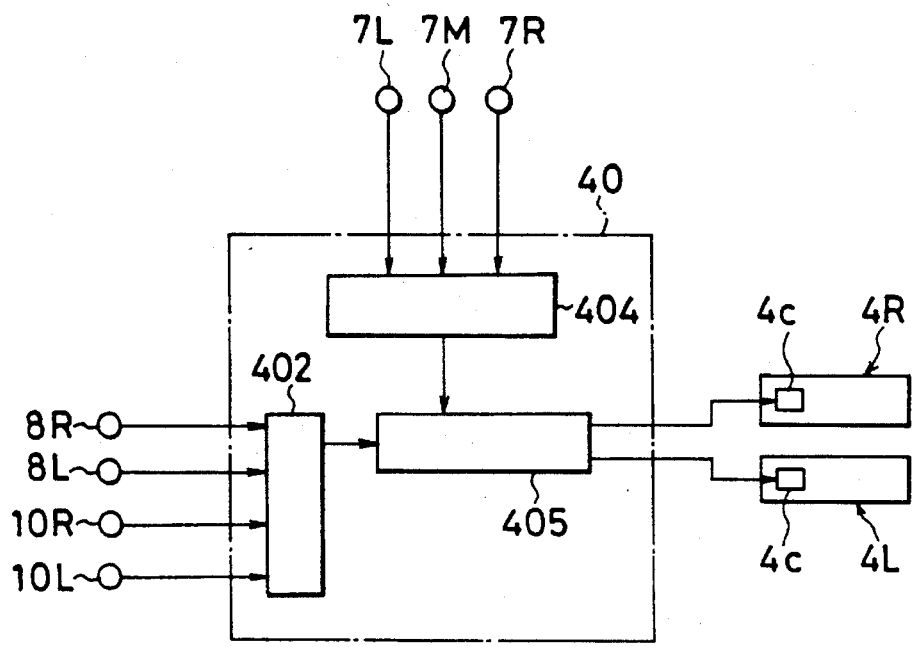

In the second embodiment, as shown in FIG. 10, signals are entered into the control unit 40 from the seat sensors 7 (7R, 7L and 7M), 8 (8R and 8L) and 10 (10R and 10L). The control unit 40 has second passenger determining means 404, the impact determining means 402 and second explosion controlling means 405.

The second passenger determining means 404 is to determine if the right-hand seat section 6R, the middle seat section 6M and/or the left-hand seat section 6L of the rear seat 5 are/or is occupied by the passenger or passengers, in response to the signals from the seat sensors 7R, 7M and 7L, respectively. The second explosion controlling means 405 is to generate an explosion signal to the ignition unit 4c for the right-hand and left-hand air bag unit 4R and/or 4L upon a car crash in response to the signals from the second passenger determining means 401 and the impact determining means 402.

Brief description will be made of the contents of the control by the control unit 40. When all the three seat sections 6R, 6M and 6L of the rear seat 5 are occupied by three passengers, the right-hand and left-hand air bag units 4R and 4L are developed to expand to protect all the three passengers from the impact or shock upon a car crash. When the passenger is seated on the right-hand seat section 6R and both of the middle seat section 6M and the left-hand seat section 6L are vacant, the right-hand air bag unit 4R only is developed to expand while maintaining the left-hand air bag unit 4L in an inoperative state even in case of a car crash. Likewise, when the passenger is seated on the left-hand seat section 6L and no passenger is seated on the middle and right-hand seat sections 6M and 6R, respectively, the left-hand air bag unit 6L only is developed to expand upon a car crash while the right-hand air bag unit 6R is kept in its inoperative state. Further, when the middle seat section 6M only is occupied by the passenger, both of the right-hand and left-hand air bag units 6R and 6L are developed to expand to protect the passenger seated on the middle seat section 6M of the rear seat 5.

Figure 11:
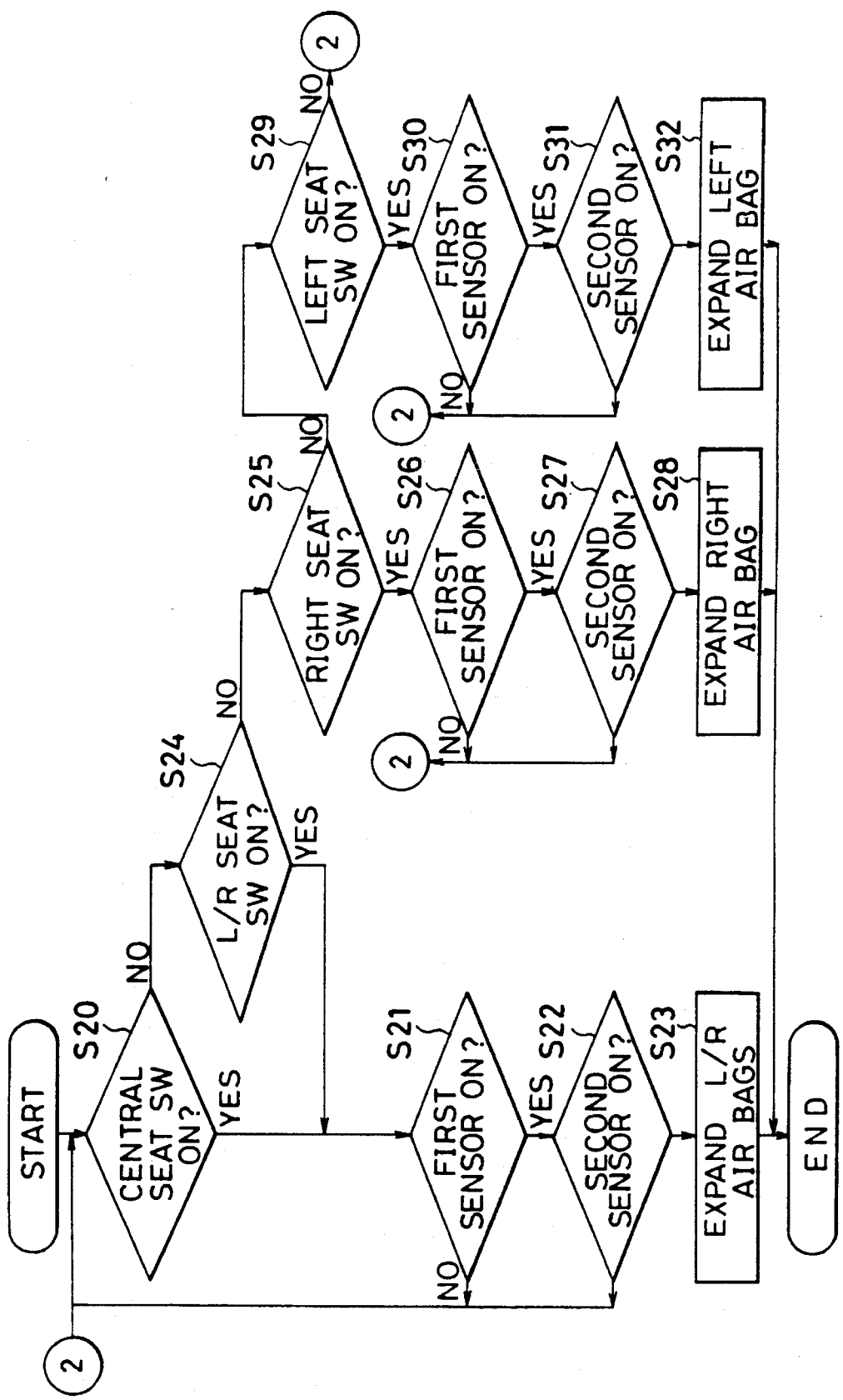

Given the foregoing, an example of the contents of control by the control unit 40 with reference to the flow chart as shown in FIG. 11.

First, at step S20, a decision is made to determine if the middle seat sensor 7M is turned on. When it is decided at step S20 that the middle seat sensor 7M is turned on, it is determined that the passenger is seated on the middle seat section 6M, followed proceeding to step S21 at which a further decision is made to determine if the first impact sensors 8 are turned on. When the result of decision at step S21 indicates that the first impact sensors 8 are turned on, then the program flow goes to step S22 at which it is further decided to determine if the second impact sensors 10 are turned on. When it is decided at both of steps S21 and S22 that both of the first and second impact sensors 8 and 10 are turned on, it is determined that a car crash has occurred, followed by proceeding to step S23 at which explosion signals are transmitted to both of the right-hand and left-hand air bag units 4R and 4L and the air bags 4b of the respective air bag units 4R and 4L are developed to expand, resulting in protection of the passengers seated on the respective rear seats 5.

On the other hand, the result of decision at step S20 indicates that the middle seat sensor 6M is turned off, followed by proceeding to step S24 at which a decision is made to determine if both of the right-hand seat sensor 7R and the left-hand seat sensor 7L are turned on. When it is decided at step S24 that both of the right-hand and left-hand seat sensors 7R and 7L are turned on, it is determined that two passengers are seated on the right-hand seat section 6R and the left-hand seat section 6L, respectively, then the program flow goes to step S21 at which a decision is made to determine if the first impact sensors 8 are turned on. When the result of decision at step S21 indicates that the first impact sensors 8 are turned on, then the program flow goes to step S22 at which it is further decided to determine if the second impact sensors 10 are turned on. When it is decided at both of steps S21 and S22 that both of the first and second impact sensors 8 and 10 are turned on, it is determined that a car crash has occurred, followed by proceeding to step S23 at which explosion signals are transmitted to both of the right-hand and left-hand air bag units 4R and 4L and the air bags 4b of the respective air bag units 4R and 4L are developed to expand, resulting in protection of the passengers seated on the respective rear seats 5. On the other hand, when the results of decision at steps S21 and S22 indicate that both of the first and second impact sensors 8 and 10, respectively, are not turned on, then the program flow goes back to step S20.

When the result of decision at step S20 indicates that both of the right-hand and left-hand seat sensors 7R and 7L are not turned on, then the program flow goes to step S25 at which a decision is made to determine if the right-hand seat sensor 7R is turned on. If it is decided at step S25 that the right-hand seat sensor 7R is turned on, a further decision is made at step S26 to determine if the first impact sensors 8 are turned on, followed by proceeding to step S27 when a decision is made to determine if the second impact sensors 10 are turned on. When the result of decision at step S27 is in the affirmative, i.e. when it is decided at step S27 that the second impact sensors 10 are turned on, it is determined that a car crash has occurred, followed by proceeding to step S28 at which the control unit 40 transmits an explosion signal to the right-hand air bag unit 4R only and the right-hand air bag 4b for the right-hand air bag unit 4R is developed to expand toward the passenger seated on the right-hand rear seat 5R. When the results of decision at step S26 and step S27 indicates that neither the first impact sensors 8 nor the second impact sensors 10 are turned on, then the program flow goes back to step S20. It is to be noted, however, that the left-hand air bag unit 4L is kept in an inoperative state even if a car crash has occurred and the air bag 4b of the right-hand air bag unit 4R had been expanded.

On the other hand, when it is decided at step S25 that the right-hand seat sensor 7R is turned off, then the program flow goes to step S29 at which a further decision is made to determine if the left-hand seat sensor 7L is turned on. When it is decided at step S29 that the left-hand seat sensor 7L is turned on, it is determined that the passenger is seated on the left-hand rear seat 5L, followed by proceeding to step S30 and then to step S31. If the results of decision at steps S30 and S31 indicate that both of the first impact sensors 8 and the second impact sensors 10 are turned on, respectively, it is then determined that a car crash has occurred, followed by proceeding to step S32 at which an explosion signal is transmitted to the left-hand air bag unit 4L only. Then, the air bag 4b of the left-hand air bag unit 4L is developed to expand toward the passenger seated on the left-hand rear seat 5L in response to the explosion signal. When the results of decision at step S30 and step S31 indicate that the first and second impact sensors 8 and 10, respectively, are turned off, then the program flow goes back to step S20. In this case, the right-hand air bag unit 4R is kept in an inoperative state even if a car crash has been caused and the air bag 4b of the left-hand air bag unit 4L had been expanded.

THIRD EMBODIMENT (FIGS. 12 to 17)

Figure 12:
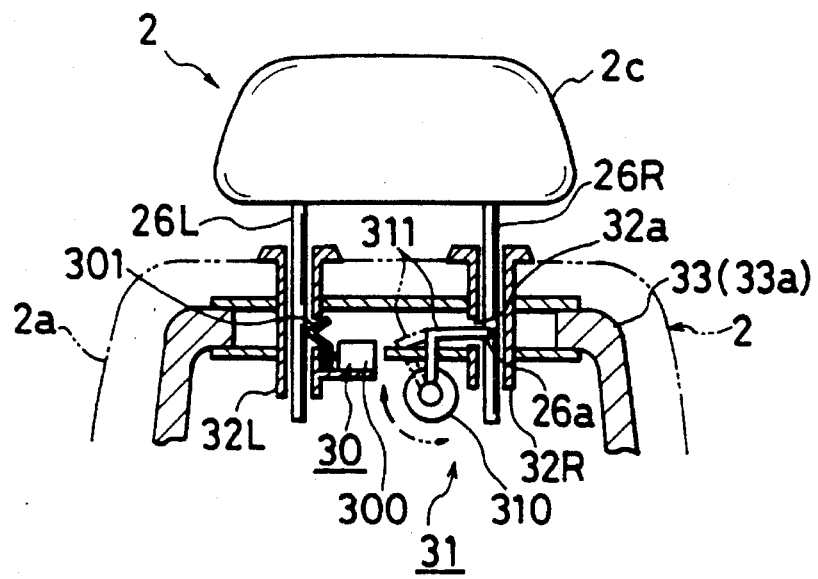

In the third embodiment of the present invention, the seat back 2a of the front seat 2 is provided with a head rest switch 30 and locking means 31 as shown in FIG. 12. The head rest switch 30 is arranged to be turned on when the head rest 2c is mounted to the seat back 2a. The locking means 31 is to lock or fix the head rest 2c to the seat back 2a in a manner as will be described hereinafter, in order to make the head rest 2c undetachable from the seat back 2a.

The head rest 2c of the front seat 2 is arranged in such a manner that right-hand and left-hand head rest polls 26R and 26L are inserted into right-hand and left-hand cylindrical guides 32R and 32L disposed in the seat back 2a, respectively, and that the right-hand and left-hand cylindrical guides 32R and 32L are secured to a seat frame 33. The head rest switch 30 is mounted to the left-hand cylindrical guide 32L while the locking means 31 is mounted to the right-hand cylindrical guide 32R.

Figure 13:
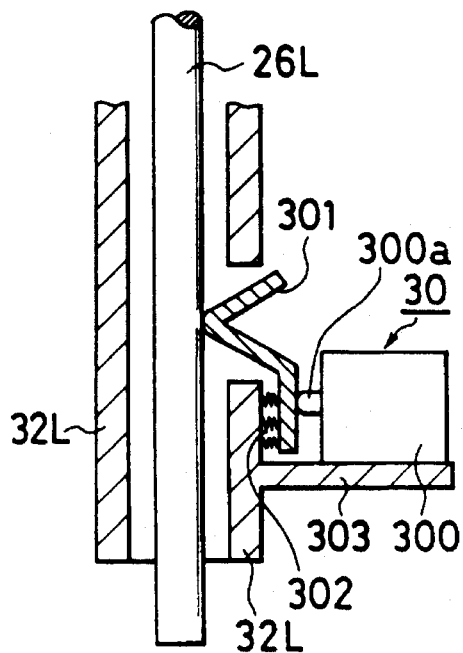

Head rest switch 30 (FIGS. 12 and 13)

The head rest switch 30 comprises a switch body 300, a contact 301 and a tension spring 302 biasing the contact 301 in the direction in which the contact 301 is abutted with the left-hand head rest poll 26L. The switch body 300 is mounted to the left-hand cylindrical guide 32L through a bracket 303.

When the left-hand head rest poll 26L is inserted into the left-hand cylindrical guide 32L and mounted to the head rest 2c, the contact 301 is biased to the right in resistance to the spring force of the tension spring 302, thereby pushing a knob 300a of the switch body 300 to turn the head rest switch 30 on. On the other hand, when the head rest poll 26L is pulled from the left-hand cylindrical guide 32L and detached from the head rest 2c, the contact 301 is allowed to bias to the left by the spring force of the tension spring 302, thereby spacing the contact 301 apart from the knob 300a of the switch body 300 and turning the head rest switch 30 off.

Locking means 31 (FIG. 12)

The locking means 31 has an actuator 310 secured to the seat frame 33. The actuator 310 has a pivotable arm 311 whose top portion extends through a cut-away portion 32a of the right-hand cylindrical guide 32R to face a side surface of the right-hand head rest poll 26R. On the other hand, the right-hand head rest poll 26R is provided with an engageable groove 26a on its side surface to be engageable with the top portion 32a of the right-hand cylindrical guide 32R. More specifically, when the pivotable arm 311 pivots on the actuator 310 in the clockwise direction in the drawing and the top of the pivotable arm 311 is allowed to engage with the cut-away groove 26a formed on the side surface of the right-hand head rest poll 26R, the pivotable arm 311 suppresses the right-hand head rest poll 26R from moving in the vertical direction, thereby allowing the head rest 2c to be undetachable from the seat back 2a. Hence, the head rest 2c is locked and secured to the seat back 2a of the front seat 2. On the other hand, when the pivotable arm 311 is caused to pivot on the actuator 310 in the counterclockwise direction in the drawing, the top of the pivotable arm 311 is allowed to be disengaged from the cut-away portion 26a of the right-hand head rest poll 26R and the right-hand head rest poll 26R is allowed to move in the vertical direction, thereby releasing the locking means 31 and making the head rest 2c detachable from the seat back 2a.

Figure 14:
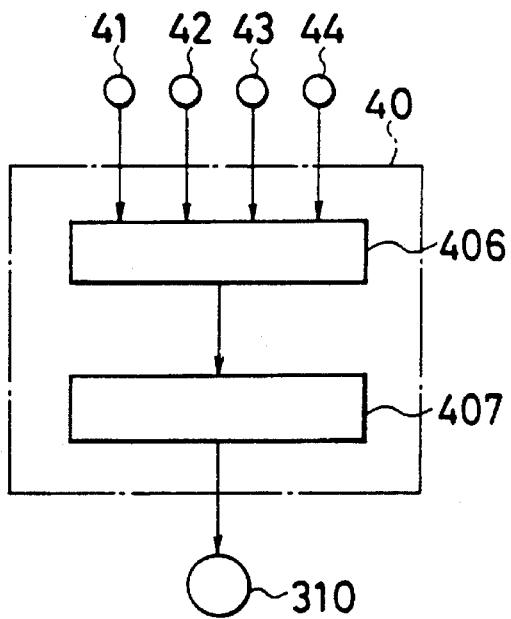

The actuator 310 is operated on the basis of control signals from the control unit 40 as shown in FIG. 14.

Entered into the control unit 40 are signals from a sensor 41 and switches 42 to 44, inclusive. The sensor 41 is a vehicle speed sensor for sensing a vehicle speed of the automotive vehicle. The switch 42 is a range P switch for generating an ON signal when a shift lever (not shown) of an automatic transmission of the automotive vehicle is shifted to a range P. The switch 43 is an ignition key switch for generating an ON signal when an ignition key is turned on. The switch 44 is a parking brake switch for generating an ON signal when a parking brake is brought into a coupled state, i.e. when a parking lever is pulled up.

The control unit 40 comprises suspended-state detecting means 406 and lock controlling means 407. The suspended-state detecting means 406 is to detect a suspended state of the automotive vehicle in response to the signals from the vehicle speed sensor 41 and the switches 42 to 44. The lock controlling means 407 is to release or unlock the lock of the head rest 2c by the locking means 31 when the automotive vehicle is suspended, on the one hand, and to lock the head rest 2c by the locking means 31 when the internal combustion engine of the automotive vehicle is operated, on the other hand, in response to a signal from the suspended-state state detecting means 406.

Figure 15:
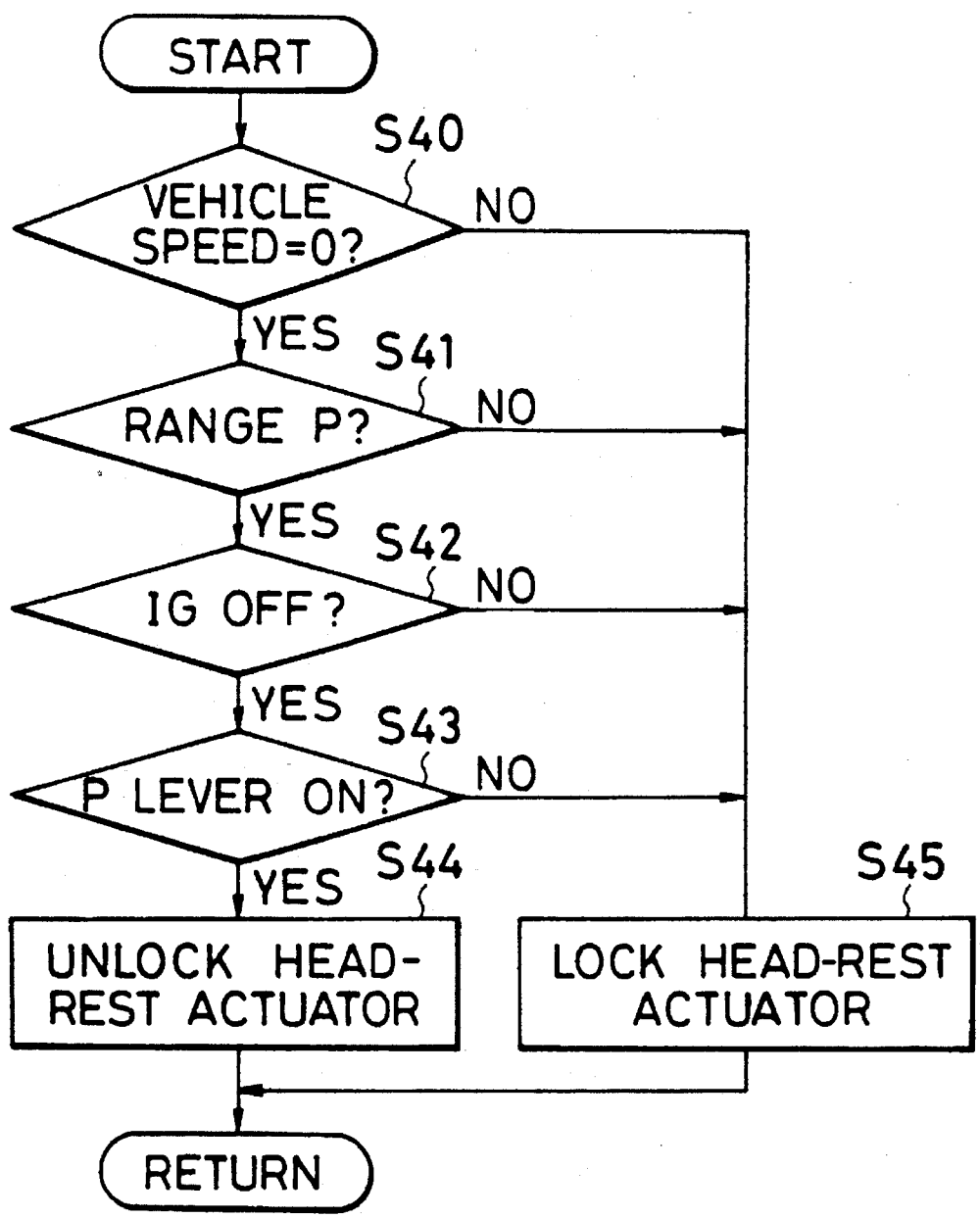

Referring now to the flow chart as shown in FIG. 15, description will be made of an example of the control of the locking means 31 by the control unit 40.

The locking means 31 is unlocked when the vehicle speed of the automotive vehicle is found zero, the shift lever is shifted to the range P, the ignition key is turned off, and the parking brake is coupled. More specifically, first, at step S40, a decision is made to determine if the vehicle speed sensed by the vehicle speed sensor 41 is zero. When it is decided at step S40 that the vehicle speed is zero, then the program flow goes to step S41 at which a decision is made to determine if the range P sensor 42 is turned on. When the shift lever is shifted to the range P and it is determined at step S41 that the range P sensor 42 is turned on, then the program flow goes to step S42 at which it is further decided to determine if the ignition key sensor 43 is turned on. When it is determined by a decision at step S42 that the ignition key is turned on, it is further decided at step S43 to determine if the ON signal is entered from the parking (P) brake switch. When the result of decision at step S43 indicates that the parking brake is coupled, then the program flow goes to step S44 at which the locking means 31 is unlocked to release the engagement of the pivotable arm 311 of the actuator 310 with the cut-away groove 26a of the right-hand head rest poll 26R.

On the other hand, the locking means 31 is locked when either one of the aforesaid four conditions to be determined is decided in the negative. In other words, when the decision at either one of steps S40, S41, S42 and S43 indicates the negative result, then the program flow goes to step S45 at which the locking means 31 is locked to engage the pivotable arm 311 of the actuator 310 with the cut-away groove 26a of the right-hand head rest poll 26R, thereby allowing the head rest 2c to be undetachable from the seat back 2a of the front seat 2.

Figure 16:
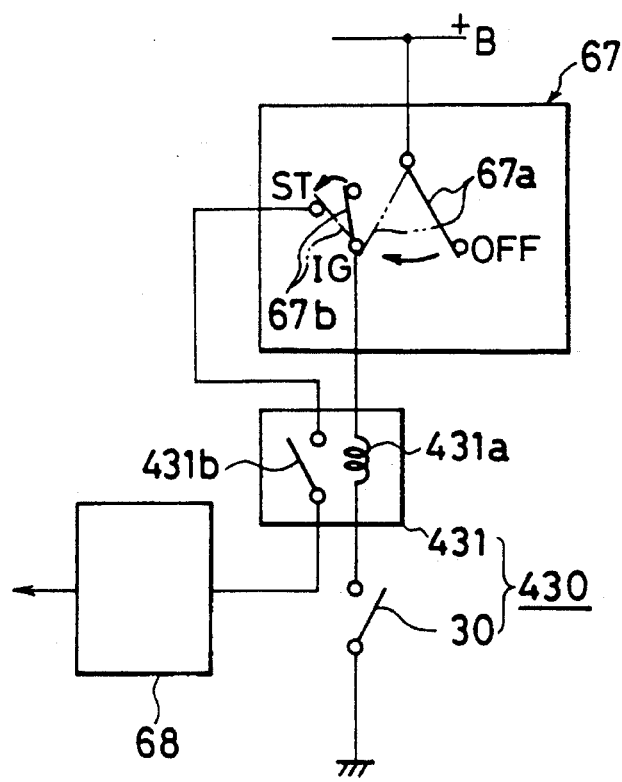

As shown in FIG. 16, the head rest switch 30 constitutes part of drive inhibiting means 430. A starter relay 431 is interposed between the ignition key switch 67 (specifically, an IG switch 67a) and a starter 68 and has an exciting coil 431a of the starter relay 431 connected to the head rest switch 30.

When the IG switch 67a is turned on in such a state that the head rest switch 30 is being turned on, on the one hand, the exciting coil 431a of the starter relay 431 is excited and a contact 431b is connected. Hence, when a starter switch 67b is turned on, electricity is applied to the starter 68 to start up the internal combustion engine. On the other hand, when the head rest switch 30 is turned off, the excitation coil 431a is not excited even if the IG switch 67a is turned on. Hence, the contact 431b is not coupled to connect the starter switch 67b to the starter 68 so that no electricity is applied to the starter 68 even if the starter switch 67b would be turned on, thereby inhibiting the start-up of the internal combustion engine.

Figure 17:
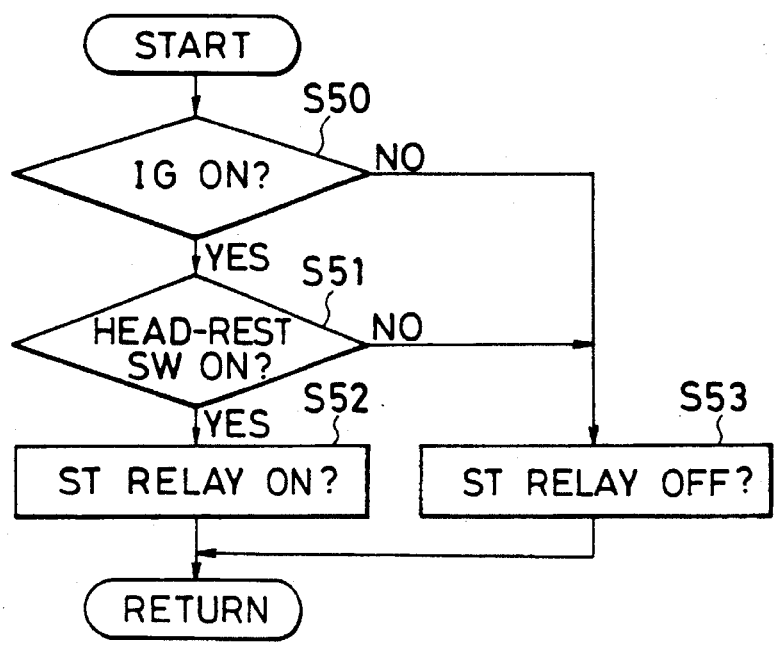

Now, description will be made of the control over the starter 68 for starting up the internal combustion engine by the control unit 40 with reference to the flow chart as shown in FIG. 17.

First, at step S50, a decision is made to determine if the IG switch 67a is turned on. When it is decided at step S50 that the IG switch 67a is turned on, then the program flow goes to step S51 at which it is decided to determine if the head rest switch 30 is turned on. When the result of decision at step S51 indicates that the head rest switch 30 is turned on, the starter relay 431 is turned on at step S52, thereby allowing the starter relay 431 to be connected to the starter switch 67b. On the other hand, when it is decided at step S51 that the head rest switch 30 is turned off, then the program flow goes to step S53 at which the starter relay 431 is also turned off, thereby disconnecting the starter relay 431 from the starter 68 and bringing the internal combustion engine into a state that the internal combustion engine cannot be started up.

In this embodiment, when the automotive vehicle is not in a state in which the internal combustion engine is suspended, for example, when the IG switch 67a is turned on, the locking means 31 is in such a locked state that the head rest 2c cannot be detached from the seat back 2a of the front seat 2. In other words, for example, when the IG switch 67a is turned off and the internal combustion engine is not operated, the locking means 31 is unlocked to thereby allow the head rest 2c to be detached from the seat back 2a of the front seat 2. Hence, the air bag unit 4 may be exchanged for a new one, for example, by turning the IG switch 67a off.

Further, it is noted that the starter 68 becomes ready for start-up for the first time when the head rest 2c is mounted to the seat back 2a of the front seat 2, so that the internal combustion engine can first be started up, for example, when the head rest 2c has been mounted to the seat back 2a thereof after exchanges of air bag units 4. In other words, as the internal combustion engine cannot be started up in such a state that the head rest 2c is detached from the seat back 2a thereof, it can be noted that the head rest 2c with the air bag unit 4 mounted therein is always mounted to the seat back 2a of the front seat 2 during driving the automotive vehicle, thereby ensuring protection of the passenger or passengers seated on the rear seat against impact or shock upon a car crash.

FOURTH EMBODIMENT (FIGS. 18 to 27)

Figure 18:
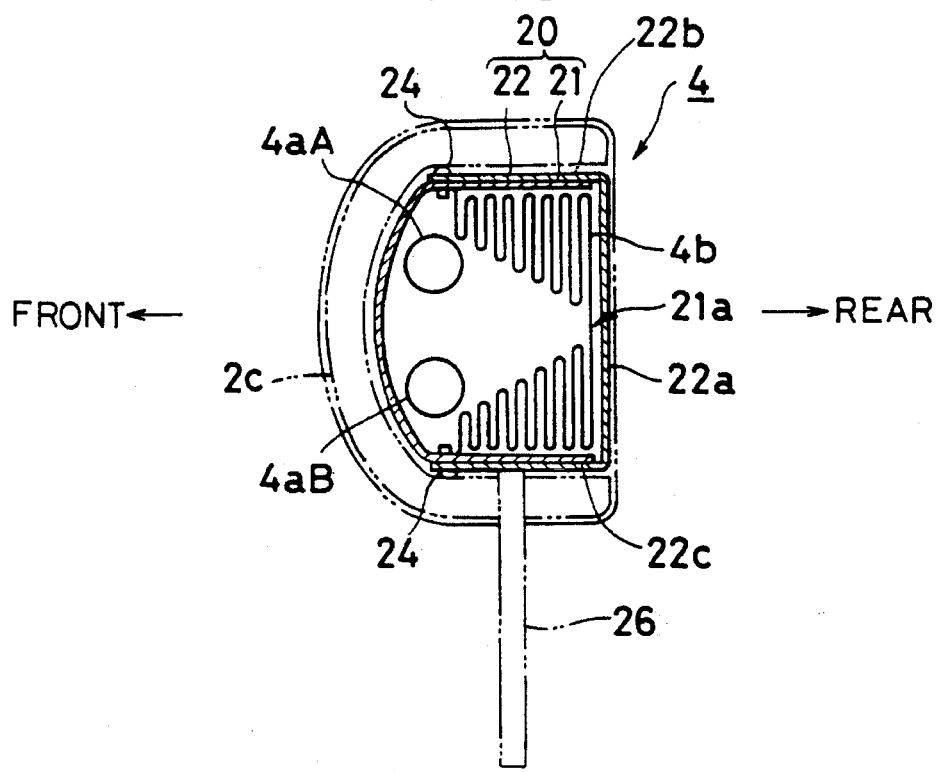
Figure 19:
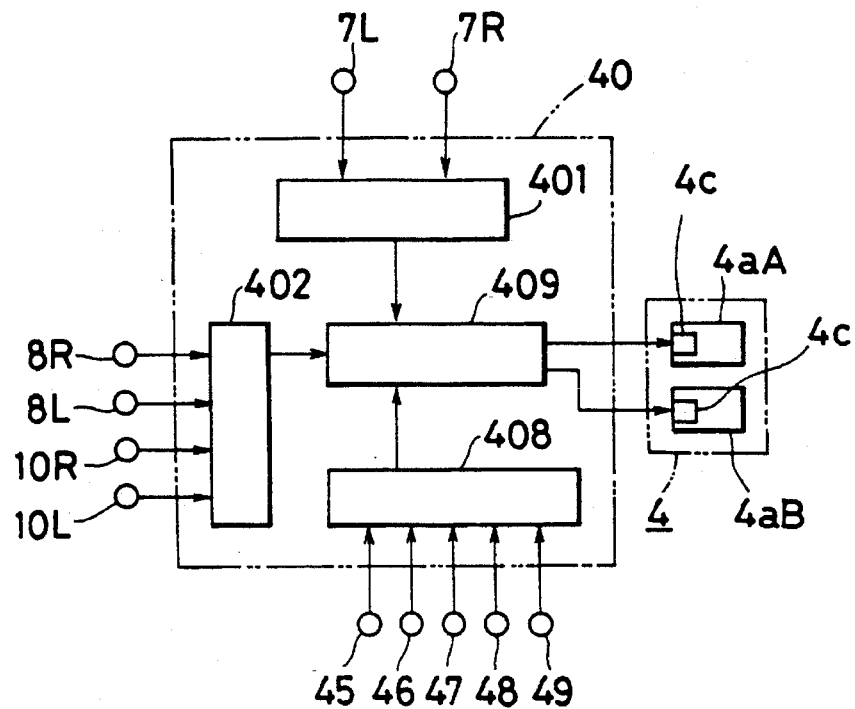

In this embodiment of the present invention, as shown FIG. 18, the air bag control unit 4 comprises two inflators disposed in a vertically spaced relationship, i.e. an upper inflator 4aA and a lower inflator 4aB. As shown in FIG. 19, the control unit 40 has seat status-detecting means 408 for detecting the status of the front seat 2 in response to signals from sensors 45 to 49, inclusive.

Figure 20:
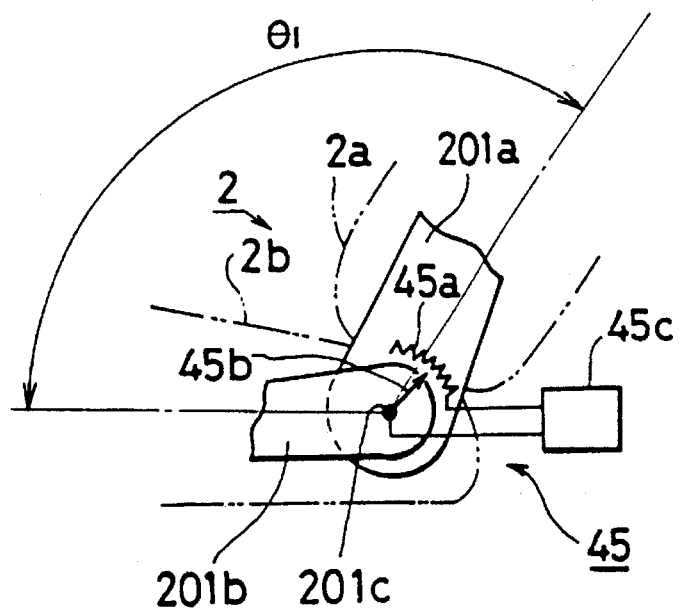

Sensor 45:

FIG. 20 shows the action and structure of the sensor 45 that senses a reclined angle 81 of the seat back 2a of the front seat 2. The sensor 45 comprises a resistance 45a, a movable terminal 45b and a resistance detector 45c.

The sensor 45 is mounted to a seat frame 201 of the front seat 2, which comprises an upper seat frame 201a constituting the framework of the seat back 2a of the front seat 2 and a lower seat frame 201b constituting the framework of the seat cushion 2b thereof. The upper seat frame 201a is disposed so as to pivot on the lower seat frame 201b about a support axis 201c. The movable terminal 45b is secured to the support axis 201c so as to be associated with a pivotal movement of the support axis 201c. On the other hand, the resistance 45a is mounted to the upper seat frame 201a and extends along the circumference of a circle having the support axis 210c as the center of the circle.

This arrangement changes the point of contact of the movable terminal 45b with the resistance 45a in accordance with the reclined angle of the seat back 2a, thereby changing the value of resistance. This value of resistance is read by the resistance detector 45c and the resistance detector 45c generates a signal indicative of the reclined angle 81 of the seat back 2a of the front seat 2 to the control unit 40.

Figure 21:
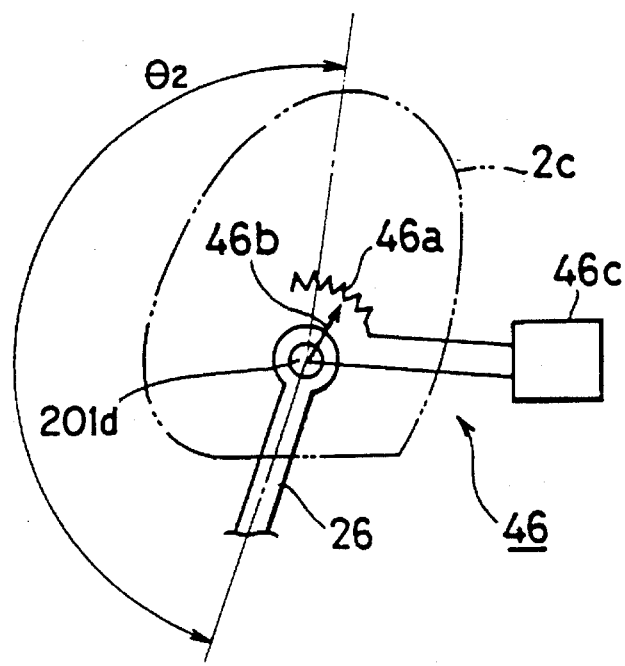

Sensor 46:

The sensor 46 is to sense an inclined or reclined angle 82 of the head rest 2c. FIG. 21 shows the sensor 46 which comprises a resistance 46a, a movable terminal 46b and a resistance detector 46c.

As shown in FIG. 21, the head rest 2c has a support axis 201d mounted so as to be pivotable on the head rest poll 26. The movable terminal 46b is secured to the support axis 201d so as to be associated with a pivotal movement of the support axis 201d. On the other hand, the resistance 46a is mounted to the head rest 2c and extends along the circumference of a circle having the support axis 201d as the center of the circle.

This arrangement changes the point of contact of the movable terminal 46b with the resistance 46a in accordance with the inclined or reclined angle of the head rest 2c, thereby changing the value of resistance. This value of resistance is read by the resistance detector 46c and the resistance detector 46c generates a signal indicative of the inclined or reclined angle θ2 of the head rest 2c of the front seat 2 to the control unit 40.

Figure 22:
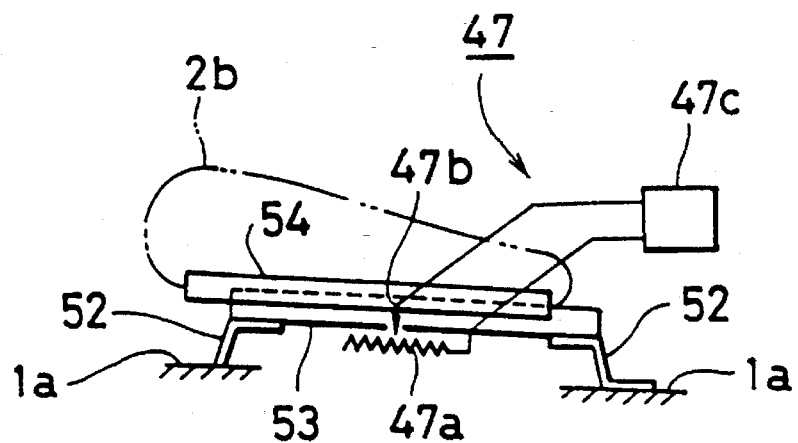

Sensor 47:

The sensor 47 is to sense a longitudinal position of the front seat 2 at which the front seat 2 is located in the longitudinal direction of the automotive vehicle. FIG. 22 shows the sensor 47 which comprises a resistance 47a, a movable terminal 47b and a resistance detector 47c.

The resistance 47a of the sensor 47 is mounted to a lower rail 53 which in turn is mounted through a bracket 52 to a floor 1a of the vehicle body and to which an upper rail 54 is mounted so as to move slidably along the lower rail 53. The resistance 47a extends in the longitudinal direction of the automotive vehicle and the movable terminal 47b is mounted to the upper rail 54 and is so arranged as to move longitudinally together with the upper rail 54, that is, together with the seat cushion 2b of the front seat 2 which in turn is mounted to the upper rail 54 through a link 55.

This arrangement changes the point of contact of the movable terminal 47b with the resistance 47a in accordance with a quantity in which the seat cushion 2b slides in the longitudinal direction of the vehicle body, thereby changing the value of resistance. This value of resistance is read by the resistance detector 47c and the resistance detector 47c generates a signal indicative of the longitudinal position of the front seat to the control unit 40.

Figure 23:
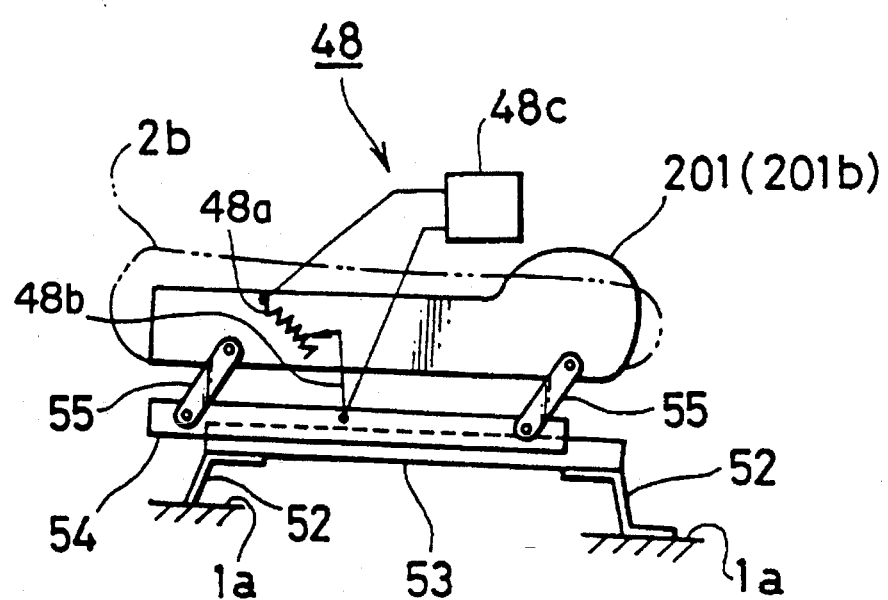

Sensor 48:

The sensor 48 is to sense the vertical position of the front seat 2. FIG. 23 shows the sensor 48 which comprises a resistance 48a, a movable terminal 48b and a resistance detector 48c.

As described hereinabove, the lower seat frame 201b for the front seat 2 is mounted to the upper rail 54 through the link 55, thereby permitting the adjustment of the vertical position of the front seat. The resistance 48a is mounted to the lower seat frame 201b and the movable terminal 48b is mounted to the upper rail 54.

This arrangement changes the point of contact of the movable terminal 48b with the resistance 48a in accordance with the vertical position of the front seat 2, thereby changing the value of resistance. This value of resistance is read by the resistance detector 48c and the resistance detector 48c generates a signal indicative of the vertical position of the front seat 2 to the control unit 40.

Figure 24:
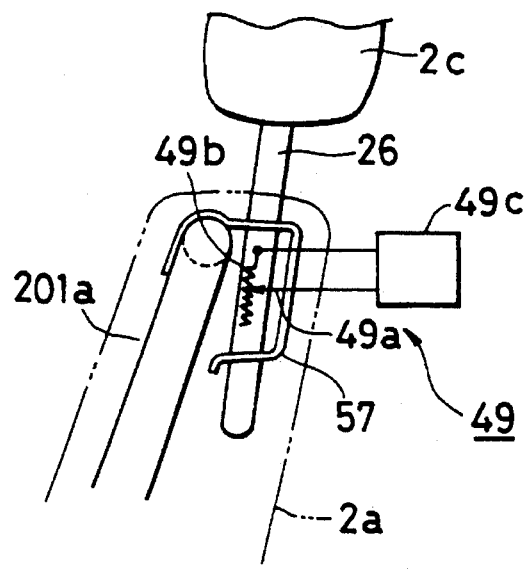

Sensor 49:

The sensor 49 is arranged to sense the vertical position of the head rest 2c of the front seat 2. FIG. 24 shows the sensor 49 which comprises a resistance 49a, a movable terminal 49b and a resistance detector 49c.

The head rest 2c is mounted to the upper seat frame 201a for the seat back 2a through a bracket 57 so as to move in the vertical direction with respect to the bracket 57, thereby permitting the adjustment of the vertical position of the head rest 2c. The resistance 49a is mounted to the head rest poll 26 and the movable terminal 49b is mounted to the bracket 57.

This arrangement changes the point of contact of the movable terminal 49b with the resistance 49a in accordance with the vertical position of the head rest 2c, thereby changing the value of resistance. This value of resistance is read by the resistance detector 49c and the resistance detector 49c generates a signal indicative of the vertical position of the head rest 2c to the control unit 40.

As shown in FIG. 19, the seat status-determining means 408 of the control unit 40 is arranged to determine the status of the front seat 2 in response to the signals from the sensors 45 to 49, inclusive, and generates a signal indicative of the status of the front seat 2 to third explosion controlling means 409. The third explosion controlling means 409 is arranged to operate one or both of the upper and lower inflators 4aA and 4aB, thereby allowing the air bag 4b to expand in accordance with the status of the front seat 2.

Brief description will now be made of the control by the control unit 40.

Figure 25:
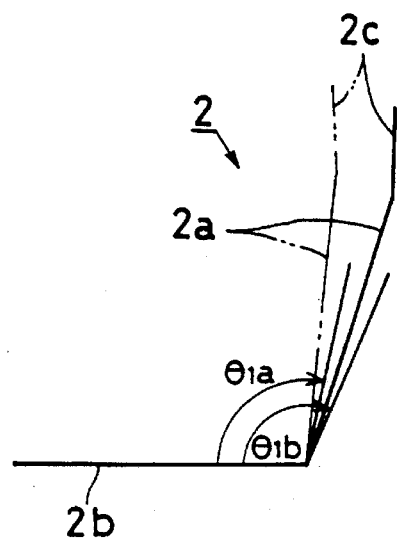

It is determined that the air bag control unit 4 is located in the appropriate position with respect to the passenger or passengers seated on the rear seat or rear seats, when the reclined angle θ1 of the seat back 2a of the front seat 2 is positioned within a predetermined angle range, i.e. when the seat back 2a is located in an angle range between an angle θ1a and an angle θ1b, as indicated by the solid lines in FIG. 25.

When the reclined angle θ1 of the seat back 2a is determined to be smaller than the angle θ1a as shown in FIG. 25, i.e. when the seat back 2a is in an erect state as indicated by the phantom line in FIG. 25, the air bag control unit 4 is positioned facing upwards with respect to a normal position, i.e. with respect to the passenger seated on the rear seat. When both of the inflators 4aA and 4aB are operated in such a state that the seat back 2a is erected, the air bag 4b is likely to expand upward with respect to the normal position. Hence, when the seat back 2a is erected, only the lower inflator 4aB is arranged so as to be operated while inhibiting the operation of the upper inflator 4aA, thereby turning the air bag 4b downward to a slight extent and expanding it in the position appropriate for confining the passenger seated on the rear seat.

Conversely, when the reclined angle θ1 of the seat back 2a is larger than the angle θ1b as shown in FIG. 25, that is, when the seat back 2a is in a rearward reclined state, the air bag control unit 4 is positioned facing downward with respect to the normal position, i.e. with respect to the passenger seated on the rear seat. When both of the upper inflator 4aA and the lower inflator 4aB are operated to expand the air bag 4b in such a state that the front seat back 2a is reclined rearward, the air bag 4b is likely to expand downward with respect to the passenger seated on the rear seat. Hence, when the seat back 2a of the front seat 2 is in a rearward reclined state, only the upper inflator 4aA is operated, while inhibiting the operation of the lower inflator 4aB, so as to expand the air bag 4b upwards, thereby expanding the air bag 4b in the position appropriate for confining the passenger seated on the rear seat.

The head rest 2c is controlled in substantially the same manner as the seat back 2a is, in order to expand the air bag 4b in the position appropriate for confining the passenger seated on the rear seat.

Referring back to FIG. 21, it is determined that the air bag control unit 4 is located in the appropriate position with respect to the passenger seated on the rear seat when the head rest 2c of the front seat 2 leans at the angle θ2 within a predetermined range. In this case, both of the upper and lower inflators 4aA and 4aB are operated.

More specifically, when the angle θ2 at which the head rest 2c leans is smaller than a predetermined value, on the one hand, it is determined that the air bag control unit 4 faces upwards with respect to the passenger seated on the rear seat, thereby operating the lower inflator 4aB only while inhibiting the operation of the upper inflator 4aA. This arrangement can expand the air bag 4b in the downward direction to thereby allow the passenger seated on the rear seat to be confined in the appropriate position by the expanded air bag 4b.

On the other hand, when the head rest 2c leans at the angle θ2 larger than the predetermined value, it is determined that the air bag control unit 4 is positioned facing downward with respect to the passenger seated on the rear seat, so that the upper inflator 4aA only is operated while the operation of the lower inflator 4aB is inhibited, thereby allowing the air bag 4b to be developed to expand in an upward direction and as a consequence confining the passenger seated on the rear seat in an appropriate fashion by the expansion of the air bag 4b.

It is further noted that the direction in which the air bag 4b is developed to expand can be adjusted in accordance with the longitudinal position of the front seat 2 in which the front seat 2 is located in the longitudinal direction of the vehicle body. When the front seat 2 is located in a normal position, the air bag control unit 4 is set to allow the air bag 4b to confine the passenger seated on the rear seat in the appropriate way when the air bag 4b is developed to expand by operating both of the upper and lower inflators 4aA and 4aB. However, when the front seat 2 is located to a large extent at its longitudinally forward position, on the one hand, the space between the air bag control unit 4 and the passenger seated on the rear seat becomes so large that the air bag 4b is developed to expand by operating the upper inflator 4aA only while inhibiting the operation of the lower inflator 4aB. By operating the upper inflator 4aA only, an upper portion of the air bag 4b can be developed to expand earlier than the rest of the air bag 4b, whereby the passenger seated on the rear seat can be confined by the air bag 4b appropriately. Conversely, when the front seat 2 is located to a large extent at its longitudinally rearward position, the space between the air bag control unit 4 and the passenger seated on the rear seat becomes so narrow that a lower portion of the air bag 4b is allowed to expand earlier than the rest of the air bag 4b by operating the lower inflator 4aB only while the upper inflator 4aA is inhibited from operating. The expansion of the air bag 4b by the lower inflator 4aB only can confine the passenger seated on the rear seat in the appropriate position.

Likewise, the operation of the air bag control unit 4 can be adjusted in accordance with the vertical position in which the seat cushion 2b of the front seat 2 is located, thereby expanding the air bag 4b to confine the passenger seated on the rear seat in the appropriate position. When the front seat 2 is located in its normal position, the seat cushion 2b of the front seat 2 is also located in a normal position so that the air bag 4b is developed to expand to confine the passenger seated on the rear seat in an appropriate way by operating both of the upper and lower inflators 4aA and 4aB. However, when the seat cushion 2b of the front seat 2 is located in a position too high with respect to the normal position in which the seat cushion 2b thereof is to be located, on the one hand, the air bag control unit 4 is located in a position too high for the passenger seated on the rear seat, too. In this case, only the lower inflator 4aB is operated while the operation of the upper inflator 4aA is inhibited, thereby allowing a lower portion of the air bag 4b to be expanded earlier than the rest of the air bag 4b and confining the passenger seated on the rear seat in an appropriate manner. When the seat cushion 2b of the front seat is located in a position too low with respect to its normal position, on the other hand, the air bag control unit 4 is positioned too low for the passenger seated on the rear seat so that only the upper inflator 4aA is operated while inhibiting the operation of the lower inflator 4aB, thereby expanding an upper portion of the air bag 4b earlier than the rest of the air bag 4b and consequently confining the passenger seated on the rear seat in its appropriate position.

Further, the operation of the air bag control unit 4 can be adjusted in agreement with the vertical position in which the head rest 2c of the front seat 2 is located, thereby expanding the air bag 4b to confine the passenger seated on the rear seat in the appropriate way. When the front seat 2 is located in its normal position, the head rest 2c of the front seat 2 is also located in a normal position so that the air bag 4b is developed to expand to confine the passenger seated on the rear seat in an appropriate fashion by operating both of the upper and lower inflators 4aA and 4aB. However, when the head rest 2c of the front seat 2 is located at the position too high with respect to the normal position in which the head rest 2c thereof is to be located, on the one hand, the air bag control unit 4 is located in a position too high for the passenger seated on the rear seat, too. In this case, only the lower inflator 4aB is operated while inhibiting the operation of the upper inflator 4aA, thereby allowing a lower portion of the air bag 4b to be expanded earlier than the rest of the air bag 4b and confining the passenger seated on the rear seat in its appropriate position. When the head rest 2c of the front seat is located at the position too low with respect to its normal position, on the other hand, the air bag control unit 4 is positioned too low for the passenger seated on the rear seat so that only the upper inflator 4aA is operated while inhibiting the operation of the lower inflator 4aB, thereby expanding an upper portion of the air bag 4b earlier than the rest of the air bag 4b and consequently confining the passenger seated on the rear seat in its appropriate position.

Figure 26:
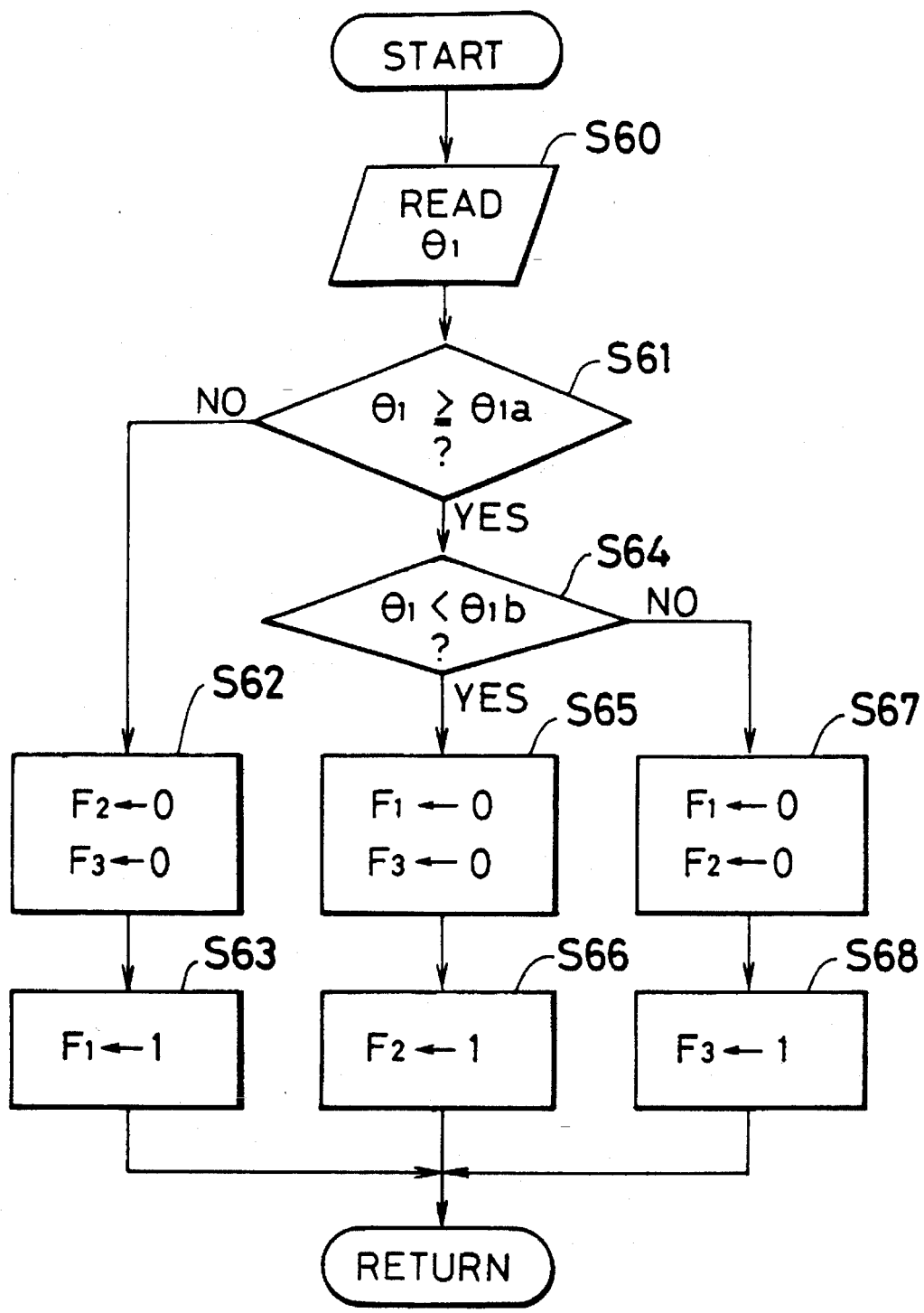
Figure 27:
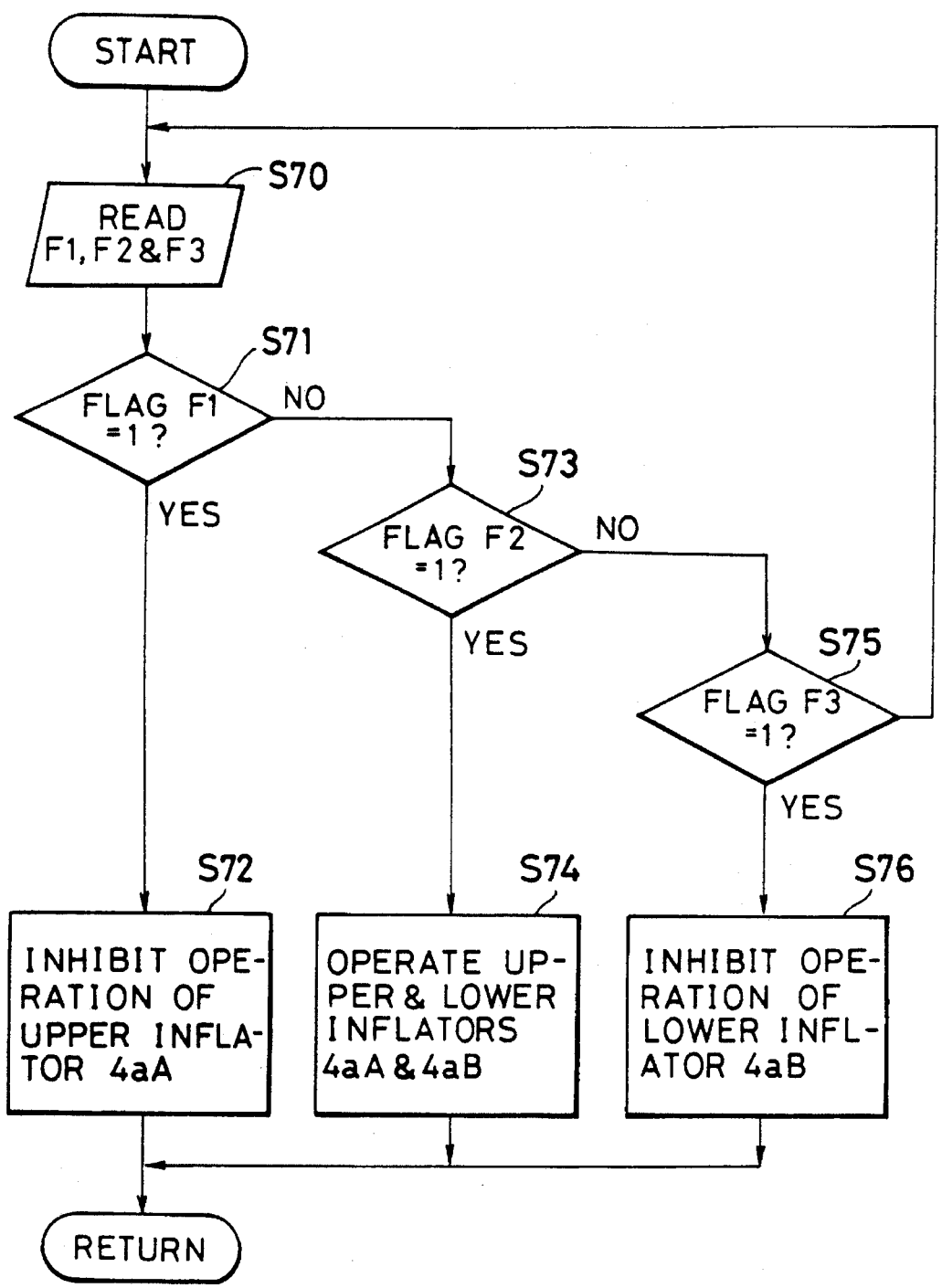

Given the foregoing, description will be made of the control over the operation for expanding the air bag 4 with reference to the flow sheets as shown in FIGS. 26 and 27. It is to be noted herein that specific practices for controlling the operation are substantially identical to each other, so that the practices for controlling the reclined angle of the seat back 2a are taken as an example.

The routines as shown in FIGS. 26 and 27 are interrupt processing to be interrupted into the flow sheet of FIG. 7 for the control of the first embodiment.

As shown in FIG. 26, first, the reclined angle θ1 of the seat back 2a of the front seat 2 is read at step S60 and, then, a decision is made to determine if the actual reclined angle θ1 is equal to or larger than the first predetermined value θ1a (as shown in FIG. 25) at step S61. When it is decided at step S61 that the result of decision is in the negative, that is, that the seat back 2a is in an erect state, then the program flow goes to step S62 at which flags F2 and F3 are reset, followed by proceeding to step S63 at which a flag F1 is set to one (F1=1).

When the result of decision at step S61 indicates that the actual reclined angle θ1 of the seat back 2a is equal to or larger than the first predetermined value θ1a, on the other hand, the program flow goes to step S64 at which a further decision is made to determine if the actual reclined angle θ1 is smaller than a second predetermined value θ1b (as shown in FIG. 25 ). When it is decided at step S64 that the actual reclined angle θ1 is smaller than the second predetermined value θ1b, it is determined that the seat back 2a is located in an appropriate position and the program flow goes to step S65 and the flags F1 and F3 are reset, followed by step S66 at which the flag F2 is set to one (F2=1) and then by the return.

On the other hand, when the result of decision at step S64 indicates that the actual reclined angle θ1 is equal to or larger than the second predetermined value θ1b, it is determined that the seat back 2a is in a rearward reclined state so that the program flow goes to step S67 at which the flags F1 and F2 are reset, followed by proceeding to step S68 at which the flag F3 is set to one (F3=1) and by the return.

In the routine as shown in FIG. 27, the flags F1, F2 and F3 are read at step S70, followed by proceeding to step S71 at which a decision is made to determine if the flag F1 is set to one (F1=1). When it is decided at step S71 that the flag F1 is set to one (F1=i) then the program flow goes to step S72 at which the operation of the upper inflator 4aA is inhibited.

On the other hand, when the result of decision at step S71 indicates that the flag F1 is not set to one, the program flow goes to step S73 at which it is decided to determine if the flag F2 is set to one (F2=1). When it is decided that the flag F2 is set to one (F2=1), then the program flow goes to step S74 at which both of the upper and lower inflators 4aA and 4aB are operated.

When the result of decision at step S73 indicates that the flag F2 is not set to one, then the program flow goes to step S75 at which a decision is further made to determine if the flag F3 is set to one (F3=1). When it is decided at step S75 that the flag F3 is set to one (F3=1), then the program flow goes to step S76 at which the operation of the lower inflator 4aB is inhibited.

It is to be noted that the control practices as described immediately hereinabove can be applied to the control of the system in which the air bag control unit 4 is mounted to the seat back 2a of the front seat 2.

VARIANT OF FOURTH EMBODIMENT (FIG. 28)

Figure 28:
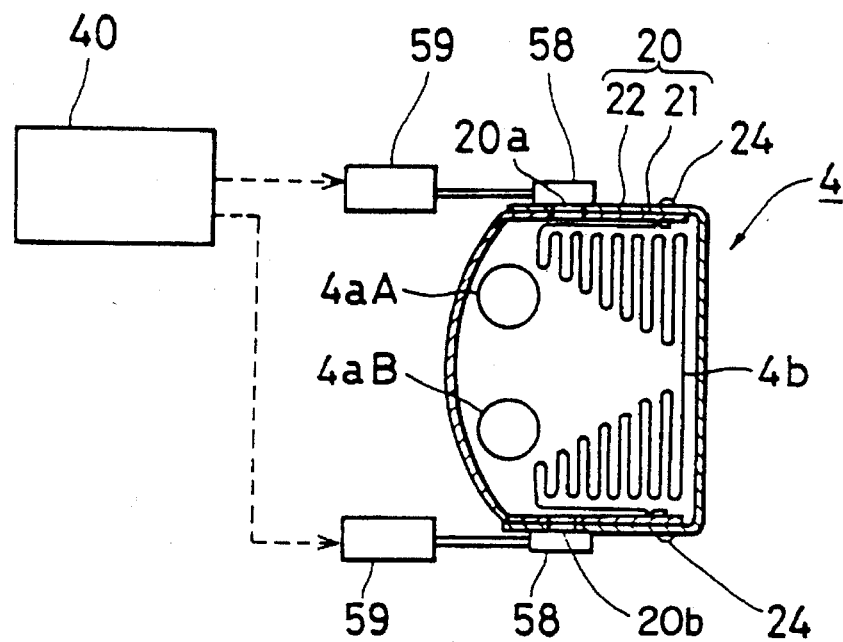
FIG. 28 is directed to a variant of the fourth embodiment of the air bag system for the automotive vehicle according to the present invention, which is a longitudinally sectional view showing the air bag unit for the passenger seated on the rear seat.

FIG. 28 shows a variant of the air bag control unit 4 according to the fourth embodiment of the present invention.

As shown in FIG. 28, the casing 20 is provided with upper and lower relief holes 20a and 20b on its upper and lower portions, respectively. Each of the upper relief hole 20a and the lower relief hole 20b is arranged to be opened or closed by an opening-closing valve 58 drivable by a solenoid 59. In this variant, a distribution of gas pressures in expanding the air bag 4b can be controlled by the opening-closing valve 58, that is, by releasing a portion of gases generated by the inflator 4a from the upper relief hole 20a or the lower relief hole 20b. Further, in this variant, the inflator 4a may be one.

FIFTH EMBODIMENT (FIG. 29)

This embodiment is directed to a system of the air bag 4b designed so as to protect the knees of the passenger seated on the rear seat in a positive way by a portion of the expanded air bag 4b.

Figure 29:
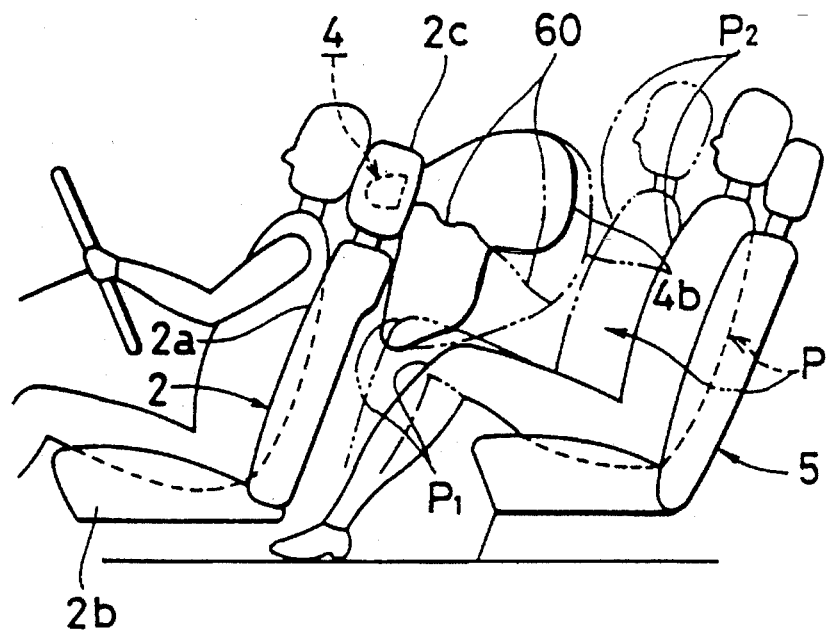
FIG. 29 is directed to the fifth embodiment of the air bag system for the automotive vehicle according to the present invention, which is a side view showing the vehicle compartment of the automotive vehicle.

As shown in FIG. 29, the air bag 4b is provided at its vertically middle portion with a string member 60 that can extend along an approximately longitudinal direction of the vehicle body. A forward end of the string member 60 is secured to the casing 20 of the front seat 2 and a rearward end is connected to a middle portion of the air bag 4b.

The structure of the air bag 4b can delay expansion of the vertically middle portion of the air bag 4 connected to the casing 20, on the one hand, and expands the upper and-lower portions thereof faster than the middle portion thereof, on the other hand.

With this arrangement, the lower portion of the air bag 4b is allowed to expand earlier than the middle portion thereof upon a car crash, so that the knee portion P1 of the passenger P seated on the rear seat is suppressed from moving in the upward direction, i.e. jumping forward off the rear seat due to the impact or shock upon a car crash, and, as a consequence, a so-called submarine phenomenon of the passenger P can be prevented. As a matter of course, the upper portion P2 of the air bag 4b can confine the face and chest portions of the passenger P in an appropriate fashion.

VARIANT OF FIFTH EMBODIMENT (FIG. 30)

Figure 30:
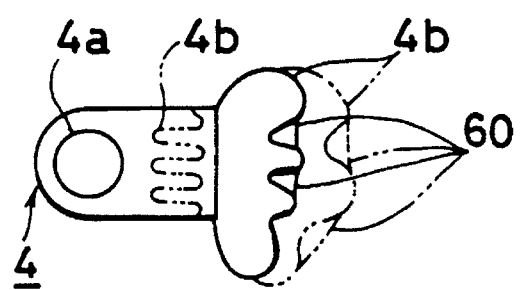
FIG. 30 is directed to a variant of the fifth embodiment of the air bag system for the automotive vehicle according to the present invention, which is a view showing the air bag unit for the passenger seated on the rear seat and the status of expansion of the air bag.
Figure 31:
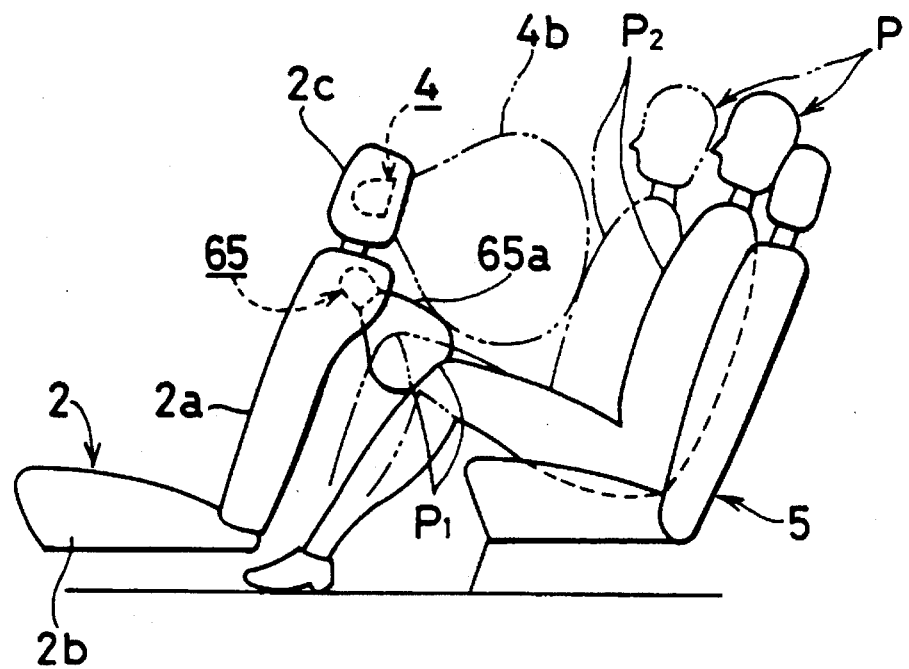

FIG. 30 shows a variant of the fifth embodiment according to the present invention. In this variant, the string member 60 is mounted to an outer middle portion of the air bag 4b, thereby suppressing a vertically middle portion of the air bag 4b from expanding in an outwardly vertical direction. As the disposition of the string member 60 can suppress the vertically middle portion of the air bag 4b from expanding, the upper portion of the air bag 4b are expanded earlier and faster than the middle portion thereof, thereby suppressing the knee portion P1 of the passenger P seated on the rear seat from rapidly moving upward or jumping forward off the rear seat, and preventing the so-called submarine phenomenon of the passenger P. With this arrangement, the upper portion of the air bag 4b is also expanded earlier and faster than the middle portion thereof so that the face and chest portions of the passenger P can be protected from jumping forward off the rear seat.

SIXTH EMBODIMENT (FIGS. 31 to 34)

The sixth embodiment according to the present invention is directed to an example in which a second air bag control unit 65 is mounted to a rear portion of the front seat 2 for the purpose to confine the knee portion P1 of the passenger P seated on the rear seat.

Figure 32:
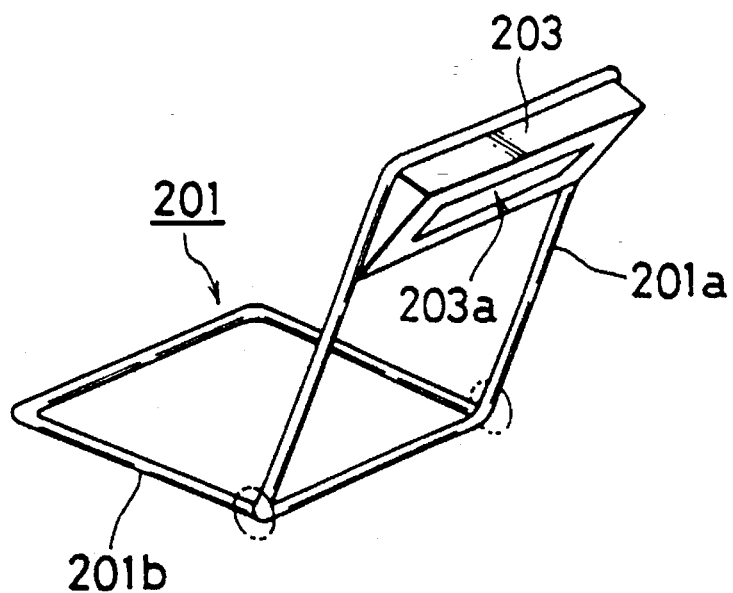
Figure 33:
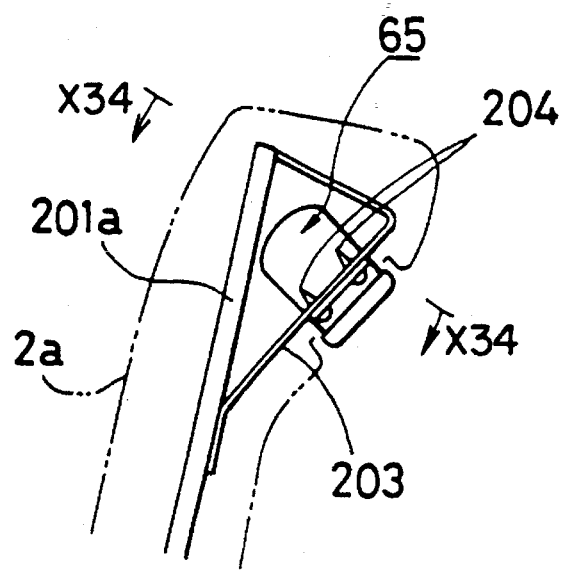
Figure 34:
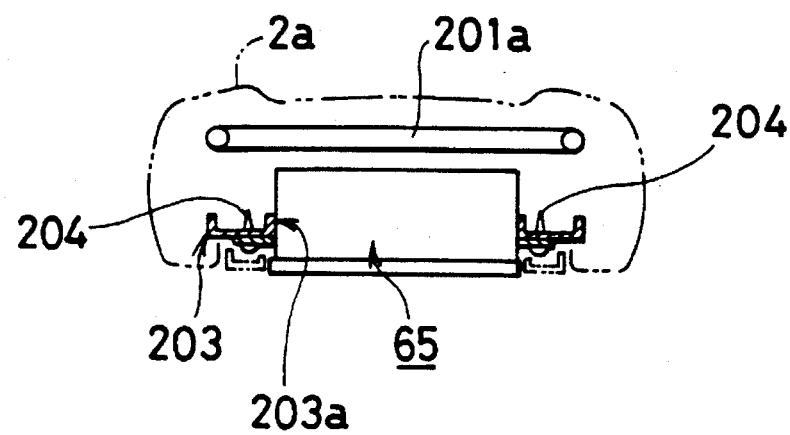

The second air bag control unit 65 is mounted to an upper portion of the seat back 2a of the front seat 2. More specifically, as shown in FIG. 32, a bracket 203 is disposed at an upper portion of the upper seat frame 201a of the seat frame 201 and is provided at its side portion with an opening 203a facing and directed toward the knee portion P1 of the passenger P seated on the rear seat. The second air bag control unit 65 is mounted with screws 204 to the bracket 203 by taking advantage of the opening 203 of the bracket 203 in the manner as shown in FIGS. 33 and 34.

In this case, the first air bag control unit 40 is mounted to the head rest 2c of the front seat 2 in the manner as described hereinabove. The second air bag control unit 65 may have substantially the same structure as the first air bag control unit 40 so that detailed description of the second air bag control unit 65 will be omitted from the following description for brevity of explanation.

This arrangement allows operation of both of the first and second air bag control units 40 and 65 upon a car crash in substantially the same manner as described hereinabove. More specifically, a first air bag 4b disposed in the first air bag control unit 4 is developed to expand toward the chest portion P2 of the passenger P seated on the rear seat, confining the face and chest portions of the passenger P. On the other hand, a second air bag 65a disposed in the second air bag control unit 65 is developed to expand toward the knee portion P1 of the passenger P and suppressing the knee portion P1 thereof from rapidly moving upward, that is, preventing the so-called submarine phenomenon of the passenger P.

Figure 35:
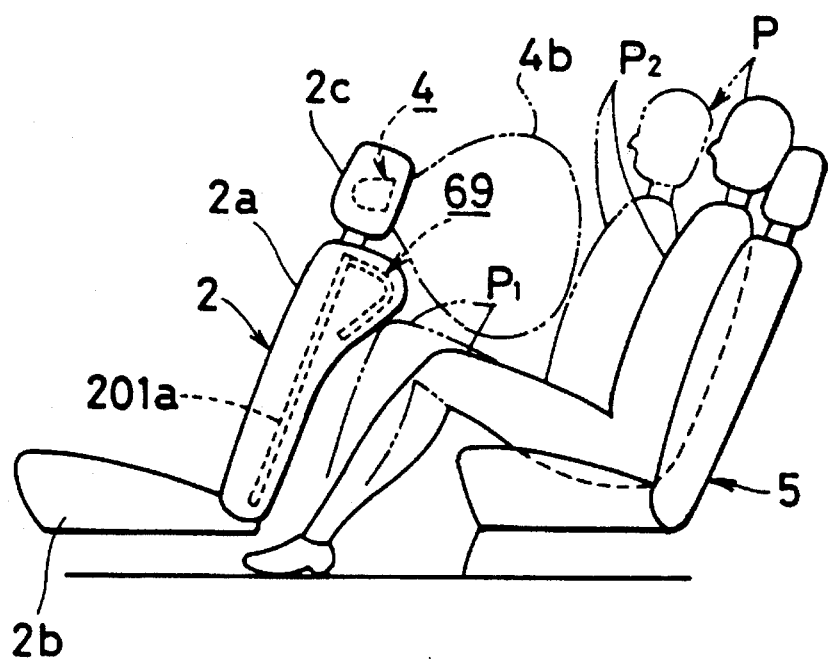
Figure 36:
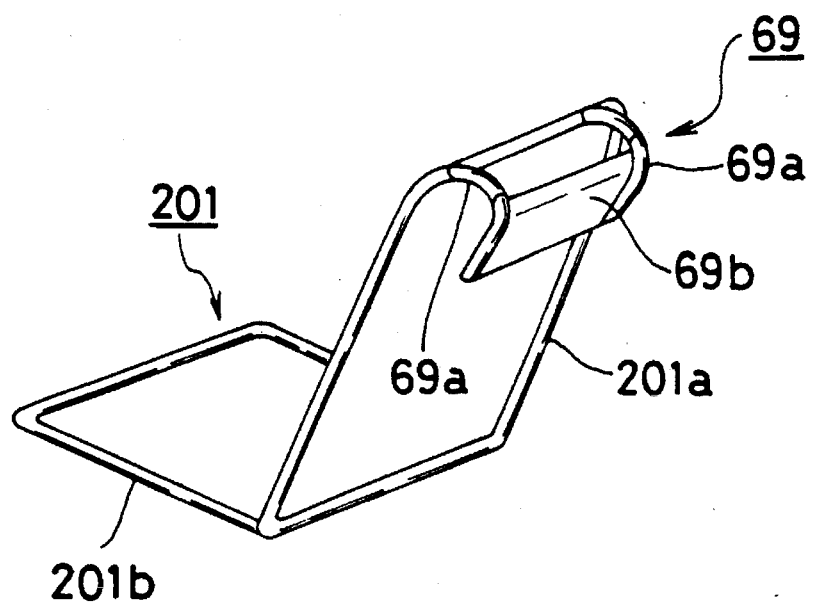

SEVENTH EMBODIMENT (FIGS. 35 and 36)

The seventh embodiment according to the present invention is directed to a system in which a knee protector is provided for the passenger seated on the rear seat. The structure of the knee protector for the passenger seated on the rear seat is known per se so that description thereof will be omitted from the description which follows.

As shown in FIGS. 35 and 36, a knee protector 69 for the passenger seated on the rear seat is mounted at an upper end portion of the upper seat frame 201a of the seat frame 201 for the front seat 2. As shown specifically in FIG. 36, the knee protector 69 comprises a pair of left-hand and right-hand pipes 69a and 69a and a protector plate 69b. Each of the left-hand and right-hand pipes 69a and 69 extends backward from the upper end of the upper seat frame 201a and then curves in a downward direction. The protector plate 69b is interposed between the left-hand and right-hand pipes 69a and 69a.

The disposition of the knee protector 69 at the upper portion of the seat back 2a can suppress the knee portion P1 of the passenger P seated on the rear seat from rapidly moving upwards, i.e. jumping forward off the rear seat, thereby preventing the so-called submarine phenomenon. On the other hand, the chest portion P2 of the passenger P is confined by the expansion of the air bag 4b mounted to the head rest 2c of the front seat 2.

It is also possible to confine the knee portion P1 of the passenger P seated on the rear seat by the seat back 2a of the front seat 2 by reclining the seat back 2a backwards to a great extent upon a car crash or upon prediction of a car crash, as will be described hereinafter, by taking advantage of, for example, a reclining mechanism (not shown) for reclining the front seat 2 having the action and structure as is known per se.

Figure 37:
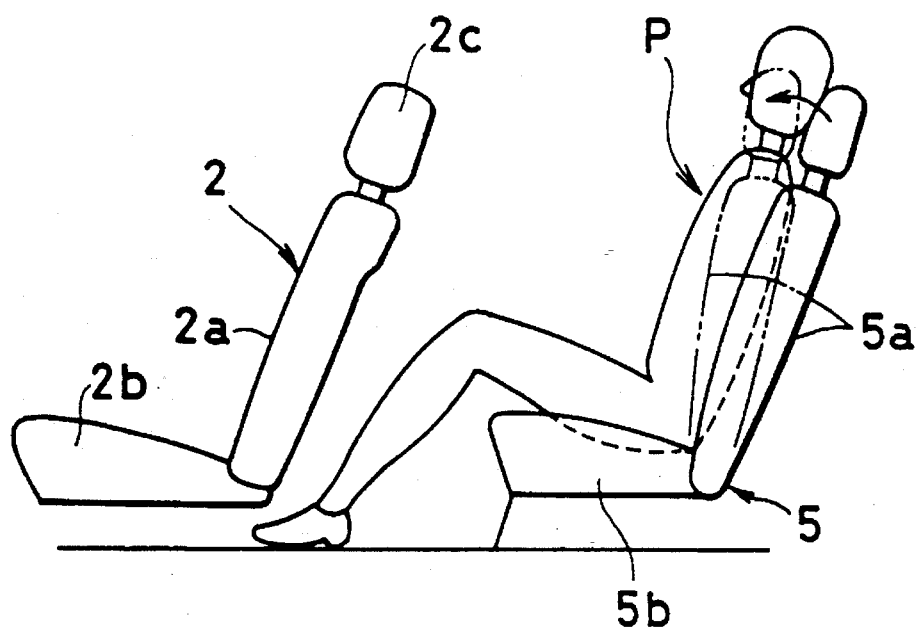
Figure 38:
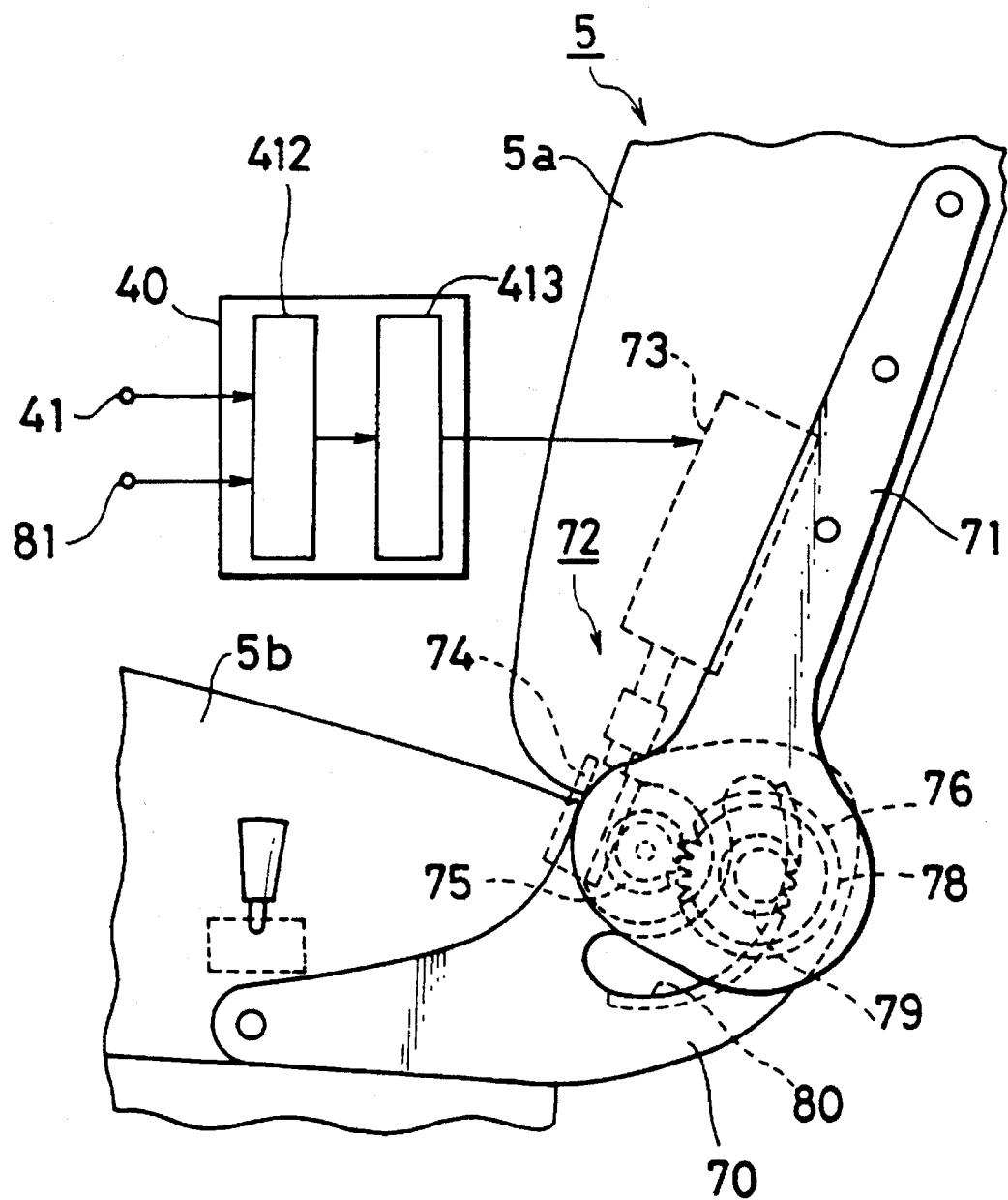

EIGHTH EMBODIMENT (FIGS. 37 and 38)

In the eighth embodiment according to the present invention, a seat back 5a of the rear seat 5 is arranged so as to erect due to impact or shock upon car crash. As shown in FIG. 37, the seat back 5a of the rear seat 5 is forced to erect or to move forward by a seat back driving mechanism 72, thereby erecting the upper body portion of the passenger P seated on the rear seat and, as a consequence, suppressing the passenger P from rapidly moving forward. Hence, the knee portion P1 of the passenger P is suppressed from rapidly moving upwards, i.e. from jumping off the rear seat.

Description will now be made of the seat back driving mechanism 72 with reference to FIG. 38. The seat back driving mechanism 72 is mounted to a connecting section of a fixed arm 70 fixed to a seat cushion 5b of the rear seat 5 and a reclining arm 71 mounted to the seat back 5a.

The seat back driving mechanism 72 is provided with a knuckle motor 73 that can be rotated in both normal and reverse ways. An output shaft of the knuckle motor 73 is connected to a worm 74 which in turn is in mesh with a worm gear 75 supported by the fixed arm 70. A displacement gear 76 is in mesh with a gear section on the opposite side of the worm gear 75. The displacement gear 76 comprises a large-diameter gear 78 and a small-diameter gear 79 and is supported by the reclining arm 71. The large-diameter gear 78 is in mesh with the worm gear 75 while the small-diameter gear 79 is meshed with an arc-shaped gear 80 mounted to the fixed arm 70.

The arc-shaped gear 80 has a row of teeth formed on one side of an arc-shaped long aperture and the displacement gear 76 is disposed so as to displace along the arc-shaped long aperture of the arc-shaped gear 80. Hence, the displacement gear 76 rotates and displaces on the basis of output of the knuckle motor 73 along the arc-shaped gear 80 in an arc-shaped line around the axial center of the worm gear 75 as a fulcrum. The arc-shaped displacement of the displacement gear 76 can recline the seat back 5a of the rear seat 5 longitudinally by the aid of the reclining arm 7 integral with the displacement gear 76.

The control unit 40 has impact prediction means 412 and drive controlling means 413. Entered into the control unit 40 are signals from the vehicle speed sensor 41 and a sensor 81 that can sense the presence of an obstacle in a predetermined distance spaced apart forwards.

The impact prediction means 412 is arranged to sense impact of the vehicle body when the vehicle speed detected by the vehicle speed sensor 41 is faster than a predetermined value and when the presence of the obstacle within the predetermined distance is sensed by the sensor 81.

The drive controlling means 413 is arranged to generate a signal to the knuckle motor 73 in response to the signal from the impact prediction means 412 when the impact of the vehicle body is predicted, thereby forcing the seat back 5a of the rear seat 5 to erect.

NINTH EMBODIMENT (FIGS. 39 to 42)

Figure 39:
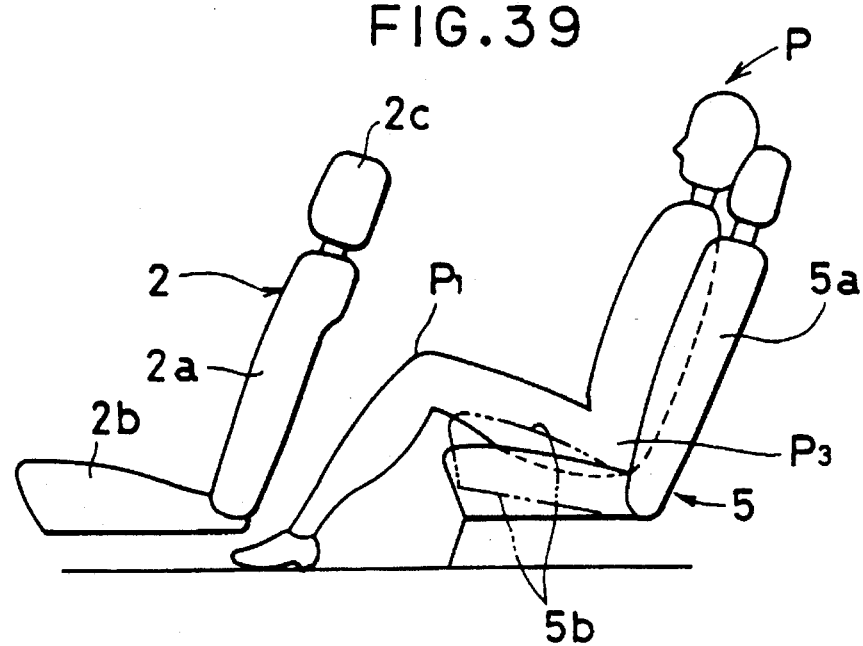

In this embodiment of the present invention, a front end portion of the seat cushion 5b of the rear seat 5 is forced to displace upwards upon impact or shock of a car crash. As shown in FIG. 39, the hip portion P3 of the passenger P seated on the rear seat is displaced downward by displacing the front end portion of the seat cushion 5b of the rear seat 5 upwards relative to the rear portion of the seat cushion 5b thereof, thereby suppressing the passenger P seated on the rear seat from moving forward and consequently making the hip portion P3 of the passenger P unlikely to be displaced upwards.

Figure 40:
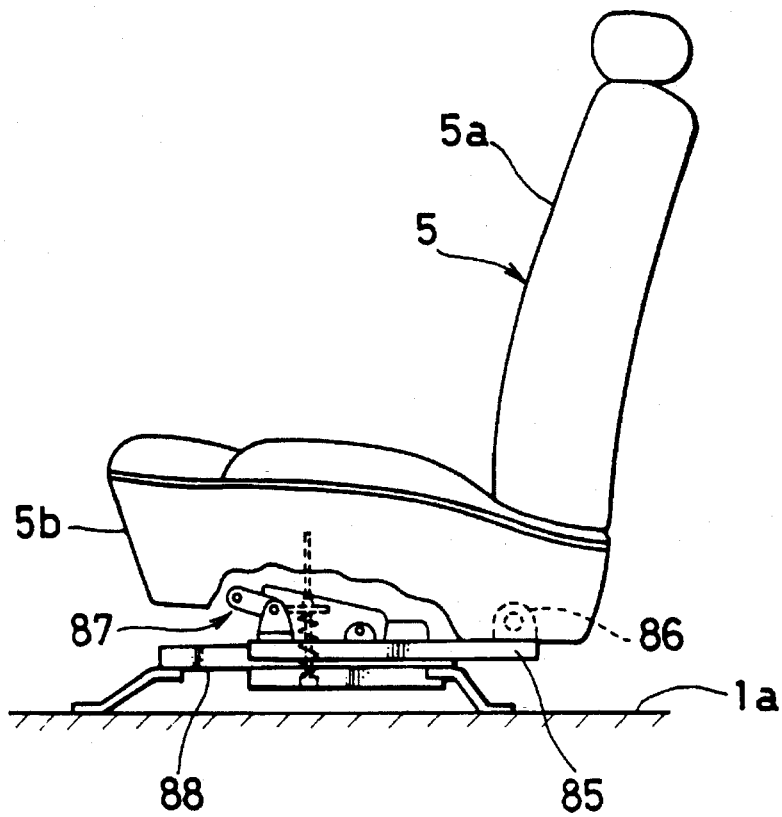
Figure 41:
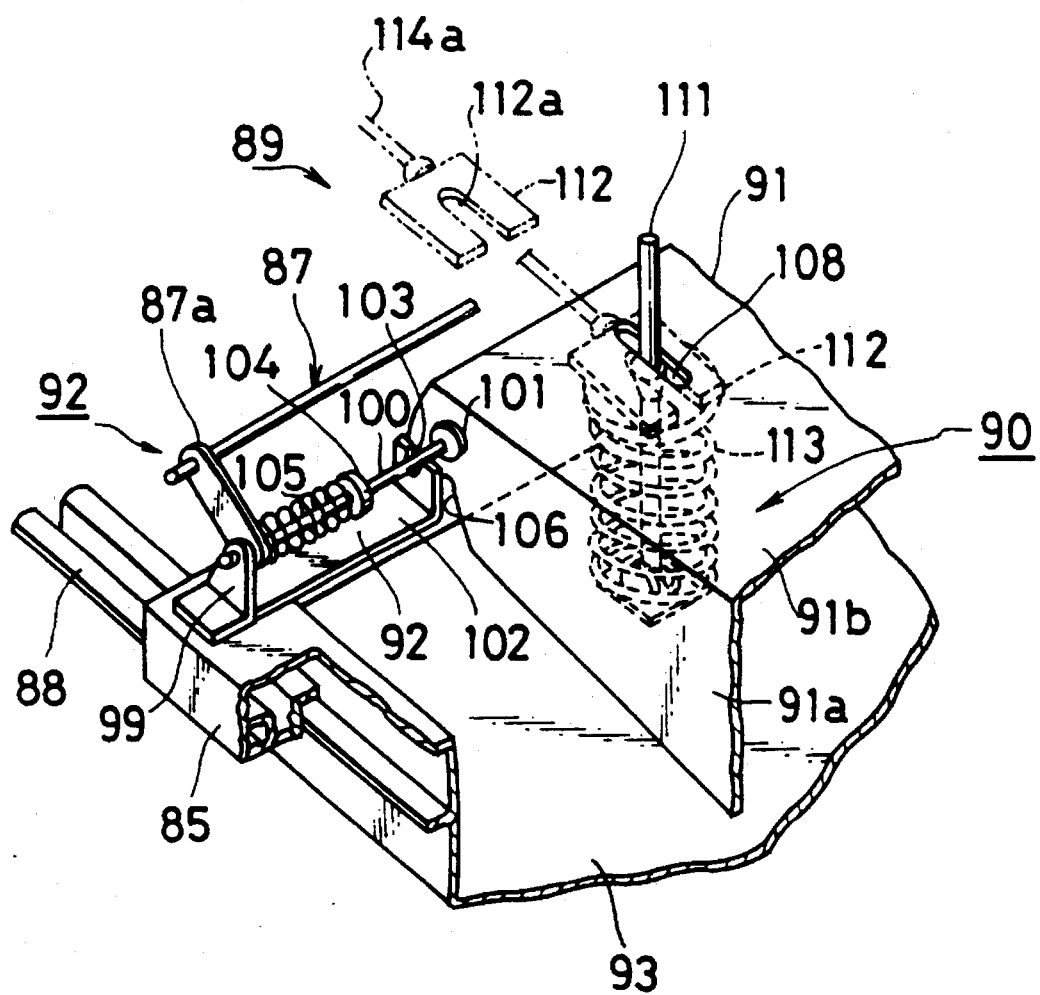
Figure 42:
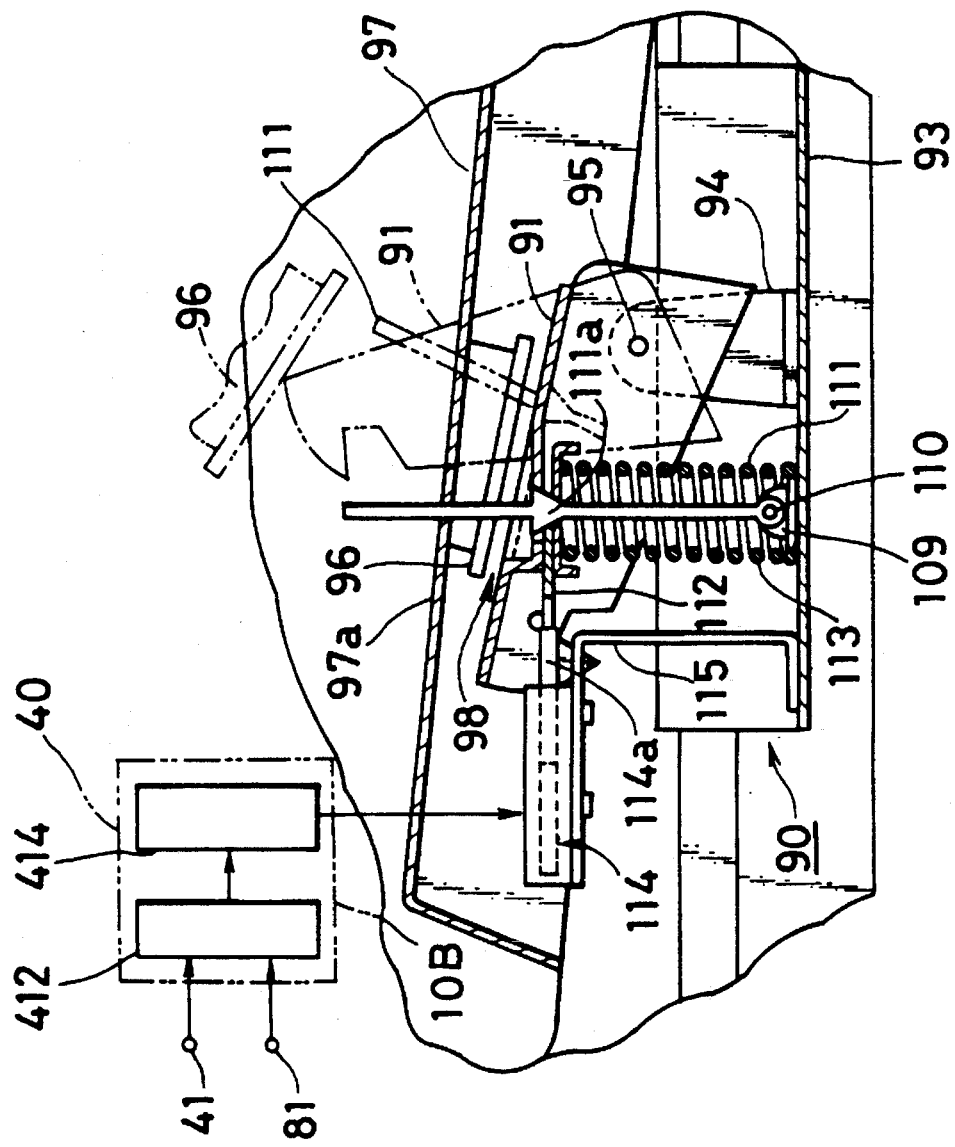

As shown in FIGS. 40 to 42, the seat cushion 5b of the rear seat 5 is pivotably supported by a bracket 86 of each of left-hand and right-hand upper seat rails 85 at its lower portion in the vicinity of its rear end, and the seat cushion 5b can pivot by a seat lifter 87 on the site where the seat cushion 5b is supported by the bracket 86, thereby allowing adjustment of the angle of the seat cushion 5b. The upper seat rail 85 is slidably engaged with an inner seat rail 88 fixed to the floor 1a of the vehicle body.

As shown specifically in FIGS. 41 and 42, the seat lifter 87 comprises a lift mechanism 89 and a driving unit 90 of a spring type for driving the lift mechanism 89 in order to lift the front end portion of the seat cushion 5b of the rear seat 5 in the upward direction of the vehicle body.

As shown in FIGS. 41 and 42, the lift mechanism 89 comprises a lift member 91 in a generally square C-shaped section and a releasing unit 92 for releasing the confinement of the seat lifter 87. The lift member 91 is arranged in such a manner that a pair of left-hand and right-hand side plates 91a and 91a are integral with a ceiling plate 91b and a rearward end portion of each of the left-hand and right-hand side plates 91a and 91a is supported through a common support axis 95 to an upper end portion of each of the respective brackets 94 and 94 standing upright from a supporting plate 93. The lift member 91 is supported so as to be pivotable upwards at the angle in the range of approximately 60 to 70 degrees about the supporting axis 95. Turning to FIG. 42, the lift member 91 as indicated by the solid line is located in a normal position when the driving unit 90 is not operated and no impact of the vehicle body upon a car crash is predicted. On the other hand, the lift member 91 as indicated by the phantom line is located in a lifted position in which the lift member 91 pivots upwards by the driving unit 90 when the impact of the vehicle body upon a car crash is predicted.

A pair of left-hand and right-hand brackets 96 are disposed extending downward on the bottom surface of a bottom plate 97 of the seat cushion 5b of the rear seat 5 so as to face a slightly upper position above the ceiling plate 91b of the lift member 91 when the lift member 91 is located in its normal position. A space 98 apart in a predetermined distance is formed between an upper surface of the ceiling plate 91b and a bottom surface of the bracket 96 so as to allow the lift member 91 to pivot downwards to a slight extent.

When the impact of the vehicle body is predicted in the manner as described in the eighth embodiment with reference to FIG. 38, the driving unit 90 is operated, thereby allowing the lift member 91 to pivot upwards by the driving unit 90 within a clearance formed by the space 98 and enabling the releasing mechanism 92 to release the confinement by the seat lifter 87 in association with the upward pivotal movement of the lift member 91.

As shown specifically shown in FIG. 41, the releasing mechanism 92 is arranged such that a pair of left-hand and right-hand pivotable arms 87a and 87a of the seat lifter 87 are supported by a supporting bracket 99 disposed at an upper front end portion of the upper seat rail 85 through left-hand and right-hand supporting rods 100, respectively. Each of the left-hand and right-hand supporting rods 100 extends horizontally toward the respective side plate 91a of the lift member 91 and an abuttable plate 101 mounted at the innermost end of the supporting rod 100 is brought in abutment with the respective side plate 91a from the outside. In this state, an outward end portion of the supporting rod 100 extends slightly outward from the supporting bracket 99. Further, each of the supporting rods 100 is supported at its portion in the vicinity of its inner end by a generally U-shaped supporting cut-away section 103 of a supporting member 102 extending from the upper seat rail 85.

Secured to the supporting rod 100 is a spring plate 104 in a nearly intermediate position between the supporting bracket 99 and the supporting cut-away section 103. A compression coil spring 105 is wound about the supporting rod 100 at the position interposed between the spring plate 104 and the pivotable arm 87a, thereby biasing the supporting rod 100 toward the lift member 91. The supporting rod 100 is brought into abutment with the side plate 91a of the lift member 91 through the abuttable plate 101 in a biased fashion.

Formed on the side plate 91a at the position below the abuttable plate 101 is a cut-away portion 106 having the size larger than the abuttable plate 101. An upper edge of the cut-away portion 106 is located in the vicinity of the abuttable plate 101, thereby allowing the cut-away portion 106 to displace upwards when the lift member 91 pivots upwards within the clearance of the space 98 and then releasing the engagement of the abuttable plate 101 with the lift member 91. In other words, the supporting rod 100 is disengaged from the supporting bracket 99 by means of the spring force, thereby liberating the seat lifter 87 and allowing an upwards pivotal movement of the seat cushion 5b of the rear seat 5.

Description will now be made of the driving unit 90 of a spring type for driving the lift mechanism 89.

As shown specifically in FIG. 41, a through aperture 108 in a slit-shaped form extending longitudinally is disposed in front of the supporting section of the lift member 91 and at a front and transversely middle portion of the ceiling plate 91b of the lift member 91. The lower end portion of a spring recipient rod 111 is mounted through a hinge pin 110 to a bracket 109 of the supporting plate 93 in the position immediately below the rear portion of the through aperture 108. On the other hand, the upper end portion of the spring recipient rod 111 extends vertically upwards to pass through the through aperture 108 and an opening 97a of the bottom plate 97 of the seat cushion 5b.

The spring recipient rod 111 is provided with a spring recipient portion 111a in a nearly inverted conical shape at a portion below and in the vicinity of the through aperture 108. The spring recipient portion 111a is engaged with a spring recipient plate 112 so as to be undetachable in the upward direction. The spring recipient rod 111 is wound with a strong compression coil spring 113.

The spring recipient plate 112 has a U-shaped cut-away portion 112a having an opening directed rearward and the U-shaped cut-away portion 112a is so arranged as to allows its left-hand and right-hand side portions to come into linear contact with the spring recipient portions 111a by inserting the spring recipient portion 111a into the cut-away portion 112a.

At a front portion of the spring recipient plate 112 is disposed a solenoid 114 which in turn is fixed to a mounting plate 115 mounted in an upright state to a front end of the supporting plate 93. An operating rod 114a of the solenoid 114 is fixed to the spring recipient plate 112, and the operating rod 114a is displaced forwards when electricity is applied to the solenoid 114, thereby allowing the spring recipient plate 112 to be pulled out forwards and permitting the spring force of the compression coil spring 113 to act directly upon the ceiling plate 91b of the lift member 91.

The solenoid 114 is controlled by the control unit 40 which further comprises the impact predicting means 412 having the action and structure, as described hereinabove, and excitation controlling means 414 that excites the solenoid 114 in response to a signal from the impact predicting means 412 when the impact of the vehicle body is predicted.

On the other hand, the solenoid 114 is in a demagnetized state at a normal time and an upper end portion of the compression coil spring 113 is held by the spring recipient plate 112 and the spring recipient portion 111a of the spring recipient rod 111, thereby holding the lift member 91 in its normal position, as indicated by the solid line in FIG. 42, and further holding the abuttable plate 101 of the supporting rod 100 by the side plate 91a.

When the impact of the vehicle body is predicted, the solenoid 114 is excited by the signal from the control unit 40 and the spring recipient plate 112 is pulled out forwards. Immediately after the spring recipient plate 112 has been pulled out forwards, the compression coil spring 113 is allowed to push the ceiling plate 91b of the lift member 91 upwards by means of its spring force. The abuttable plate 101 of the supporting rod 100 is detached from the side plate 91a immediately after the lift member 91 starts pivoting upwards, and the supporting rod 100 is detached from the supporting bracket 99, thereby releasing the confinement of the seat lifter 87.

Simultaneously with the disengagement of the seat lifter 87, the lift member 91 pivots upwards rapidly by the spring force of the compression coil spring 113 and the bracket 96 is pushed upwards in association with the upward displacement of the lift member 91, thereby forcing the seat cushion 5b of the rear seat 5 to pivot upwards about the supporting portion, as indicated by the phantom line in FIG. 42, as well as consequently pushing the knee portion P1 of the passenger P seated on the rear seat upwards immediately thereafter and suppressing the so-called submarine phenomenon from occurring.

VARIANT OF NINTH EMBODIMENT (FIG. 43)

Figure 43:
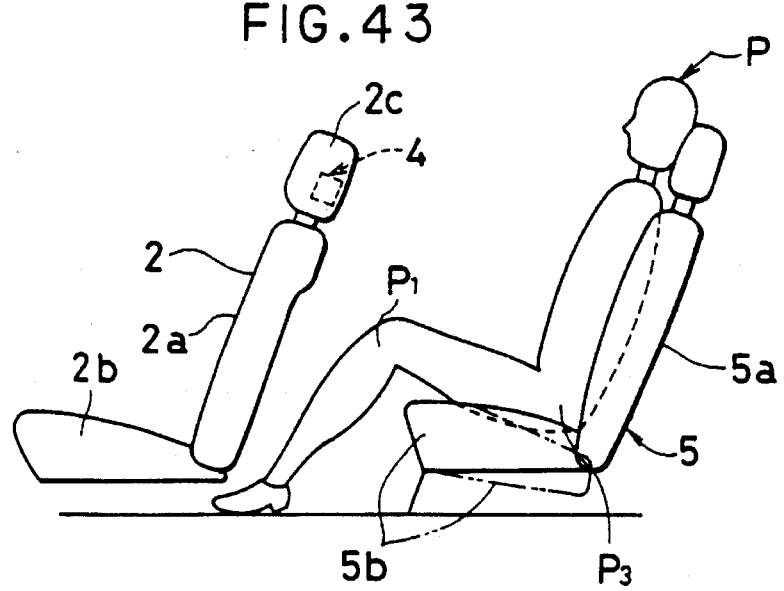
FIG. 43 is directed to a variant of the ninth embodiment of the air bag system for the automotive vehicle, which is a side view showing the vehicle compartment.

By taking advantage of a tension spring, although not specifically shown, in place of the compression coil spring 113, in association with the apparatus as shown in FIGS. 40 to 42, the rear portion of the seat cushion 5a of the rear seat 5 can be displaced downwards relative to the front portion of the seat cushion 5a thereof as shown in FIG. 43, thereby lowering directly the relative position of the hip portion P3 of the passenger P seated on the rear seat and consequently preventing the submarine phenomenon from occurring.

TENTH EMBODIMENT (FIG. 44)

The tenth embodiment according to the present invention is arranged so as to suppress the passenger P seated on the rear seat from rapidly moving forwards by displacing the front seat 2 rearward at the moment of the impact of the vehicle body, thereby suppressing the knee portion P1 of the passenger P form moving upwards.

Figure 44:
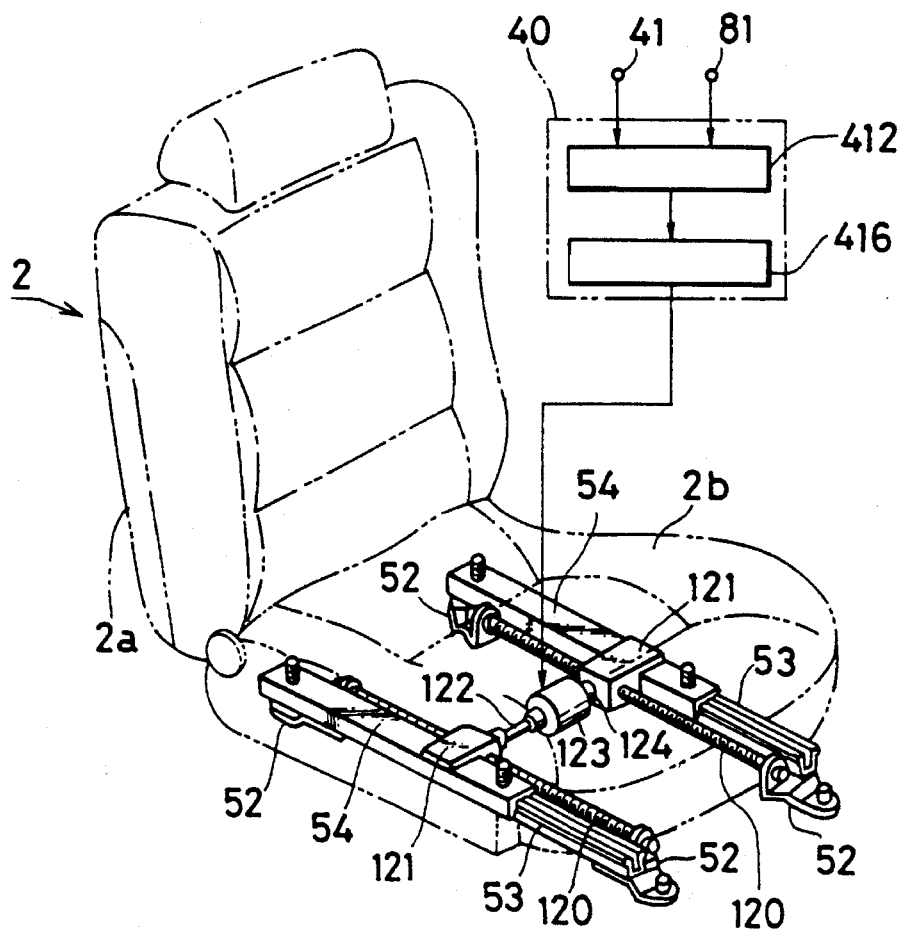
FIG. 44 is directed to the tenth embodiment of the air bag system for the automotive vehicle according to the present invention, which is a perspective view showing the detail of the front seat sliding mechanism.

As shown in FIG. 44, a threaded shaft 120 is disposed in parallel to each of the lower rails 53 over its entire length in the vicinity of its inner side, in order to drive the upper rail 54 in the longitudinal direction of the vehicle body.

On the other hand, a gear mounting portion 121 in a box form is mounted inside a lengthwise intermediate portion of each of the left-hand and right-hand upper rails 54. In the gear mounting portion 121 is threaded a nut (not shown) with the threaded shaft 120, and a gear is threaded with each of a front end face and a rear end face of the nut. Further, a rotation transmitting shaft 122 is interposed between the left-hand and right-hand gear mounting portions 121 and 121 in order to rotate the nut. A worm gear (not shown) mounted to an shaft end of the rotation transmitting shaft 122 is meshed with each of the nuts so as to transmit the rotation of the rotation transmitting shaft 122.

A sliding motor 123 is mounted to the shaft of the rotation transmitting shaft 122 in order to rotate the rotation transmitting shaft 122. The sliding motor 123 is connected to a side wall of the gear mounting portion 121 through a tubular fixing member 124 so as to be unrotatable, and the rotation transmitting shaft 122 is inserted over its entire length through a fixing member 124 in a tubular form.

The sliding motor 123 is controlled on the basis of the signals from the control unit 40 which further comprises the impact predicting means 412 and drive controlling means 416 for controlling the sliding motor 123.

When the impact of the vehicle body is predicted in the manner as described hereinabove, the sliding motor 123 is rotated in a normal direction by the control unit 40 to slide the seat cushion 2b of the front seat 2 up to the final end position of the threaded shaft 120, thereby confining the passenger P seated on the rear seat by the front seat 2 and preventing the so-called submarine phenomenon. This arrangement further ensures the confinement of the passenger P by the expansion of the air bag 4b.

ELEVENTH EMBODIMENT (FIGS. 45 to 49)

In the eleventh embodiment according to the present invention, the front seat 2 is arranged in such a manner that alteration of the status of the front seat 2 is allowed as long as protection performance of the air bag 4b for the passenger or passengers seated on the rear seat or the rear seats can be ensured, yet the alteration of the status of the front seat 2 is inhibited if the alteration of the seat status of the front seat 2 worsens or suppresses the protection of the air bag 4b for the passenger or passengers seated on the rear seat or seats.

Description will be made of an example. When the front seat 2 slides too much in the forward direction of the vehicle body and the air bag unit 4 mounted to the head rest 2c of the front seat 2 becomes too remote from the passenger seated on the rear seat, the confinement of the passenger seated on the rear seat by the air bag 4b is reduced decreasing the protection performance of the air bag 4b for the passenger seated on the rear seat. In this case, for example, this embodiment ensures the protection performance of the passenger seated on the rear seat by the air bag unit 4 by inhibiting the longitudinally sliding movement of the front seat 2 over a predetermined distance.

It is to be noted that such problems may arise when the air bag unit 4 is mounted to the seat back 2a of the front seat 2 as well as when the air bag unit 4 is mounted to the head rest 2c of the front seat 2. Hence, the following description is directed to the case in which the air bag unit 4 is disposed at the head rest 2c of the front seat 2, however, it should be noted that the description can likewise be applied to the case in which the air bag unit 4 is disposed at the seat back 2a of the front seat 2.

Figure 45:
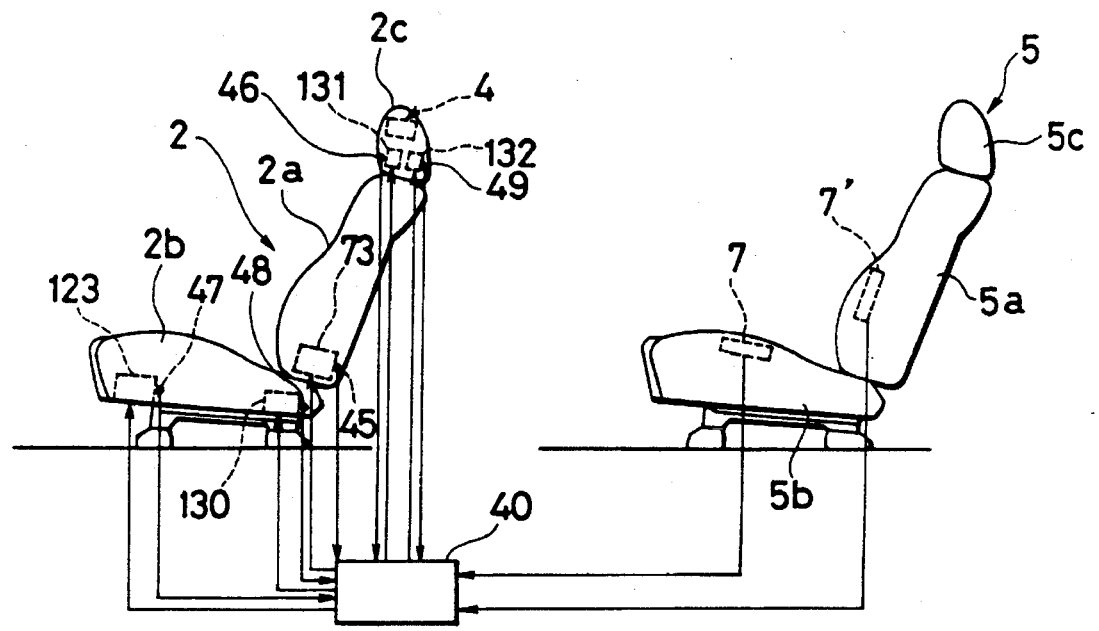

First, the front seat 2 is described with reference to FIG. 45. Mounted to the front seat 2 are motors 73, 123 and 130 to 132, inclusive. The motor 73 serves as a source for driving the reclining mechanism for the seat back 2a of the front seat 2, as described hereinabove and shown in FIG. 38. The motor 123 serves as a source for driving the longitudinally sliding mechanism for sliding the front seat 2 in the longitudinal direction of the vehicle body, as described hereinabove and shown in FIG. 44. The motor 130 serves as a source for driving a mechanism for raising or lowering the vertical position of the seat back 2a of the front seat 2, as shown in FIG. 23. A motor 131 functions as a source for driving a reclining or leaning mechanism for reclining or leaning the head rest 2c of the front seat 2 in forward and rearward directions of the vehicle body, as will be described hereinafter. Further, a motor 132 serves as a source for driving a vertical displacement mechanism for raising or lowering the head rest 2c of the front seat 2 in a vertical direction of the vehicle body, as will be described hereinafter.

Figure 46:
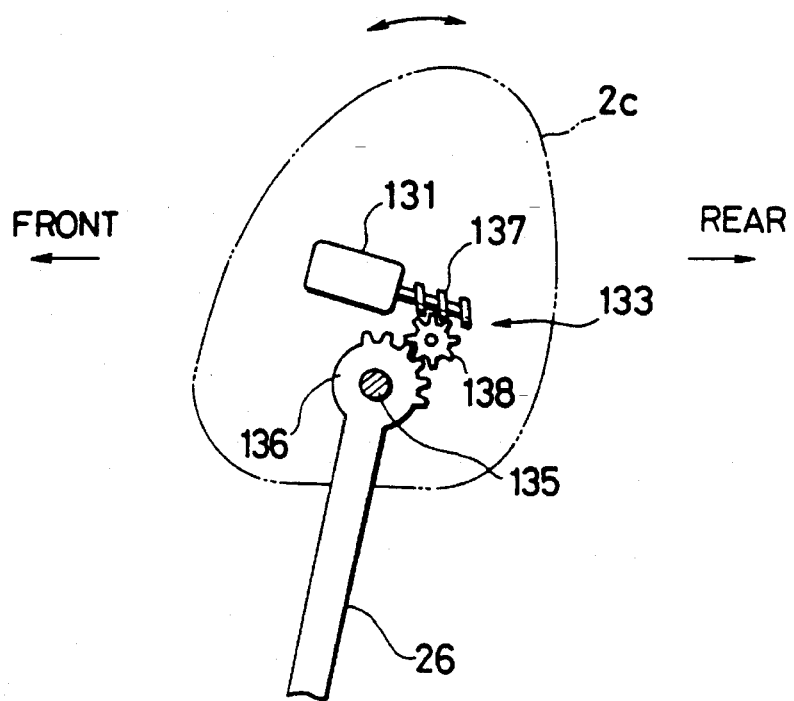

Reclining Mechanism 133 (FIG. 46)

The head rest 2c of the front seat 2 is mounted so as to be rotatable about a shaft 135 with respect to the head rest poll 26 which in turn is provided at its upper end portion with a first gear 136. On the other hand, the motor 131 is mounted to the head rest 2c and a second gear 137 is disposed at an output shaft of the motor 131. The first gear 136 is associated with the second gear 137 through an intermediate gear 138 which in turn is mounted to the head rest 2c so as to be rotatable and meshable with the first gear 136, on the one hand, and the second gear 137, on the other. This arrangement allows the head rest 2c to be reclined in the forward direction or in the rearward direction by rotating the motor 131.

Figure 47:
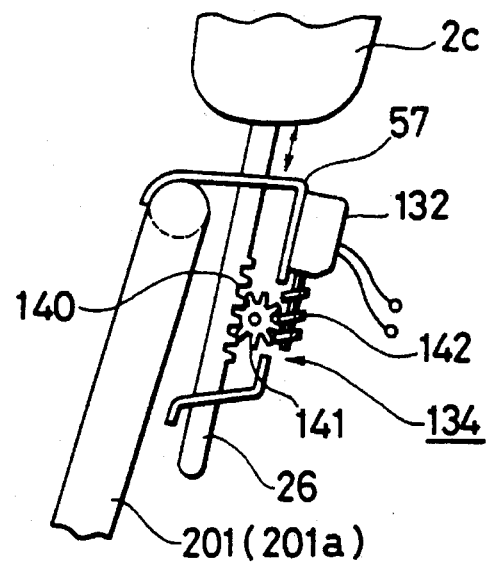

Vertical Displacement Mechanism 134 (FIG. 47)

The head rest poll 26 is provided at its lower end portion with a rack 140 that is meshable with a pinion 141 mounted rotatably to the upper seat frame 201a. The motor 132 is fixed to a bracket 57 mounted to the upper seat frame 201a and a gear 142 disposed at an output shaft of the motor 132 is in mesh with the pinion 141. This arrangement can displace the head rest 2c in the vertical direction of the front seat 2 by rotating the motor 132.

Figure 48:
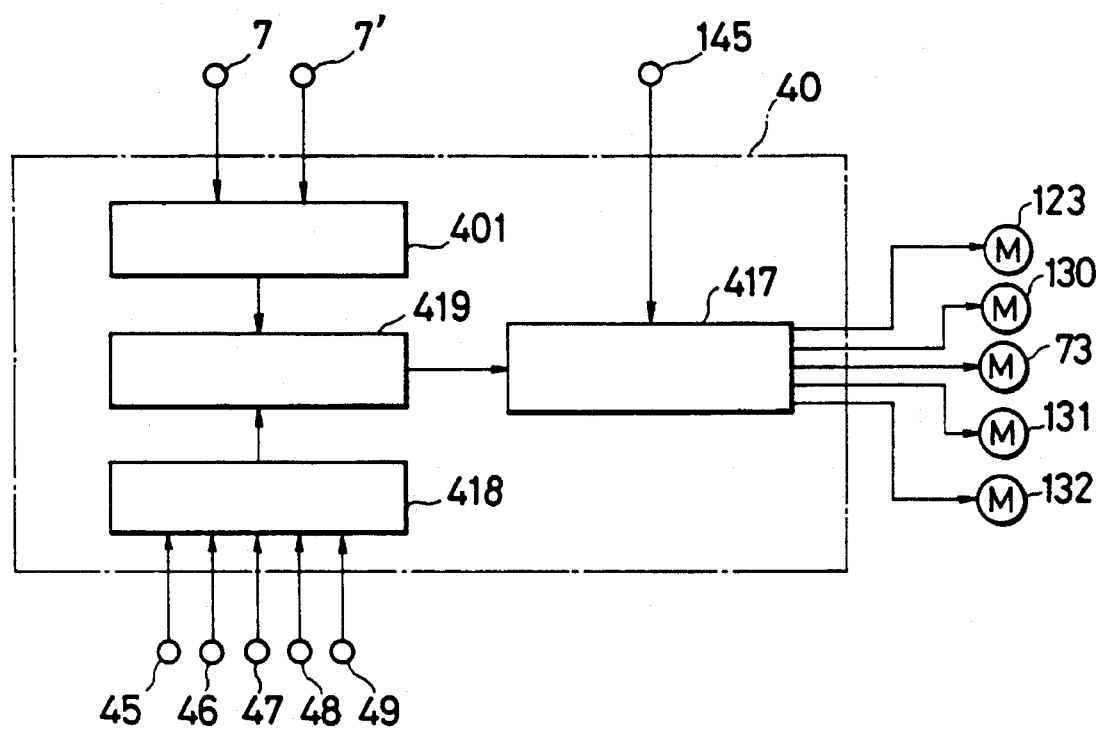

Referring now to FIG. 48, description will now be made of the control unit 40 which further comprises passenger determining means 401 for determining the passenger or passengers seated on the rear seat or rear seats 5, seat-status controlling means 417 for controlling the seat status of the front seat 2, seat-status determining means 418 for determining the seat status of the front seat 2, and seat-status regulation means 419 for regulating the seat status of the front seat 2.

Entered into the passenger determining means 401 of the control unit 40 are signals from the sensors 7 and 7'. The sensor 7 is a seat sensor disposed at the seat cushion 5b of the rear seat 5 as described hereinabove, while the sensor 7' is a second seat sensor disposed at the seat back 5b of the rear seat 5. In this embodiment, it is determined by the passenger determining means 401 that the passenger is seated on the rear seat 5, when both of the seat sensors 7 and 7' generate ON signals.

Further, signals are entered into the seat-status determining means 418 of the control unit 40 from the sensors 45 to 49, inclusive, for determining the seat status of the front seat 2, i.e. the longitudinal position of the front seat 2 in which the front seat 2 is located in the longitudinal direction of the vehicle body, the vertical position of the front seat 2 in which the front seat is located in the vertical direction of the body, the reclined state of the seat back 2a, the inclined angle of the head rest 2c, and the vertical position of the head rest 2c in which the head rest 2c is located in the vertical direction thereof. The sensor 45 is to sense the reclined angle of the seat back 2a of the front seat 2, as shown in FIG. 20. The sensor 46 is to sense an inclined or reclined angle of the head rest 2c thereof, as shown in FIG. 21. The sensor 4+ is to sense the longitudinal position of the front seat 2, as shown in FIG. 22. The sensor 48 is to sense the vertical position of the front seat 2, as shown in FIG. 23. The sensor 49 is to sense the vertical position of the head rest 2c thereof, as shown in FIG. 24. The seat-status deter-mining means 418 is to determine if the seat status of the front seat 2, i.e. the longitudinal position of the front seat 2, the vertical position of the front seat 2, the reclined state of the seat back 2a, the inclined angle of the head rest 2c, and the vertical position of the head rest 2c, exists outside the predetermined range. In other words, the seat-status determining means 418 is to determine if the seat status of the front seat 2 exists in a good relationship between the air bag 4b and the passenger seated on the rear seat. More specifically, for example, the seat-status determining means 418 is to determine if the space between the air bag 4b and the passenger seated on the rear seat is appropriate for confining the passenger seated on the rear seat in a good condition by the air bag 4b.

The seat-status regulating means 419 is to regulate the seat status of the front seat 2 to maintain the seat status thereof within the predetermined range when the seat status of the front seat 2 is determined to exist outside the predetermined range.

For example, when the front seat 2 slides too much in the forward direction of the vehicle body over the predetermined position, the space between the air bag 4b disposed in the front seat 2 and the passenger seated on the rear seat becomes too remote, thereby worsening the confinement of the passenger by the air bag 4b. In this case, the seat-status regulating means 419 inhibits the forward movement of the front seat over the predetermined position, thereby maintaining the seat status of the front seat 2 in a good condition for confining the passenger seated on the rear seat by the air bag 4b when developed to expand upon a car crash.

The seat-status controlling means 417 of the control unit 40 is to control the rotation of the various motors in response to the signals generated from a group of the switches 145. The group of the switches 145 include various manual switches for changing the seat status of the front seat 2, e.g. the switch for adjusting the longitudinal position of the front seat 2. For example, when the manual switch for adjusting the longitudinal position of the front seat 2 is turned on, the motor 123 is kept on rotating while the manual switch is kept pressed, thereby sliding the front seat 2 in the forward or rearward direction of the vehicle body. Likewise, for example, when the manual switch for adjusting the reclined quantity of the seat back 2a of the front seat 2 is turned on and generates an ON signal to the seat-status controlling means 417, the motor 73 is driven to recline the seat back 2a of the front seat 2 in the forward or rearward direction thereof in the corresponding distance, while the manual switch is kept pressed. The ON signals are likewise generated to the motors 130 to 132, inclusive, thereby adjusting the corresponding seat status of the front seat 2.

Figure 49:
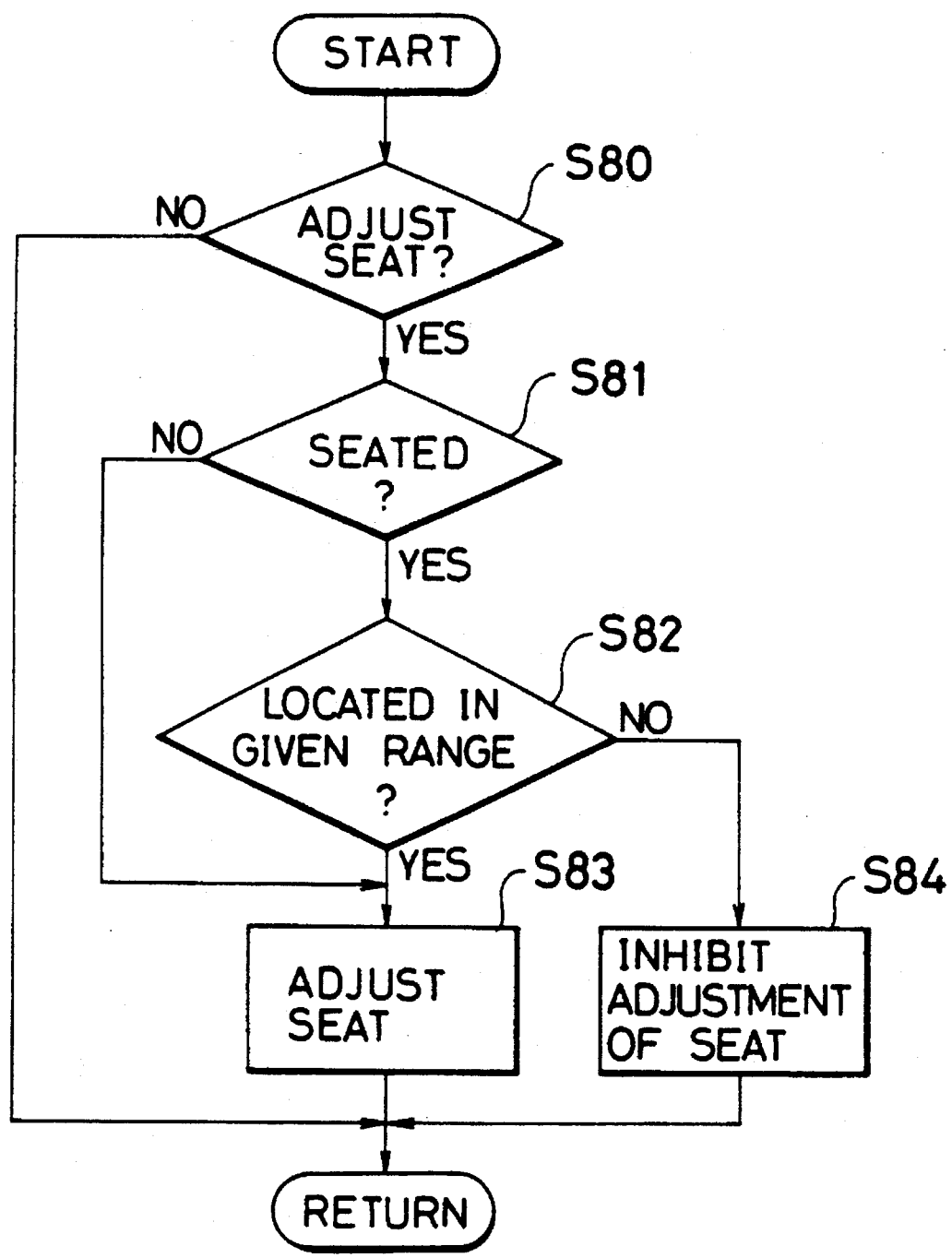

Description will now be made of the contents of the control of the front seat 2 with reference to the flow chart as shown in FIG. 49.

First, at step S80, a decision is made to determine if the seat status of the front seat 2 is adjusted. In other words, it is decided to determine if the manual switch 145 is turned on and generates the ON signal to the passenger determining means 401 of the control unit 40. When the result of decision at step S80 indicates that the manual switch 145 is turned on, then the program flow goes to step S81 at which a decision is further made to determine if the passenger is seated on the rear seat 5. When it is decided at step S81 that the passenger determining means 401 is turned off, then it is determined that no passenger is seated on the rear seat 5, followed by proceeding to step S83 at which the seat status of the front seat 2 is adjusted, for example, by driving the motor 130.

On the other hand, when the result of decision at step S81 indicates that the passenger is seated on the rear seat 5, then the program flow goes to step S82 at which it is decided to determine if the seat status of the front seat 2 exists within the predetermined range. In other words, a decision is made to determine if the longitudinal position of the front seat 2 exists within the predetermined range. When it is decided at step S82 that the longitudinal position of the front seat 2 exists within the predetermined range, it is determined that the air bag 4b can be maintained in an appropriate state for confining the passenger seated on the rear seat even if the seat status of the front seat would be adjusted. Then, at step S83, the seat status of the front seat 2 is adjusted.

When it is decided at step S82 that the front seat 2 is located in the longitudinal position of the body outside the predetermined range, it is determined that the confinement of the passenger seated on the rear seat by the air bag 4b of the front seat 2 can be impaired if the seat status of the front seat 2 would be adjusted so that the adjustment of the seat status of the front seat 2 is inhibited, for example, by suspending the operation of the motor 130.

It is also possible in the control as shown in FIG. 49 to regulate the seat status of the front seat 2, regardless of the passenger being seated on the rear seat, by excluding the passenger determining means.

Figure 50:
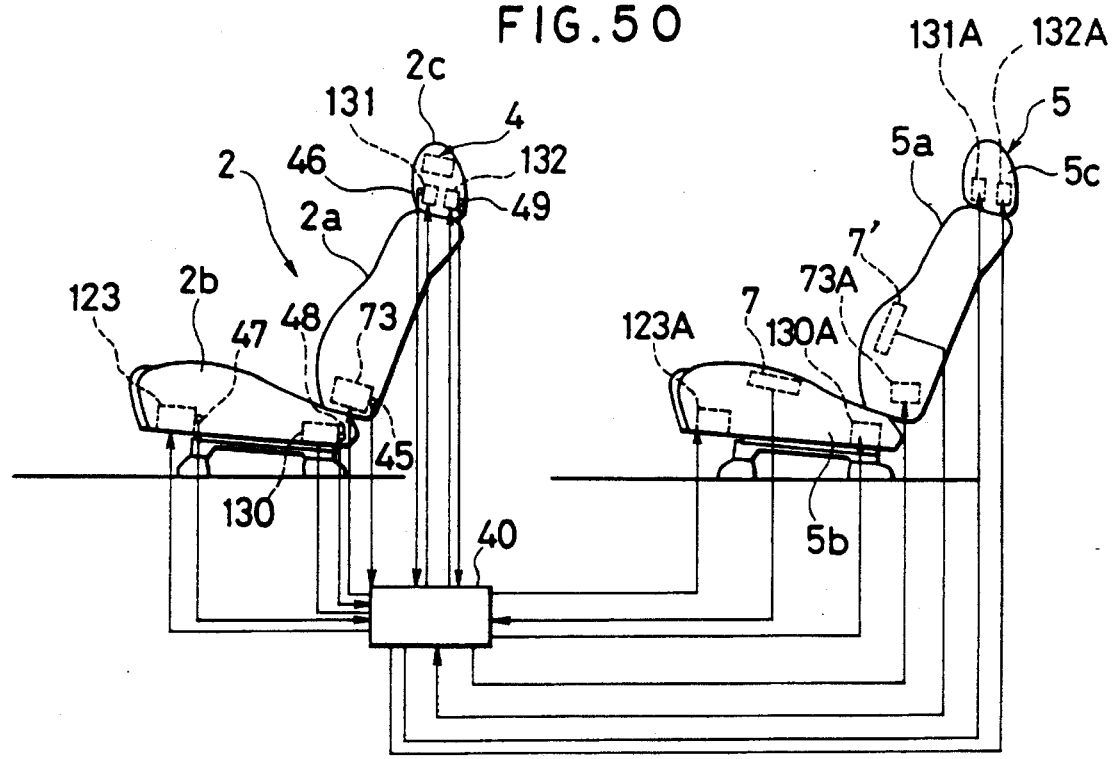
Figure 51:
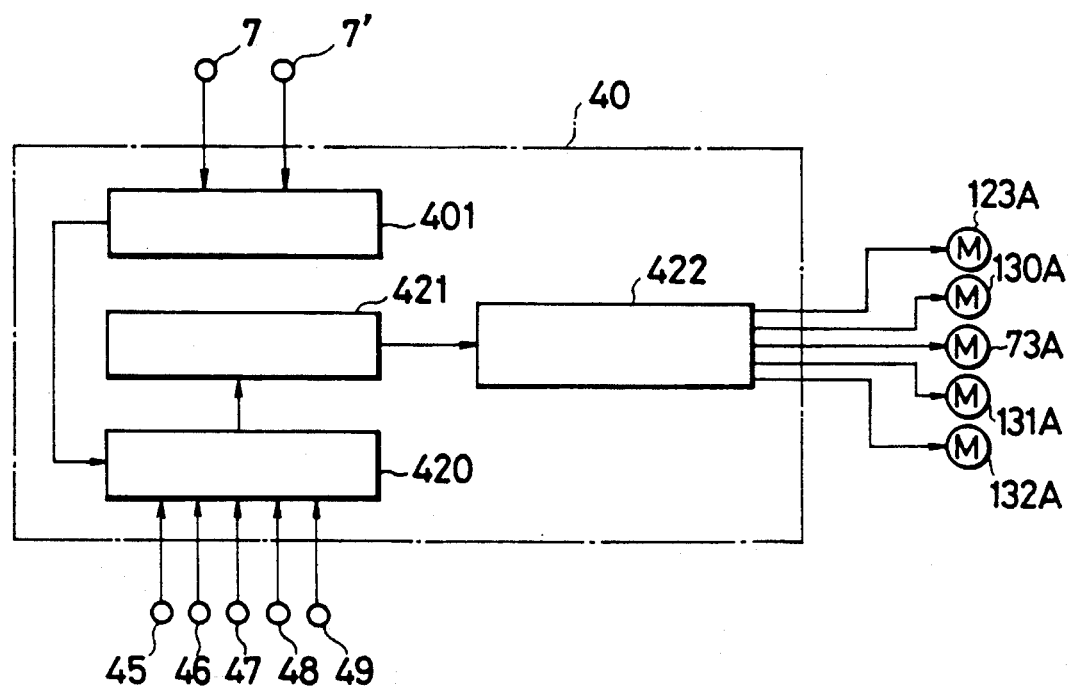
Figure 52:
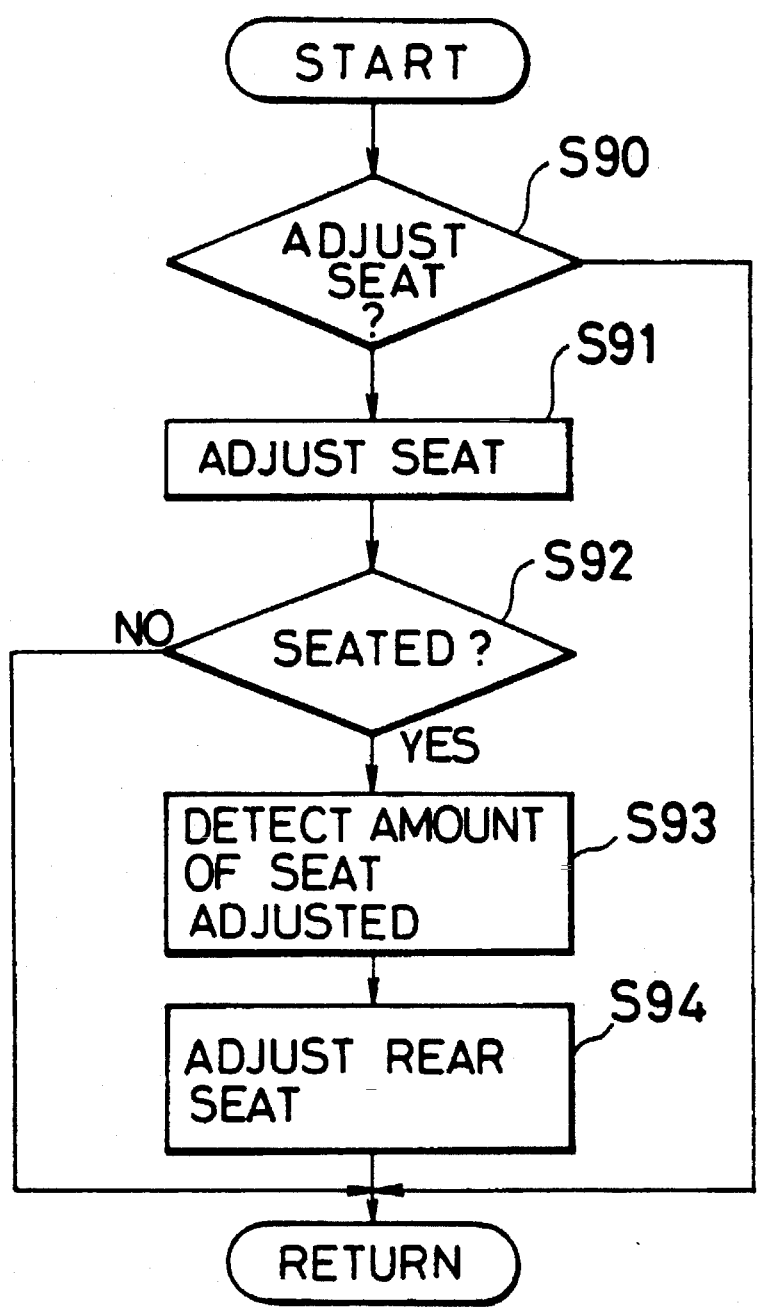

VARIANT OF ELEVENTH EMBODIMENT (FIGS. 50 to 52)

FIGS. 50 to 52 show a variant of the eleventh embodiment according to the present invention as shown in FIGS. 45 to 49.

In this variant embodiment, the rear seat 5 is provided with a reclining mechanism, a longitudinally sliding mechanism and a vertical position adjusting mechanism, while the head rest 5c of the rear seat 5 is provided with a leaning mechanism and a vertical position adjusting mechanism. The action and structures of these mechanisms are the same as those disposed at the front seat 2, so that detailed description thereof will be omitted from the following explanation. In order to distinguish the mechanisms disposed at the front seat 2, the respective mechanisms disposed at the rear seat 5 are provided with the same reference numerals to which the suffix "A" is added. As shown in FIG. 50, reference numeral 73A denotes a motor functioning as a source for driving the reclining mechanism of the seat back 5a of the rear seat 5 and reference numeral 130A denotes a motor serving as a source for driving the longitudinally sliding mechanism of the rear seat 5. Reference numeral 130A denotes a motor for driving the mechanism for vertically raising or lowering the seat back 5a thereof, and reference numeral 131A stands for a motor as a source for driving the leaning mechanism for reclining the head rest 5c of the rear seat 5. Further, reference numeral 132A denotes a motor functioning as a source for driving mechanism for adjusting the vertical position of the head rest 5c thereof.

The control unit 40 to be employed for this variant of the eleventh embodiment comprises the passenger determining means 401 for determining the passenger seated on the rear seat, detecting means 420 for detecting an adjusted quantity of the seat status of the front seat 2, operational means 421 for operating the adjusted quantity of the seat status of the front seat 2 in response to a signal from the detecting means 420, and second seat-status controlling means 422 for controlling the various motors 123A, etc. The control unit 40 in this embodiment is arranged to alter the seat status of the rear seat 5 in association with the adjustment of the seat status of the front seat 2 by the same quantity as the seat status of the front seat 2 is adjusted. For example, when the front seat 2 is displaced forwards, the rear seat 5 is also displaced forwards by the same distance as the front seat 2 has been displaced.

Like in the eleventh embodiment as described hereinabove, signals are entered into the passenger determining means 401 of the control unit 40 from the seat sensor 7 and the second seat sensor 7. The sensor 7 is disposed at the seat cushion 5b of the rear seat 5, while the sensor 7' is disposed at the seat back 5b of the rear seat 5. In this embodiment, it is determined by the passenger determining means 401 that the passenger is seated on the rear seat 5 when both of the seat sensors 7 and 7' generate ON signals.

The detecting means 420 for detecting the adjusted quantity of the seat status of the front seat 2 is operated in response to a signal generated from the passenger determining means 401. The signals are then entered into the detecting means 420 of the control unit 40 from the sensors 45 to 49, inclusive, for detecting the adjusted quantity of the seat status of the front seat 2. The sensor 45 generates a signal indicative of the reclined angle of the seat back 2a of the front seat 2, as shown in FIG. 20. The sensor 46 generates a signal indicative of a reclined angle of the head rest 2c thereof, as shown in FIG. 21. The sensor 47 generates a signal indicative of the longitudinal position of the front seat 2, as shown in FIG. 22. The sensor 48 generates a signal indicative of the vertical position of the front seat 2, as shown in FIG. 23. The sensor 49 generates a signal indicative of the vertical position of the head rest 2c thereof, as shown in FIG. 24.

When the alteration of the seat status of the front seat 2 is detected by the detecting means 420, then a signal is entered into the operational means 421 which computes the adjusted quantity of the seat status of the front seat 2 and generates a signal indicative of the computation result of the alteration of the seat status of the front seat 2. In response to the signal from the operational means 421, the second seat-status controlling means 422 is operated to drive the corresponding motor, i.e. motor 73A, 123A, 130A, 131A or 132A, thereby allowing the rear seat to be altered by the computation result so as to be associated with the change in the seat status of the front seat 2.

An example of the control will be described with reference to the flow chart as shown in FIG. 52.

First, at step S90, a decision is made to determine if the seat status of the front seat 2 is to be adjusted, i.e. if the manual switch 145 is turned on. When it is decided at step S90 that the ON signal is entered from the manual switch 145, then the program flow goes to step S91 at which the seat status of the front seat 2 is adjusted by driving the motor 130 or the like. Then, at step S92, it is decided to determine if the passenger is seated on the rear seat 5 by detecting if both of the seat sensors 7 and 7' are turned on. When the result of decision at step S92 indicates that the rear seat 5 is vacant, the program flow goes back to step S90. On the other hand, when it is decided at step S92 that both of the seat sensors 7 and 7' are turned on and the passengers are seated on the rear seat 5, then the program flow goes to step S93 at which the adjusted quantity of the seat status of the front seat 2 is detected by the detecting means 420, followed by proceeding to step S94 at which the seat status of the rear seat 5 is adjusted by the same quantity computed by the operational means 421 as the seat status of the front seat 2 has been altered, by driving the corresponding motor in response to the signal from the second seat-status controlling means 422.

With the arrangement as described hereinabove, the space between the air bag unit 4 disposed at the front seat 2 and the passenger seated on the rear seat 5 can always be maintained in an appropriate distance, thereby allowing the air bag 4b to confining the passenger in an appropriate fashion when the air bag 4b is developed to expand.

Figure 53:
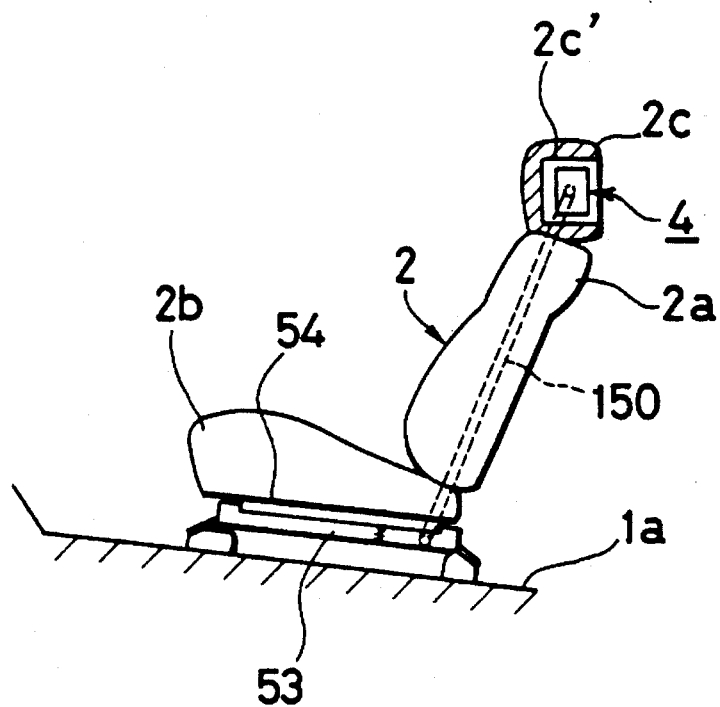
Figure 54:
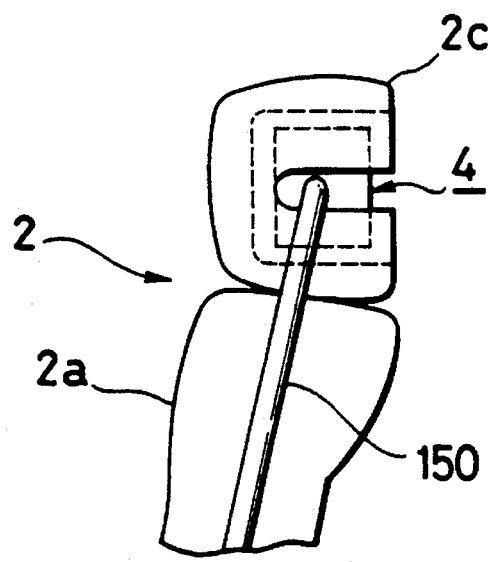
Figure 55:
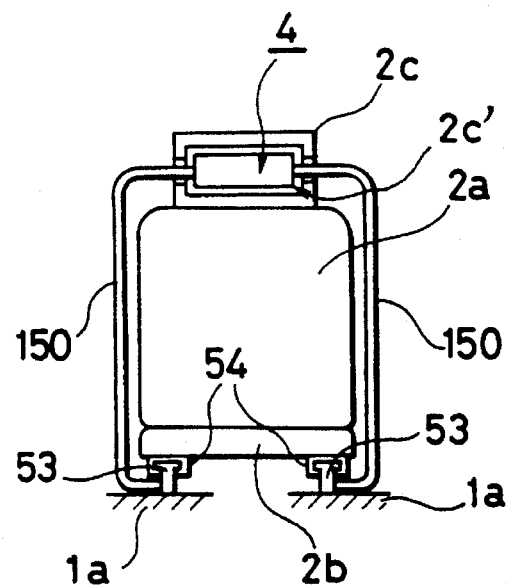

TWELFTH EMBODIMENT (FIGS. 53 to 55)

In the twelfth embodiment according to the present invention, the head rest 2c of the front seat 2 is provided with opening 2c' facing and directed rearward and the air bag unit 4 is accommodated in the opening 2c' so as to be displaceable in vertical and longitudinal directions of the vehicle body, as shown in FIGS. 53 and 54.

As specifically shown in FIG. 55, an arm 150 is disposed on both left-hand and right-hand sides of the seat back 2a of the front seat 2. The arm 150 is fixed at its lower end to the lower seat rail 53 secured to the floor 1a of the vehicle body and at its upper end to the side wall of the air bag unit 4. The arm 150 may be provided with a length adjusting mechanism, although not shown in the drawings, thereby permitting adjustment of the length of the arm 150, i.e. the vertical position of the air bag unit 4, so as to correspond to the seat status of the front seat 2.

In this embodiment, the air bag unit 4 accommodated within the opening 2c' of the head rest 2c of the front seat 2 is so disposed as to be independent from the front seat 2, so that the air bag unit 4 can be maintained in the appropriate space apart from the passenger seated on the rear seat 5 even if the seat status of the front seat 2 is changed. For example, even if the front seat 2 has been displaced forwards, the air bag unit 4 can be maintained in the original position appropriate for exploding the air bag 4 against the passenger seated on the rear seat 5, without changing the seat status of the front seat 2 to a great extent.

THIRTEENTH EMBODIMENT (FIGS. 56 to 62)

In this embodiment according to the present invention, the air bag unit 4 is disposed in the opening 2c' of the head rest 2c of the front seat 2 so as to be displaceable in both vertical and longitudinal directions of the vehicle body. The air bag unit 4 is displaced longitudinally by longitudinal displacement means 151 while the air bag unit 4 is displaced vertically by vertical displacement means 159. It is noted herein that no suffixes "L" and "R" referring to the 'left-hand' and 'right-hand', respectively, are omitted from the corresponding drawings merely for the purpose of avoiding complexity, although the suffixes "L" and "R" are provided with the reference numerals in the course of the following description in order to make the explanation more precise.

Figure 56:
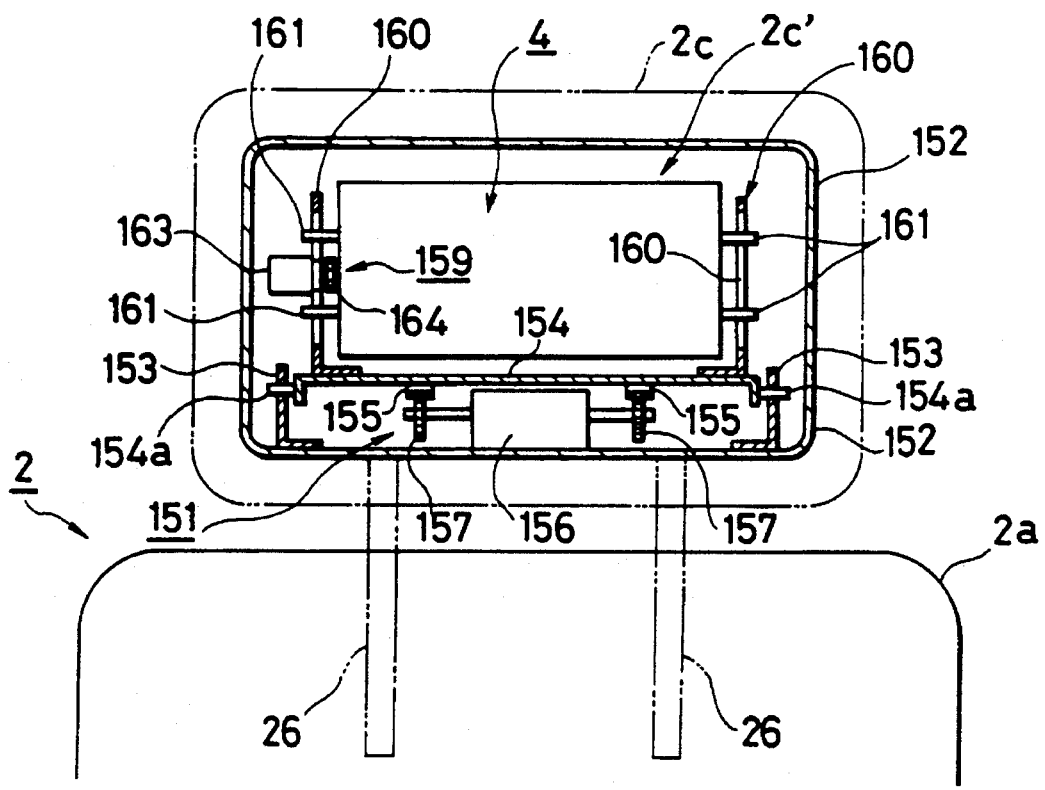
Figure 57:
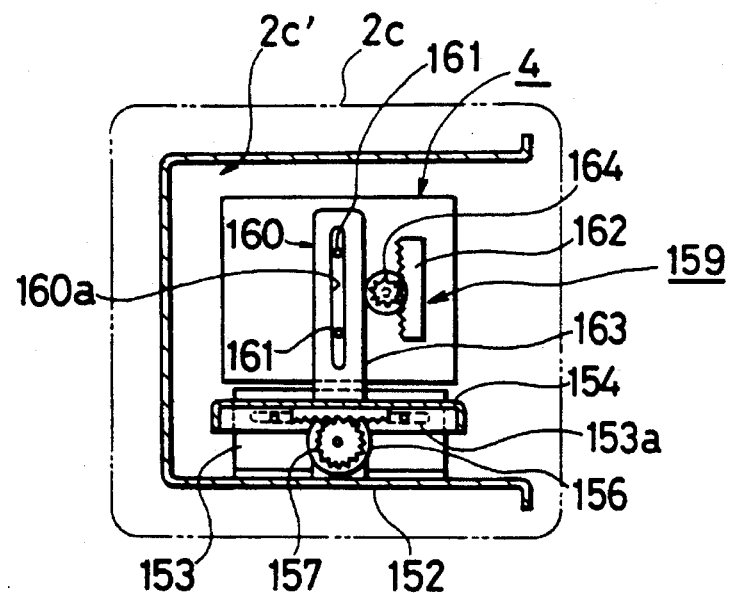
Figure 58:
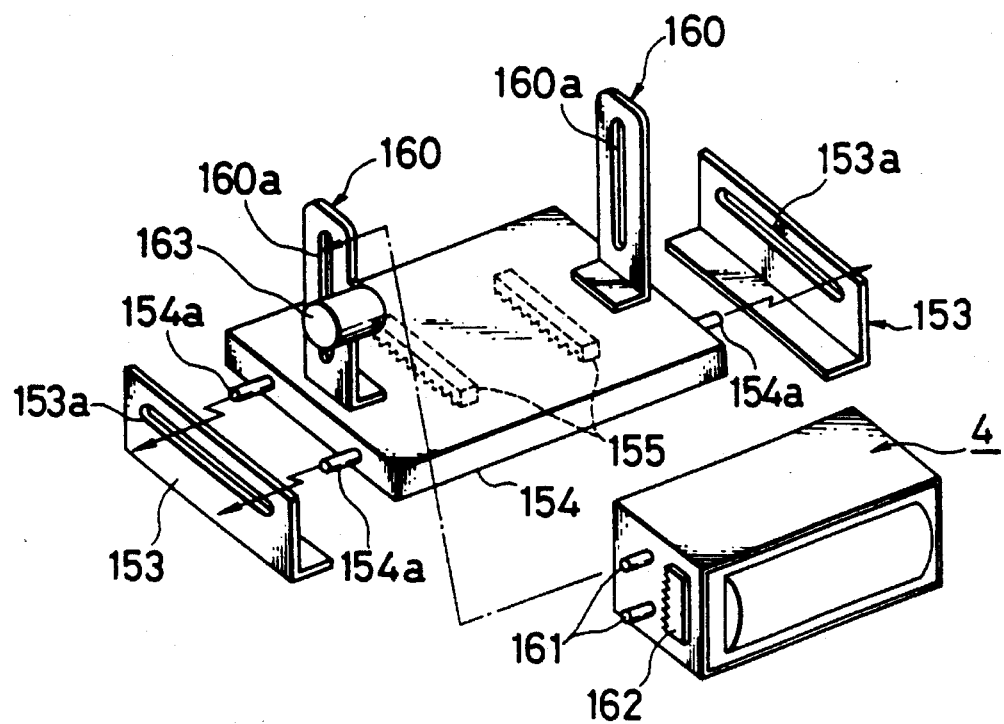

Longitudinal Displacement Mechanism 151 (FIGS. 56 to 58)

As shown in FIGS. 56 to 58, the opening 2c' of the head rest 2c of the front seat 2 is formed and surrounded by a frame 152 having an opening facing and directed toward the rear seat 5, which in turn is fixed to an upper end of the head rest poll 26. At both transverse side portions of the frame 152 are mounted left-hand and right-hand first guide brackets 153L and 153R standing upright from the bottom frame section of the frame 152. Each of the first guide brackets 153 has a first guide aperture 153a extending in the longitudinal direction of the vehicle body.

Between the left-hand and right-hand first guide brackets 153L and 153R is interposed a movable plate 154 which in turn is provided at its side end portions with pins 154a in a longitudinally spaced relationship, each pin 154 extending in the longitudinal direction of the vehicle body, so as to be inserted through the respective first guide apertures 153a of the first guide brackets 153, thereby allowing the movable plate 154 to be displaced in the longitudinal direction of the vehicle body along the first guide apertures 53a.

Fixed to a bottom surface of the movable plate 54 are a pair of left-hand and right-hand racks 155L and 155R, each extending in the longitudinal direction thereof. On the other hand, a first motor 156 is secured to the bottom frame section of the frame 152 in the middle position interposed between the left-hand and right-hand racks 155L and 155R. Mounted to the both side portions of the output shaft of the first motor 156 are left-hand and right-hand pinions 157L and 157R so as to be meshable with the left-hand and right-hand racks 155L and 155R, respectively. This arrangement allows the movable plate 154 to move in the longitudinal direction of the vehicle body as the first motor 156 rotates, thereby displacing the air bag unit 4 in the longitudinal direction thereof.

Vertical Displacement Mechanism 159 (FIGS. 56 to 58)

As shown in FIGS. 56 to 58, the movable plate 154 has a pair of left-hand and right-hand second guide brackets 160L and 160R disposed upright on its bottom plate surface. Each of the second guide brackets 160 has a second guide aperture 160a extending in the vertical direction.

Between the left-hand and right-hand second guide brackets 160L and 160R is interposed the air bag unit 4 which in turn is provided on its both sides with pins 161 in a vertically spaced relationship, each pin 161 extending in the transverse direction of the vehicle body. The pins 161 disposed on the left-hand and right-hand sides of the air bag unit 4 are inserted through the left-hand and right-hand second guide apertures 160aL and 160aR, respectively, thereby allowing the air bag unit 4 to displace in the vertical direction along the respective second guide apertures 160a.

As specifically shown in FIGS. 57 and 58, a second motor 163 is secured to the second guide bracket 160, while a rack 162 extending in the vertical direction is fixed to one side surface of the air bag unit 4. A pinion 164 is mounted to an output shaft of the second motor 163, thereby allowing the pinion 164 to be meshable with the rack 162 fixed to the air bag unit 4. This arrangement allows the air bag unit 4 to move in the vertical direction in association with the rotation of the second motor 163.

Figure 59:
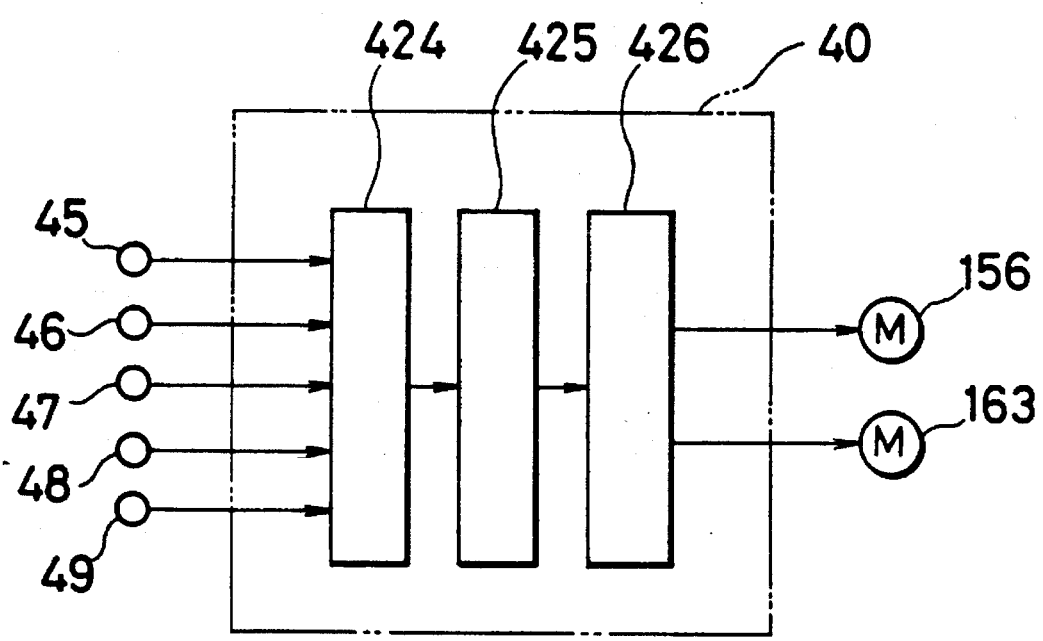

As shown in FIG. 59, the first motor 156 and the second motor 163 are controlled on the basis of signals generated from the control unit 40 which comprises decision means 424, operational means 425 and position controlling means 426.

The signals are entered into the decision means 424 of the control unit 40 from the sensors 45 to 49, inclusive, and signals are generated from the position controlling means 426 of the control unit 40 into the first and second motors 156 and 163. As described hereinabove, the sensor 45 is to sense the reclined angle of the front seat 2, the sensor 46 is to sense the reclined angle of the head rest 2c of the front seat 2, and the sensor 47 is to sense the longitudinal position of the front seat 2. Further, the sensor 48 is to sense the vertical position of the front seat 2 and the sensor 49 is to sense the vertical position of the head rest 2c of the front seat 2.

The decision means 424 of the control unit 40 is to make a decision to determine if the seat status of the front seat 2 exists within a predetermined range. The operational means 425 is to compute the longitudinally adjustable quantity, x, and the vertically adjustable quantity, y, of the air bag unit 4 in accordance with the seat status of the front seat 2, when the seat status of the front seat 2 exists outside the predetermined range. The position controlling means 426 is to control the longitudinal position and/or the vertical position of the air bag unit 4 by the longitudinally adjustable quantity, x, and/or the vertical adjustable quantity, y, computed by the operational means 425 by operating the first motor 156 and/or the second motor 163, respectively.

Now, description will be made of the control contents by the control unit 40 with reference to FIGS. 60 and 61.

Figure 60:
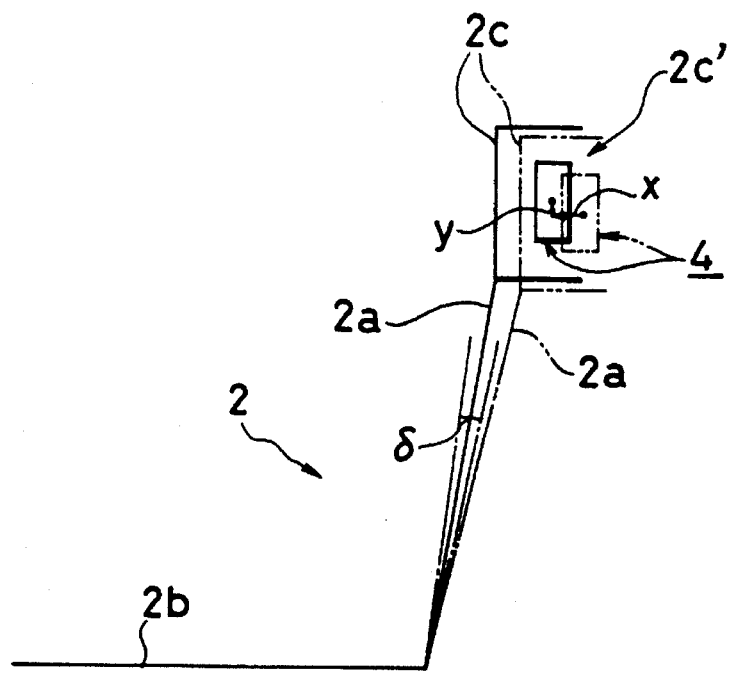

FIG. 60 shows the control contents by the control unit 40 when the reclined angle of the seat back 2a of the front seat 2 is changed. When the reclined angle of the front seat 2 exists within a predetermined angle range, δ, on the one hand, it is determined that the position of the air bag unit 4, as indicated by the solid line in FIG. 60, exists in the manner appropriate for expanding the air bag 4b against the passenger seated on the rear seat 5 and suppressing the passenger from jumping forwards off the rear seat upon a shock of a car crash. When the reclined angle of the front seat 2 exists outside the predetermined angle range, δ, for example, as indicated by the phantom line in FIG. 60, and when the front seat 2 is reclined rearward to a great extent, on the other hand, the space interposed between the air bag unit 4 disposed in the front seat 2 and the passenger seated on the rear seat 5 becomes too narrow, so that the vertical position of the air bag unit 4 is displaced to a lower position from the original position as indicated by the solid line in FIG. 60, thereby allowing the air bag 4b to expand against the passenger in an appropriate fashion. In this case, the control unit 40 operates the corresponding motor to alter the position of the air bag unit 4 disposed in the space 4c' of the head rest 4c of the front seat 2, thereby displacing the air bag unit 4 toward a more appropriate position, as indicated by the solid line in FIG. 60. In the example as shown in FIG. 60, the air bag unit 4 is displaced in the longitudinal and/or vertical directions as indicated by the arrow x and/or the arrow y in order to arrange for the air bag unit 4 in the position as indicated by the solid line, when the seat back 2a of the front seat 2 is reclined to the position as indicated by the phantom line.

Figure 61:
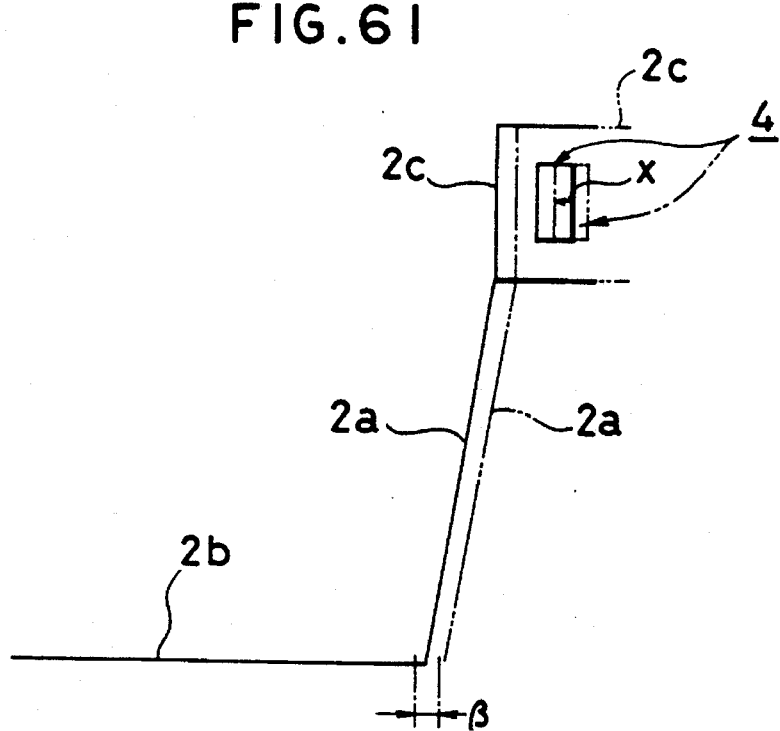

FIG. 61 shows the control contents by the control unit 4 when the longitudinal position of the front seat 2 is changed. When the front seat 2 is located in the longitudinal position within a predetermined range β, on the one hand, the air bag unit 4 is located in the position, as indicated by the solid line in FIG. 61, appropriate for confining the passenger seated on the rear seat 5 with the expanded air bag 4b in a good condition. When the front seat 2 is located in the longitudinal position outside the predetermined range β, for example, when the front seat 2 slides rearward to a great extent to the position as indicated by the phantom line in FIG. 61, on the other hand, the space interposed between the air bag unit 4 disposed at the front seat and the passenger seated on the rear seat 5 becomes so narrow that the air bag unit 4 disposed within the space 4c' of the head rest 4c is displaced to the most appropriate position, as indicated by the solid line. In the example as shown in FIG. 61, the air bag 4 is displaced in the direction x to the position as indicated by the solid line, when the front seat 2 slides to the position as indicated by the phantom line.

Figure 62:
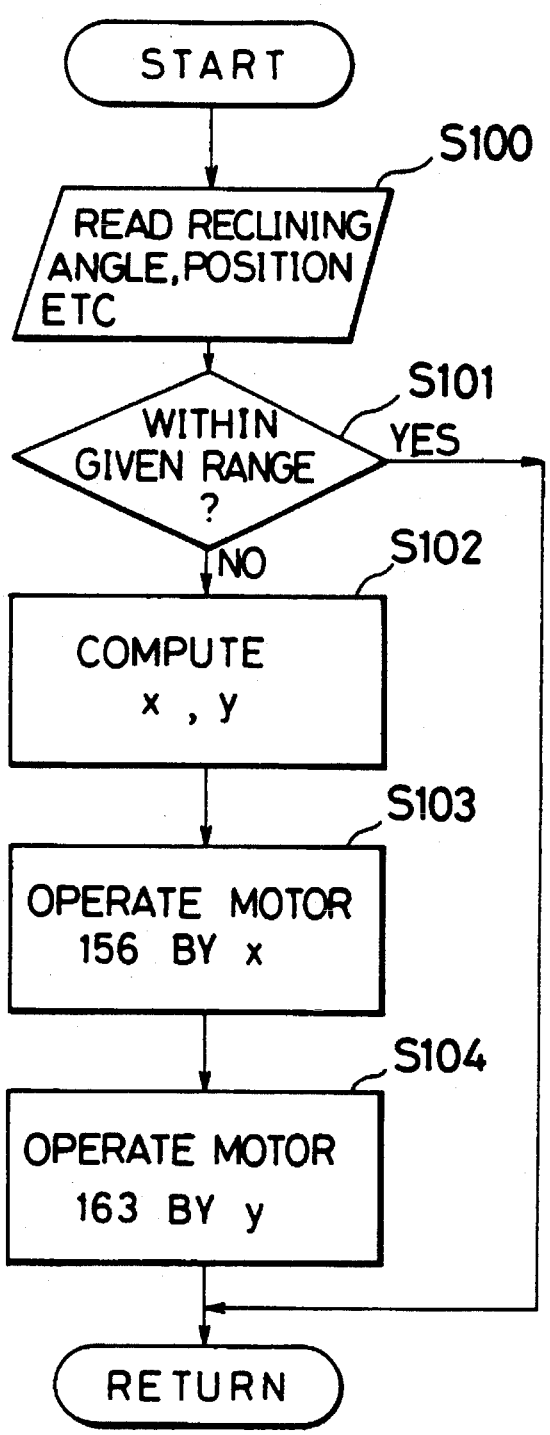
Figure 63:
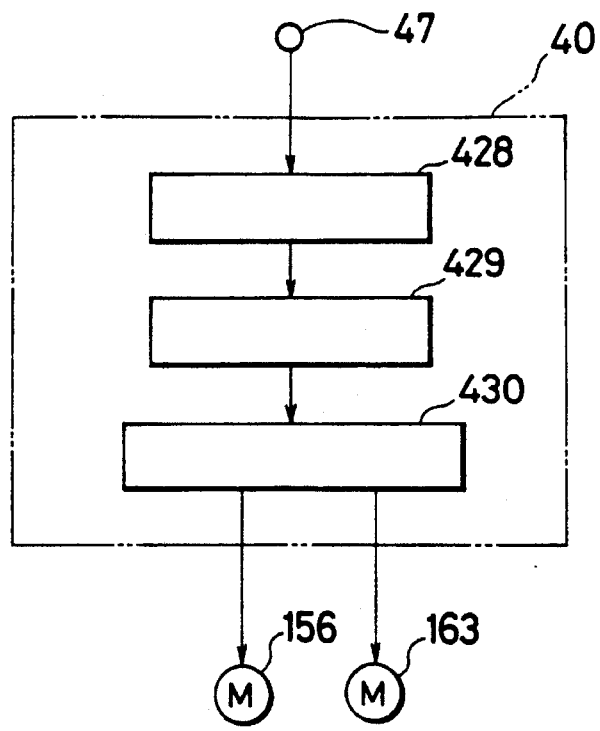

Referring now to FIG. 62, an example of the control by the control unit 40 will be described with reference to the flow chart.

First, at step S100, the seat status of the front seat 2, e.g. the reclined angle of the front seat 2, the longitudinal position thereof, and so on, are read, followed by proceeding to step S101 at which a decision is made to determine if the seat status of the front seat 2 exists within the predetermined range, for example, within the predetermined angle range, δ, or within the predetermined longitudinal position range, β. When it is decided at step S101 that the seat status of the front seat 2 exists within the predetermined range, then the program flow is returned because it is unnecessary to displace the air bag unit 4.

On the other hand, when the result of decision at step S101 that the seat status of the front seat 2 exists outside the predetermined range, then the program flow goes to step S102 at which the adjustable quantities, x and y, are computed by the operational means 425, followed by proceeding to step S103 at which the first motor 156 is operated to displace the air bag unit 4 in the longitudinal direction of the vehicle body by the adjustable quantity x computed by the operational means 425. Then, at step S104, the second motor 163 is operated to displace the air bag unit 4 in the vertical direction thereof by the adjustable quantity y computed thereby.

It is to be noted herein that the position of the air bag unit 4 may be adjusted in association with the vertical position of the seat back 2a or the head rest 2c or with the reclined angle of the head rest 2c, as well as the reclined angle of the front seat 2 or the longitudinal position thereof.

FOURTEENTH EMBODIMENT (FIGS. 63 & 64)

It is to be noted that the lower seat rail 53 is fixed to the floor 1a of the vehicle body in such a manner that its front end is higher than its rear end. In other words, from the viewpoint of sliding operation of front seat 2, this arrangement for the longitudinally sliding mechanism (see FIG. 44) allows the front seat 2 to be located at a higher position as the front seat 2 slides forward.

In the fourteenth embodiment according to the present invention, the position of the air bag unit 4 is adjusted in association with the longitudinal position of the front seat 2 by taking advantage of the arrangement for the longitudinally sliding mechanism as shown in FIG. 44.

The control unit 40 comprises position detecting means 428 for detecting the longitudinal position of the front seat 2 in response to the signal from the sensor 47, operational means 429 for computing displacement quantity in the longitudinal direction, x, or in the vertical direction, y, in response to a signal from the position detecting means 428, and air bag unit controlling means 430 for controlling the position of the air bag unit 4 by driving the first and/or second motors 156 and/or 163, in response to a signal from the operational means 429.

Figure 64:
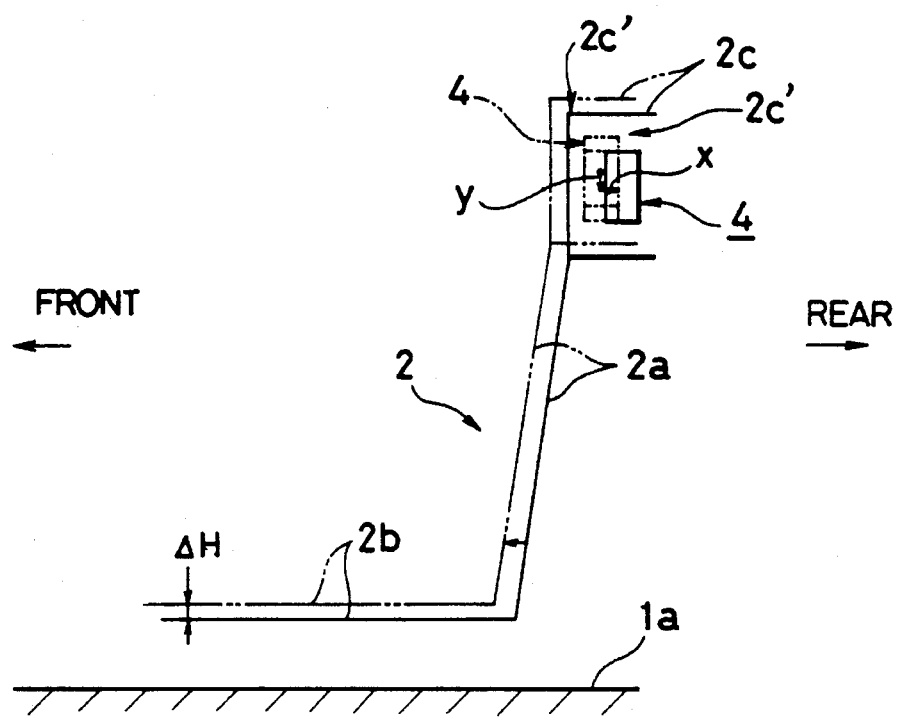

Referring now to FIG. 64, for example, when the front seat 2 is displaced forwards from the position indicated by the solid line to the position indicated by the phantom line, the front seat 2 is displaced upwards by the height, ΔH. In this case, the control unit 40 sets the longitudinal quantity, y, to be identical to the displaced height, ΔH, while the vertical quantity, x, is computed so as to correspond to the quantity in which the front seat 2 has slid in the forward direction of the vehicle body. Then, the longitudinal and vertical positions of the air bag unit 4 are adjusted on the basis of the quantities, x and y.

In this embodiment, it is to be noted, too, that only the longitudinal position of the air bag unit 4 may be adjusted by the longitudinal quantity, y, only.

Further, this embodiment can be applied to the eleventh embodiment as shown in FIG. 50. In other words, for example, when the front seat 2 is displaced forwards from the position indicated by the solid line in FIG. 64 to the position indicated by the phantom line therein, the seat cushion 5b of the rear seat 5 may be raised by the height, ΔH, so as to correspond to the elevation of the front seat 2 by the height, ΔH.

The present invention may be embodied in many other specific forms without departing from the spirit and scope of the invention. The present embodiments as described hereinabove are therefore to be construed in all respects as illustrative and not restrictive, the scope of the invention being indicated by the appended claims, and all the changes, modifications and variations which come within the meaning and range of equivalency of the appended claims are therefore intended to be encompassed within the spirit and scope of the invention.

What is claimed is:

1. An air bag system for an automotive vehicle having an air bag unit disposed on a front seat so as to expand an air bag accommodated in the air bag unit toward a passenger seated on a rear seat upon impact of the automotive vehicle, comprising:

front seat status adjusting means for adjusting a seat status of the front seat;

passenger determining means for determining if the passenger is seated on the rear seat; and inhibition means for inhibiting alteration of the seat status of the front seat beyond a predetermined range by controlling the front seat status adjusting means in response to a signal from the passenger determining means, when it is determined by the passenger determining means that the passenger is seated on the rear seat.

2. A system as claimed in claim 1, wherein said front seat status adjusting means is a seat sliding device.

3. A system as claimed in claim 2, wherein said air bag system includes at least one of a forward and rearward position detecting sensor, and said inhibition means is arranged to inhibit the front seat from being adjusted beyond a predetermined range in at least one of a forward and rearward direction.

4. A system as claimed in claim 1, wherein said front seat status adjusting means is a seat reclining device.

5. A system as claimed in claim 4, wherein said air bag system includes a reclining angle detecting sensor for the seat back of the front seat; and said inhibition means is arranged to inhibit the reclining angle from being adjusted beyond a predetermined range.

6. A system as claimed in claim 1, wherein said front seat status adjusting means is a vertically adjusting device of the seat back.

7. A system as claimed in claim 6, wherein said air bag system includes a height detecting sensor for the front seat; and said inhibition means is arranged to inhibit the seat height from being adjusted beyond the predetermined range.

8. A system as claimed in claim 1, wherein said air bag is located in a front seat head rest.

9. A system as claimed in claim 8, wherein said front seat status adjusting means is at least one of forward and rearward reclining device of the head rest.

10. A system as claimed in claim 8, wherein said air bag system includes an inclining angle detecting sensor; and said inhibition means is arranged to inhibit the inclining angle of the head rest from being adjusted beyond the predetermined range.

11. A system as claimed in claim 8, wherein said front seat status adjusting means is a vertically adjusting device in the head rest.

12. A system as claimed in claim 11, wherein said air bag system includes a vertical head-rest position detecting sensor; and said inhibition means is arranged to inhibit the vertical position of the head rest to be adjusted beyond the predetermined range.

* * * * *

UNITED STATES PATENT AND TRADEMARK OFFICE
CERTIFICATE OF CORRECTION

PATENT NO. : 5,466,001
DATED : November 14, 1995
INVENTOR(S) : Yasuo GOTOMYO et al.

It is certified that error appears in the above-indentified patent and that said Letters Patent is hereby corrected as shown below:

On the title page item [21], should read --Appl. No.: 266,720--

Signed and Sealed this

Sixteenth Day of April, 1996

Attest:

BRUCE LEHMAN

Attesting Officer

Commissioner of Patents and Trademarks